US012671920B2

(12) United States Patent
Kewitsch et al.

(10) Patent No.: US 12,671,920 B2
(45) Date of Patent: Jun. 30, 2026

(54) AUTOMATED PHYSICAL NETWORK SYSTEMS BASED ON ROBOTIC CONTROL AND MANAGEMENT OF FIBER OPTIC INTERCONNECTS

(71) Applicant: TELESCENT INC., Irvine, CA (US)

(72) Inventors: Anthony Stephen Kewitsch, Irvine, CA (US); Bucoveanu Ramiro Voicu, Versoix (CH)

(73) Assignee: TELESCENT INC., Irvine, CA (US)

( * ) Notice: Subject to any disclaimer, the term of this patent is extended or adjusted under 35 U.S.C. 154(b) by 260 days.

(21) Appl. No.: 17/923,998

(22) PCT Filed: May 8, 2021

(86) PCT No.: PCT/US2021/031444
    § 371 (c)(1),
    (2) Date: Nov. 8, 2022

(87) PCT Pub. No.: WO2021/231233
    PCT Pub. Date: Nov. 18, 2021

(65) Prior Publication Data
    US 2023/0300499 A1 Sep. 21, 2023

Related U.S. Application Data

(60) Provisional application No. 63/106,342, filed on Oct. 27, 2020, provisional application No. 63/022,791, filed on May 11, 2020.

(51) Int. Cl.
    *H04Q 11/00* (2006.01)
    *G02B 6/35* (2006.01)
    (Continued)

(52) U.S. Cl.
    CPC ......... *H04Q 11/0062* (2013.01); *G02B 6/356* (2013.01); *H04B 10/071* (2013.01);
    (Continued)

(58) Field of Classification Search
    CPC ....... H04Q 11/0062; H04Q 2011/0081; H04Q 2011/0083; H04Q 11/0001;
    (Continued)

(56) References Cited

U.S. PATENT DOCUMENTS 6,834,139 B1 * 12/2004 Prairie ................ H04L 43/0811
                                                            398/4
7,460,753 B2    12/2008 Kewitsch
                    (Continued)

FOREIGN PATENT DOCUMENTS

WO    2021046227 A1    3/2021
WO    2021158492 A1    8/2021
WO    2021231233 A1    11/2021

OTHER PUBLICATIONS

WIPO, International Search Report received in International Application No. PCT/US2021/031444, Sep. 17, 2021, (7p.).
(Continued)

*Primary Examiner* — Dibson J Sanchez
(74) *Attorney, Agent, or Firm* — Siritzky Law, PLLC

(57) ABSTRACT

Applications of robotics applied to patch-panels and cross-connects to improve operational processes within data centers and communications networks. Systems and architectures to perform frequent, accurate and low-cost reconfigurations and measurements of the physical network are described, thereby eliminating labor and time delays when completing routine tasks such physical network provisioning and reconfiguration.

12 Claims, 44 Drawing Sheets

Scan Direction 1

(51) Int. Cl.

| | |
|---|---|
| *H04B 10/071* | (2013.01) |
| *H04B 10/25* | (2013.01) |
| *H04B 10/27* | (2013.01) |
| *H04B 10/07* | (2013.01) |

(52) U.S. Cl.

CPC ............. *H04B 10/25* (2013.01); *H04B 10/27* (2013.01); *H04B 10/07* (2013.01); *H04Q 11/0001* (2013.01); *H04Q 11/0005* (2013.01); *H04Q 2011/0058* (2013.01); *H04Q 2011/0081* (2013.01); *H04Q 2011/0083* (2013.01)

(58) Field of Classification Search

CPC ........ H04Q 11/0005; H04Q 2011/0058; H04B 10/071; H04B 10/25; H04B 10/27; H04B 10/07; G01M 11/3136; G02B 6/3502; G02B 6/356

USPC .......................................... 398/9–38, 43–103

See application file for complete search history.

(56) References Cited

U.S. PATENT DOCUMENTS

| | | | | |
|---|---|---|---|---|
| 7,747,124 | B2 * | 6/2010 | Xia ...................... | G02B 6/3502 |
| | | | | 385/139 |
| 8,428,405 | B2 | 4/2013 | Kewitsch | |
| 8,480,310 | B2 | 7/2013 | Kewitsch | |
| 9,052,490 | B2 | 6/2015 | Kewitsch | |
| 9,240,855 | B1 | 1/2016 | Lam et al. | |
| 9,703,060 | B2 | 7/2017 | Kewitsch | |
| 10,656,343 | B1 * | 5/2020 | Applebaum ....... | G01M 11/3154 |
| 11,252,488 | B2 | 2/2022 | Kewitsch | |
| 2003/0170021 | A1 * | 9/2003 | Larsson .......... | H04B 10/07953 |
| | | | | 398/56 |
| 2004/0096216 | A1 * | 5/2004 | Ito ..................... | H04B 10/0775 |
| | | | | 398/33 |
| 2005/0117147 | A1 * | 6/2005 | Beller ................ | G01M 11/3109 |
| | | | | 356/73.1 |
| 2006/0197943 | A1 | 9/2006 | Kewitsch | |
| 2007/0036506 | A1 | 2/2007 | Kewitsch | |
| 2007/0274657 | A1 | 11/2007 | Billman et al. | |
| 2010/0046885 | A1 * | 2/2010 | Chen .................... | G02B 6/3508 |
| | | | | 385/22 |
| 2010/0074616 | A1 | 3/2010 | Kewitsch | |
| 2013/0259422 | A1 * | 10/2013 | Takeuchi ............ | G02B 6/3826 |
| | | | | 385/20 |
| 2014/0079364 | A1 | 3/2014 | Kewitsch | |
| 2015/0222352 | A1 | 8/2015 | Kewitsch | |
| 2016/0202424 | A1 * | 7/2016 | Kewitsch .............. | B25J 9/0018 |
| | | | | 385/17 |
| 2017/0310395 | A1 | 10/2017 | Mehrvar et al. | |
| 2017/0366882 | A1 | 12/2017 | Lingampalli | |
| 2019/0056553 | A1 | 2/2019 | Kewitsch | |
| 2019/0293875 | A1 | 9/2019 | Kewitsch | |
| 2020/0003978 | A1 | 1/2020 | Kewitsch | |
| 2020/0005001 | A1 | 1/2020 | Kewitsch | |
| 2020/0014637 | A1 | 1/2020 | Sindhu et al. | |
| 2020/0041725 | A1 | 2/2020 | Kewitsch | |
| 2020/0326484 | A1 | 10/2020 | Kewitsch | |
| 2021/0101233 | A1 | 4/2021 | Kewitsch | |
| 2021/0232154 | A1 | 7/2021 | Kewitsch | |
| 2021/0239910 | A1 | 8/2021 | Kewitsch | |
| 2021/0266065 | A1 * | 8/2021 | Wang ................. | G01D 5/35358 |
| 2021/0311261 | A1 * | 10/2021 | Zheng ............... | H04Q 11/0003 |
| 2022/0107470 | A1 | 4/2022 | Kewitsch | |
| 2022/0132229 | A1 | 4/2022 | Kewitsch | |

OTHER PUBLICATIONS

WIPO, International Written Opinion received in International Application No. PCT/US2021/031444, Sep. 17, 2021, (9p.).

EPO, Extended European Search Report received in European Application No. 21803751.3, Apr. 24, 2024, (8p.).

Youtube, Open Compute Project: "OCPREG19—Automated Meet-Me-Room," Oct. 6, 2019, (2p.) (cited in EESR for European Application No. 21803751.3, Apr. 24, 2024).

\* cited by examiner

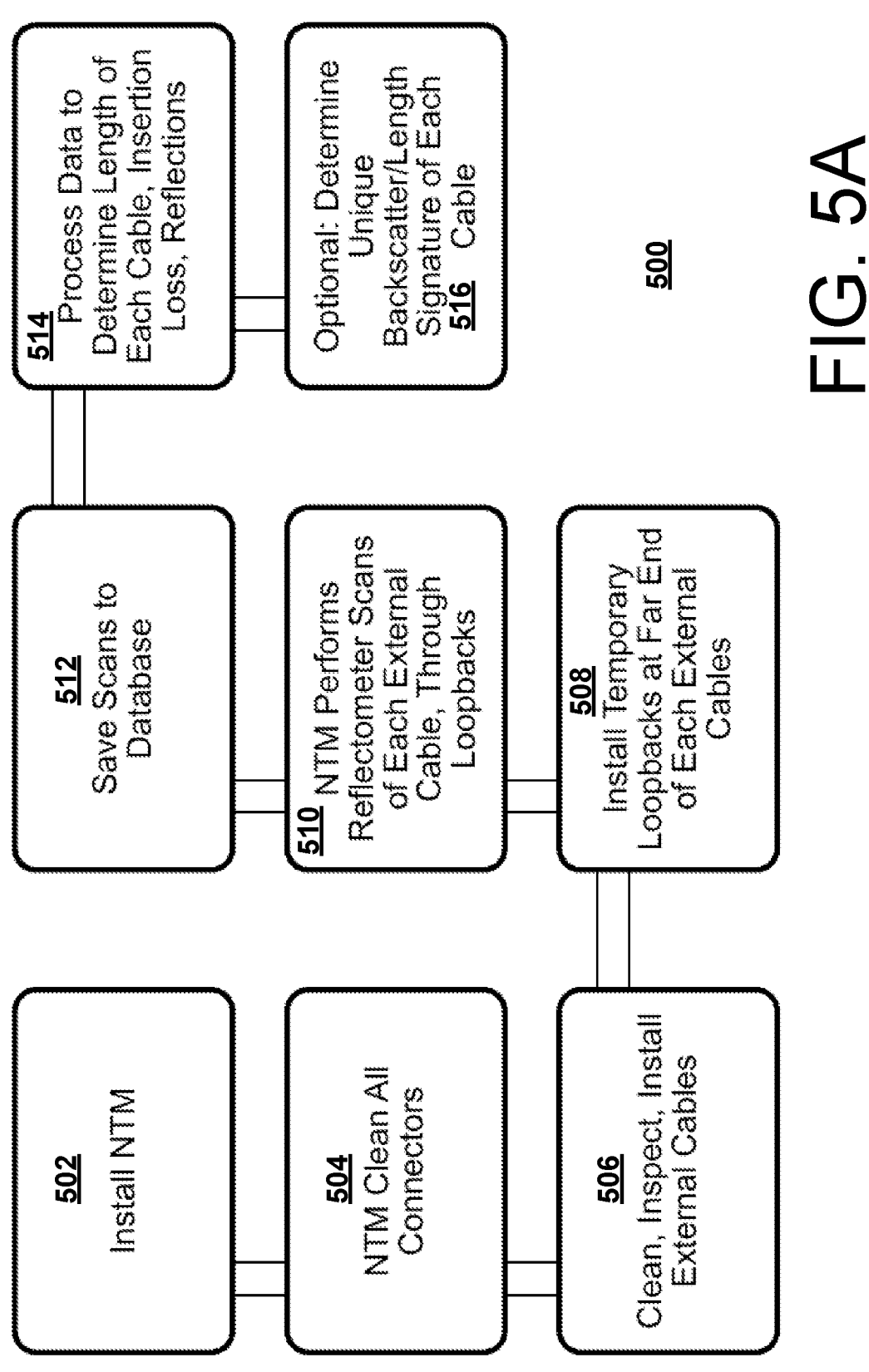

502
Install NTM

504
NTM Clean All Connectors

506
Clean, Inspect, Install External Cables

512
Save Scans to Database

510
NTM Performs Reflectometer Scans of Each External Cable, Through Loopbacks

508
Install Temporary Loopbacks at Far End of Each External Cables

514
Process Data to Determine Length of Each Cable, Insertion Loss, Reflections

516 Optional: Determine Unique Backscatter/Length Signature of Each Cable

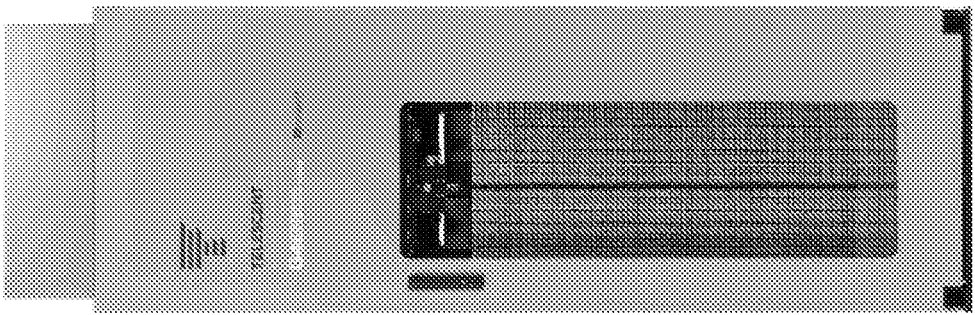
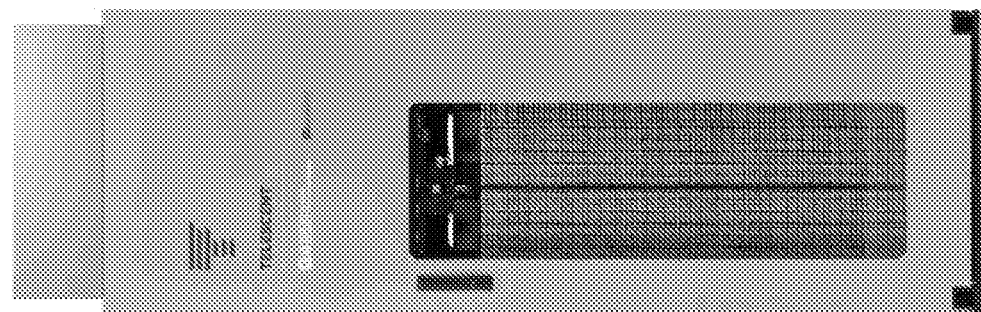
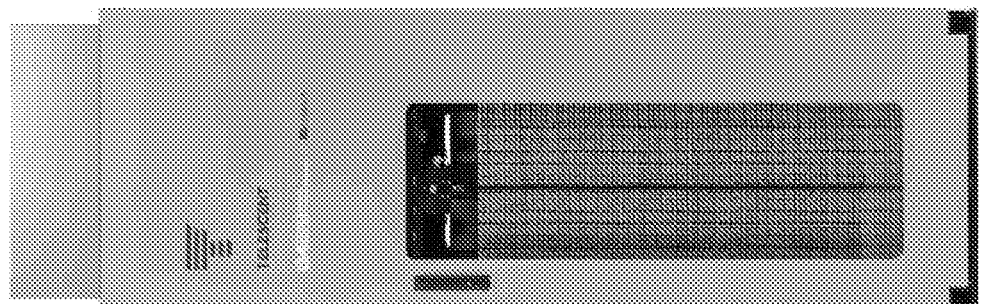
FIG. 13

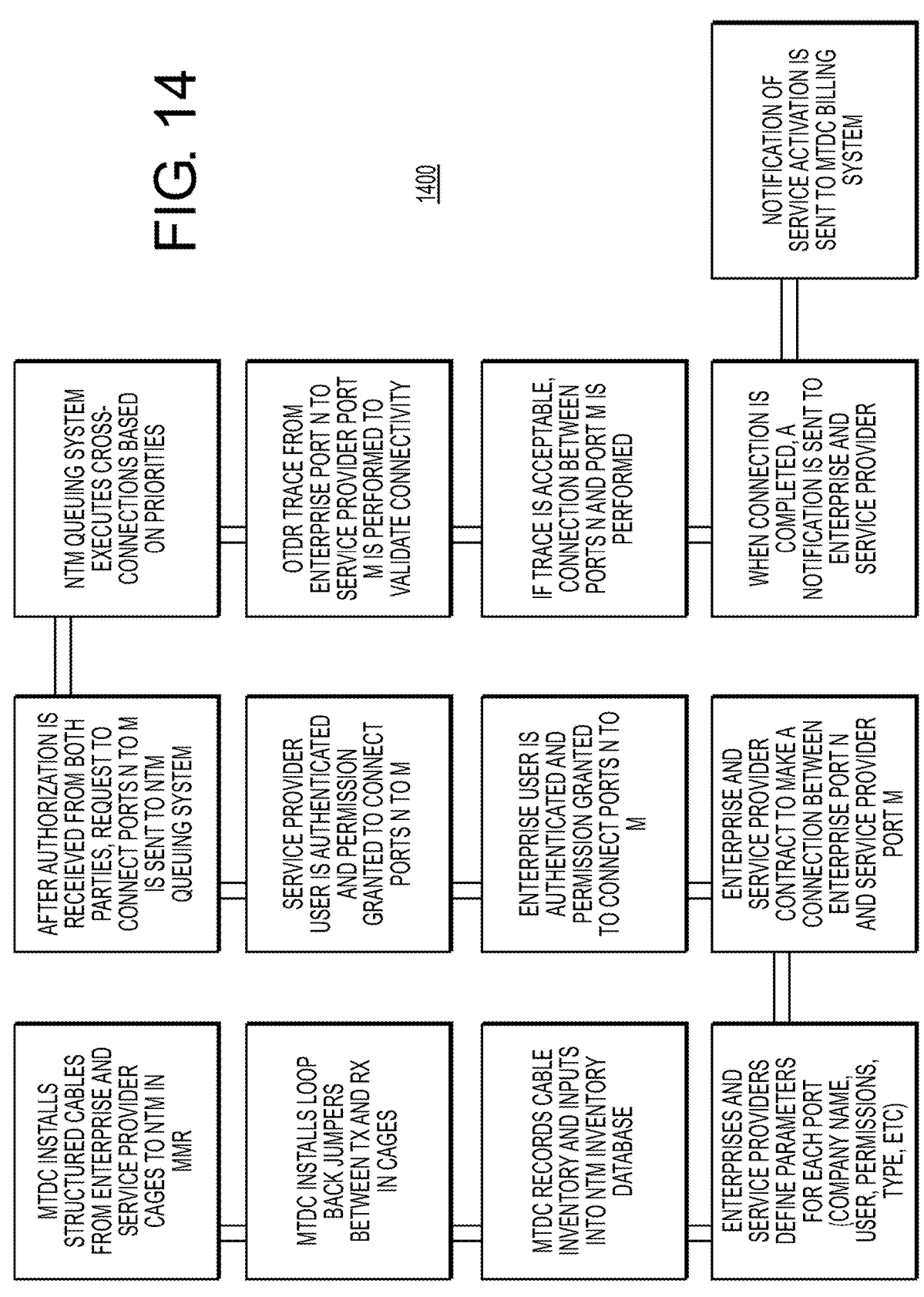

MTDC INSTALLS STRUCTURED CABLES FROM ENTERPRISE AND SERVICE PROVIDER CAGES TO NTM IN MMR

MTDC INSTALLS LOOP BACK JUMPERS BETWEEN TX AND RX IN CAGES

MTDC RECORDS CABLE INVENTORY AND INPUTS INTO NTM INVENTORY DATABASE

ENTERPRISES AND SERVICE PROVIDERS DEFINE PARAMETERS FOR EACH PORT (COMPANY NAME, USER, PERMISSIONS, TYPE, ETC)

AFTER AUTHORIZATION IS RECIEVED FROM BOTH PARTIES, REQUEST TO CONNECT PORTS N TO M IS SENT TO NTM QUEUING SYSTEM

SERVICE PROVIDER USER IS AUTHENTICATED AND PERMISSION GRANTED TO CONNECT PORTS N TO M

ENTERPRISE USER IS AUTHENTICATED AND PERMISSION GRANTED TO CONNECT PORTS N TO M

ENTERPRISE AND SERVICE PROVIDER CONTRACT TO MAKE A CONNECTION BETWEEN ENTERPRISE PORT N AND SERVICE PROVIDER PORT M

NTM QUEUING SYSTEM EXECUTES CROSS-CONNECTIONS BASED ON PRIORITIES

OTDR TRACE FROM ENTERPRISE PORT N TO SERVICE PROVIDER PORT M IS PERFORMED TO VALIDATE CONNECTIVITY

IF TRACE IS ACCEPTABLE, CONNECTION BETWEEN PORTS N AND PORT M IS PERFORMED

WHEN CONNECTION IS COMPLETED, A NOTIFICATION IS SENT TO ENTERPRISE AND SERVICE PROVIDER

NOTIFICATION OF SERVICE ACTIVATION IS SENT TO MTDC BILLING SYSTEM

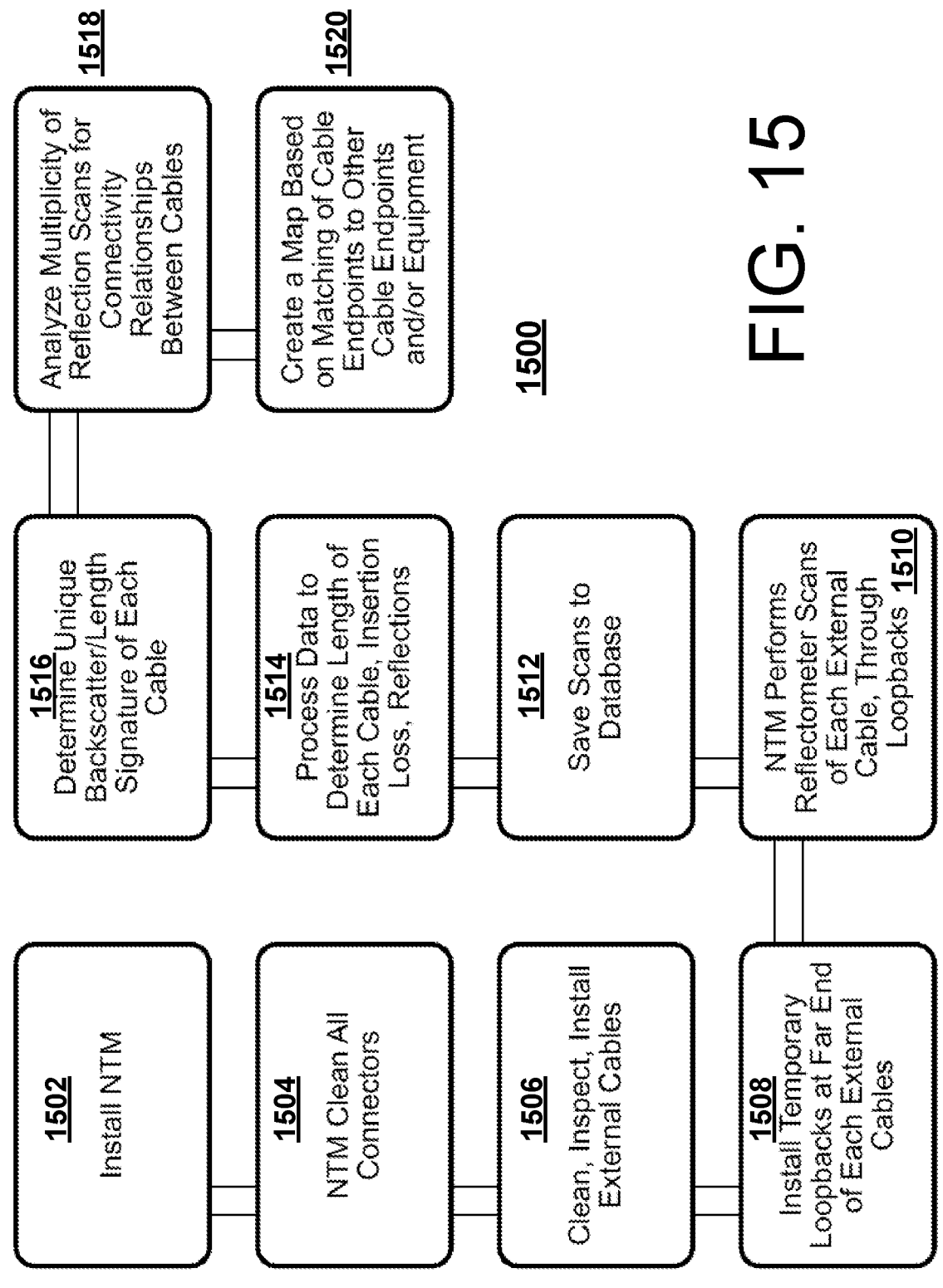

1518 Analyze Multiplicity of Reflection Scans for Connectivity Relationships Between Cables

1520 Create a Map Based on Matching of Cable Endpoints to Other Cable Endpoints and/or Equipment

1516 Determine Unique Backscatter/Length Signature of Each Cable

1514 Process Data to Determine Length of Each Cable, Insertion Loss, Reflections

1512 Save Scans to Database

1510 NTM Performs Reflectometer Scans of Each External Cable, Through Loopbacks

1502 Install NTM

1504 NTM Clean All Connectors

1506 Clean, Inspect, Install External Cables

1508 Install Temporary Loopbacks at Far End of Each External Cables

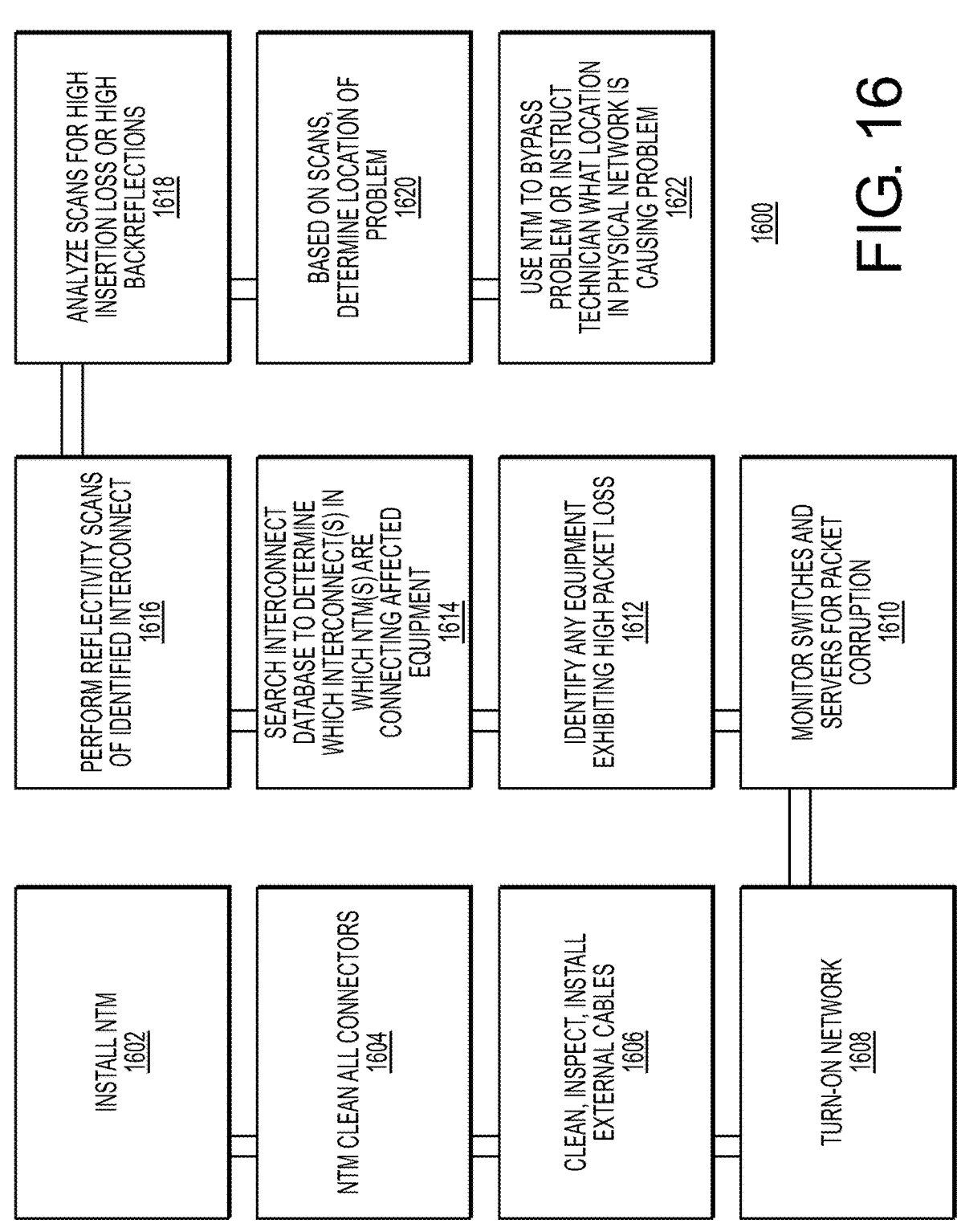

INSTALL NTM
1602

NTM CLEAN ALL CONNECTORS
1604

CLEAN, INSPECT, INSTALL EXTERNAL CABLES
1606

TURN-ON NETWORK
1608

MONITOR SWITCHES AND SERVERS FOR PACKET CORRUPTION
1610

IDENTIFY ANY EQUIPMENT EXHIBITING HIGH PACKET LOSS
1612

SEARCH INTERCONNECT DATABASE TO DETERMINE WHICH INTERCONNECT(S) IN WHICH NTM(S) ARE CONNECTING AFFECTED EQUIPMENT
1614

PERFORM REFLECTIVITY SCANS OF IDENTIFIED INTERCONNECT
1616

ANALYZE SCANS FOR HIGH INSERTION LOSS OR HIGH BACKREFLECTIONS
1618

BASED ON SCANS, DETERMINE LOCATION OF PROBLEM
1620

USE NTM TO BYPASS PROBLEM OR INSTRUCT TECHNICIAN WHAT LOCATION IN PHYSICAL NETWORK IS CAUSING PROBLEM
1622

N/S TRAFFIC: 800 G BW CAPACITY

ASSUMPTIONS ON
UTILIZATION:
≥ 70%: TOO HIGH
40-60%: IDEAL
≤ 30%: LOW

CLUSTER C

CLUSTER D

CLUSTER A

CLUSTER B

E/W TRAFFIC: 3.2 T BW CAPACITY

N/S TRAFFIC: 800 G BW CAPACITY

ASSUMPTIONS ON
UTILIZATION:
≥ 70%: TOO HIGH
40-60%: IDEAL
≤ 30%: LOW

E/W TRAFFIC: 3.2 T BW CAPACITY

Customer Cage Precabling Spliced to Trunk

Figure 24A:
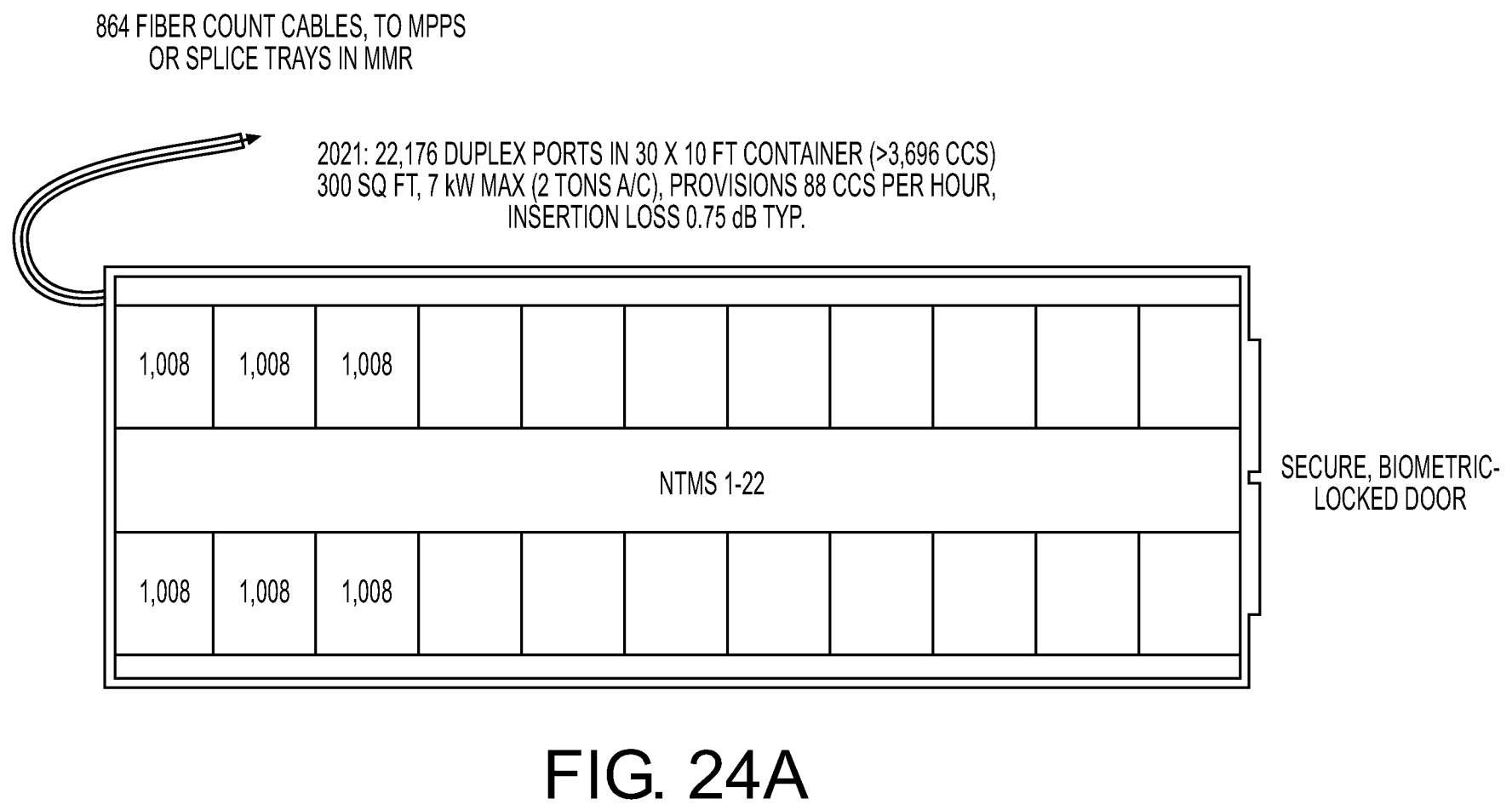

SECURE, BIOMETRIC-
LOCKED DOOR

864 FIBER COUNT CABLES, TO MPPS
OR SPLICE TRAYS IN MMR

2021: 22,176 DUPLEX PORTS IN 30 X 10 FT CONTAINER (>3,696 CCS)
300 SQ FT, 7 KW MAX (2 TONS A/C), PROVISIONS 88 CCS PER HOUR,
INSERTION LOSS 0.75 dB TYP.

NTMS 1-22

Figure 24B:
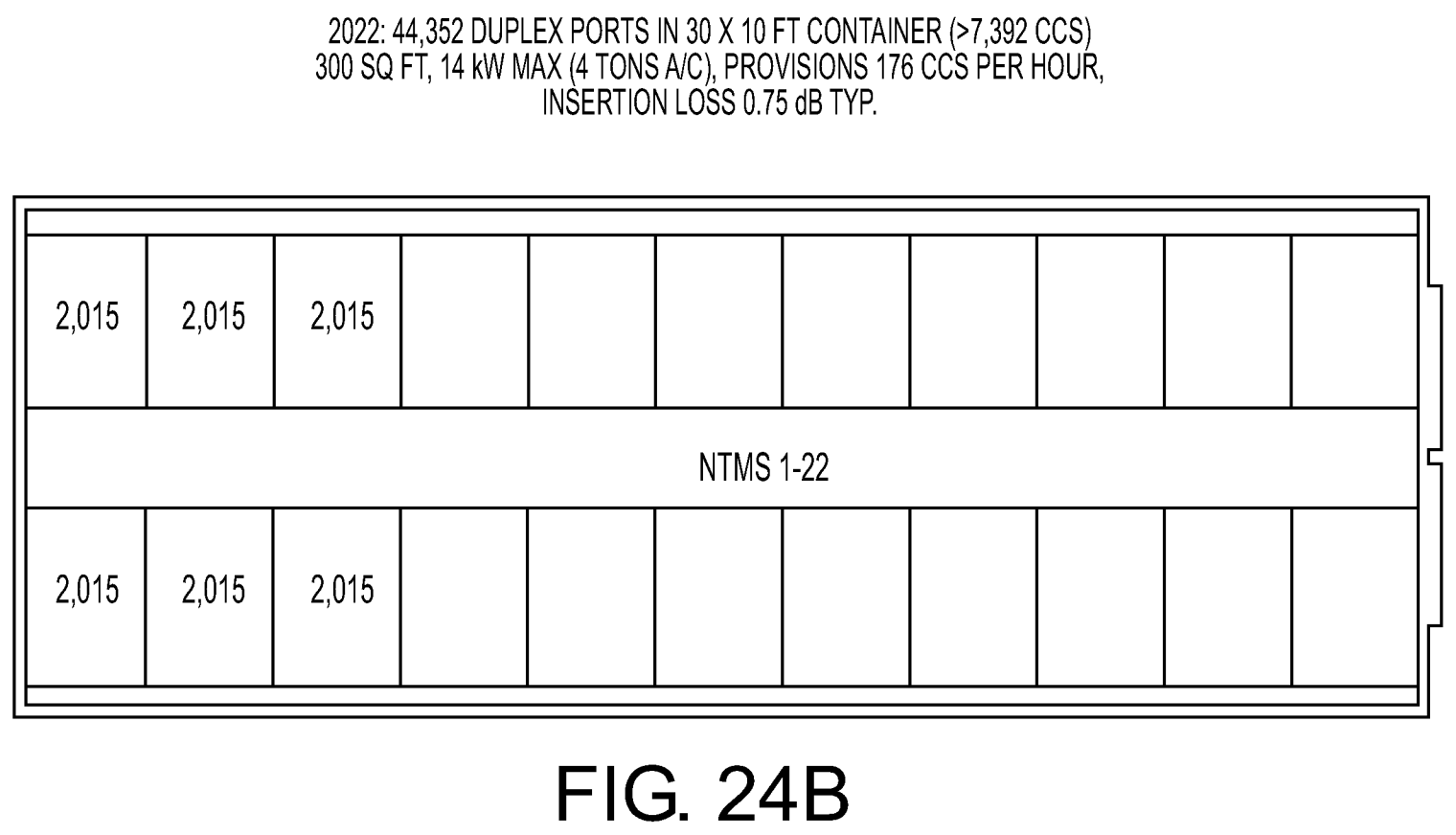

2022: 44,352 DUPLEX PORTS IN 30 X 10 FT CONTAINER (>7,392 CCS) 300 SQ FT, 14 kW MAX (4 TONS A/C), PROVISIONS 176 CCS PER HOUR, INSERTION LOSS 0.75 dB TYP.

NTMS 1-22

864 FIBER COUNT CABLES, TO MPPS OR SPLICE TRAYS IN MMR

2021: 15,120 DUPLEX PORTS IN 40 X 8 FT CONTAINER (>2,520 CCS) 320 SQ FT, 5 KW MAX (1.5 TONS A/C), PROVISIONS 60 CCS PER HOUR, INSERTION LOSS 0.75 dB TYP.

NTMS 1-15

1,008    1,008    1,008

SECURE, BIOMETRIC-LOCKED DOOR

2022: 30,240 DUPLEX PORTS IN 40 X 8 FT CONTAINER (>5,040 CCS) 320 SQ FT, 10 KW MAX (3 TONS A/C), PROVISIONS 120 CCS PER HOUR, INSERTION LOSS 0.75 dB TYP.

NTMS 1-15

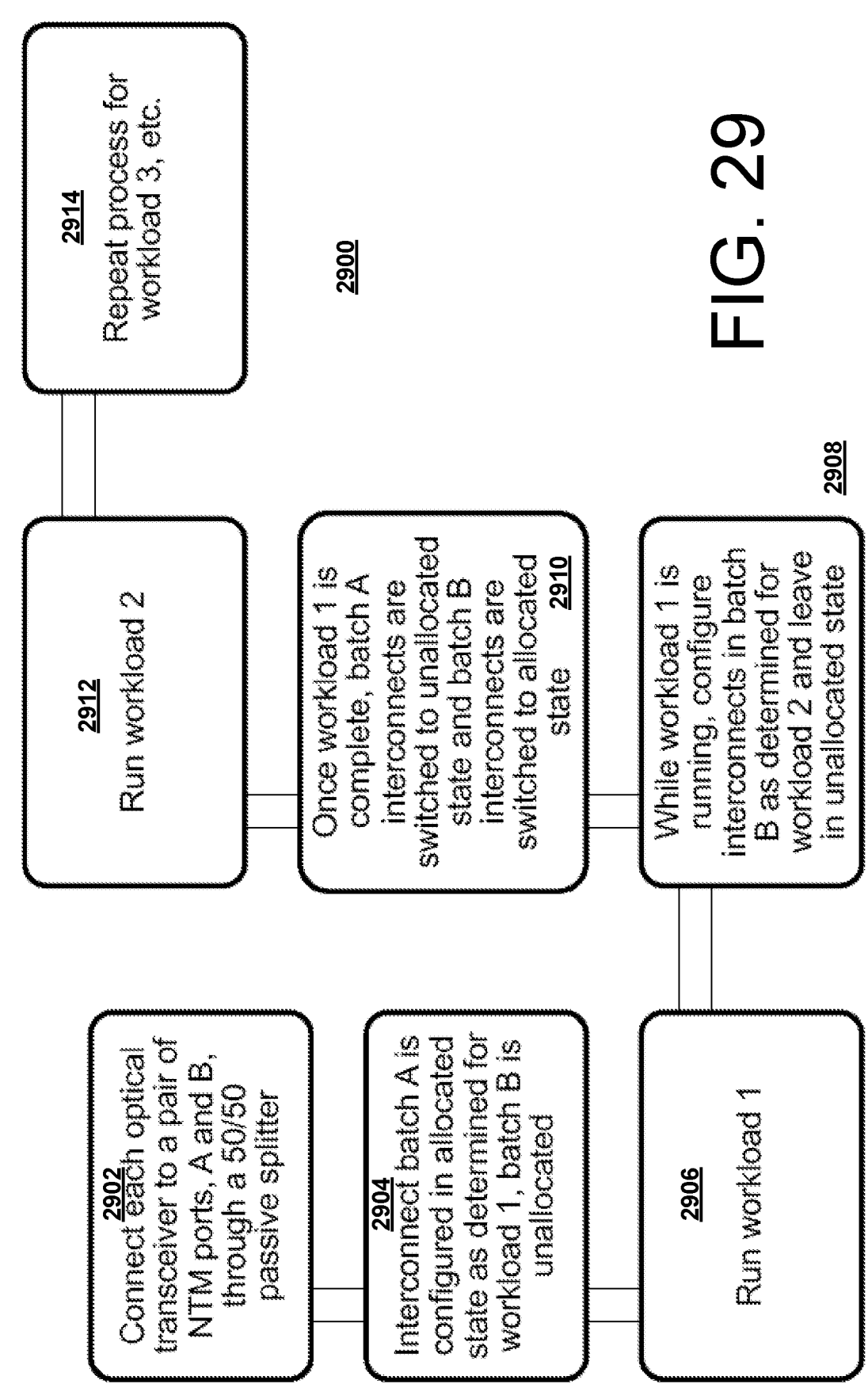

2914 Repeat process for workload 3, etc.

2912 Run workload 2

2910 Once workload 1 is complete, batch A interconnects are switched to unallocated state and batch B interconnects are switched to allocated state

2908 While workload 1 is running, configure interconnects in batch B as determined for workload 2 and leave in unallocated state

2902 Connect each optical transceiver to a pair of NTM ports, A and B, through a 50/50 passive splitter

2904 Interconnect batch A is configured in allocated state as determined for workload 1, batch B is unallocated

2906 Run workload 1

AUTOMATED PHYSICAL NETWORK SYSTEMS BASED ON ROBOTIC CONTROL AND MANAGEMENT OF FIBER OPTIC INTERCONNECTS

RELATED APPLICATIONS

This application is the National Phase (a 371) of International Application No. PCT/US2021/031444, filed May 8, 2021, which claims the benefit of U.S. provisional patent applications Nos. 63/022,791 filed May 11, 2020 and 63/106,342 filed Oct. 27, 2020, the entire contents of all of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to automated physical network systems based on robotic control and management of fiber optic interconnects.

BACKGROUND

Data center networks consist of servers, storage devices, switches, routers, and transmission systems, all interconnected with a passive fiber optic interconnect fabric that is provisioned and managed by on-site engineers and technicians. In conventional systems, the fiber interconnect fabric (i.e., Layer-0) is substantially static and maintained using manual processes. This is a limitation which compromises performance, scale, reliability, and overall data center utilization. As competitiveness among cloud providers grows, advanced automation services which give customers greater control and real-time software APIs to manage these interconnects becomes a chief differentiator.

Automated fiber optic patch-panels and cross-connects are key elements to automate this interconnect fabric and enable lights-out, e.g., unmanned data centers. Robotic fiber optic patch-panels and cross-connects are able to configure and reconfigure, connect and disconnect, troubleshoot, and validate fiber optic interconnections through software control, without human intervention. This eliminates the need for technicians and manual processes. The automated patch-panel and cross-connect are key devices to connect all networked devices within a computer network so that routine management functions can be performed hands-free. In the descriptions that follow, the term Network Topology Manager (NTM) will be used interchangeably with automated, robotic patch-panels and cross-connects.

In one example of a highly automated physical network system, the NTM enables new and advanced telemetry and health monitoring services by integrating complex and costly test equipment and allowing them to be physically switched into the network and controlled remotely through software. Optical measurement equipment includes Optical Time Domain Reflectometers (OTDRs), Optical Coherence Domain Reflectometers (OCDRs), Optical Power Meters (OPMs), Bit Error Rate Testers (BERT) and high-speed Packet Analyzers (PAs). Optical characteristics such as insertion loss, backreflection and wavelength, and signal characteristics such as Bit Error Rate (BER) and packet loss can be measured by instructing the NTM to establish a connection to the network link under test. These measurements may be scheduled and performed automatically for any link within the interconnect fabric.

The NTM is able to robotically provision fiber optic connections without human intervention. NTMs physically grip and move fiber interconnects with one or more robots, and the movement of the robot(s) requires careful motion pre-planning to prevent a collision of fiber strands (i.e., entanglement) during rearrangement. As disclosed by the present inventor in prior patents and pending applications, the Knots, Braids and Strands (KBS) algorithm prevents such physical entanglement.

The robotic NTM (U.S. Pat. Nos. 8,068,715, 8,463,091, 9,052,490, 9,052,465, 9,703,060) is also modular and enables optimal linear (N) scaling of non-blocking, all-fiber cross-connects by adding modules and NTMs. The non-blocking growth up to about 1,000 to 10,000+ interconnects of the NTM in a single tier provides significant practical advantages compared to the unfavorable $N^2$ scaling characteristic of optical cross-bar and photonic switches.

The NTM enables a wide range of use cases in large scale production data centers and telecom networks, including automated management, inventory, testing and reconfiguration of cross-connects. A typical manual fiber optic cable provisioning and/or reprovisioning process takes 1 to 8 labor hours to complete, including the time spent fixing dirty or damaged connectors, taking measurements to verify operation, inputting data and correcting records. Any problems that arise when a data center operator or service provider performs this process results in service delivery delay, increased labor expense and dissatisfied customers.

For example, the automation of interconnections in Multi-Tenant Data Centers (MTDCs), colocation centers, internet exchanges and carrier hotels are particularly valuable because these facilities operate a dense and highly complex interconnect fabric that evolves over time in unpredictable ways and is prone to an accumulation of errors that eventually leads to significant operational challenges. In addition, technicians with the required attention to detail to install, configure and troubleshoot physical network interconnections are challenging to hire. Technicians manually test insertion loss and signal transmission through each interconnect, and this often uncovers installation issues or recordkeeping errors. Coordination of technicians at both ends of a link in different cities, continents, etc. is sometimes required to fix these issues. Examples of using the NTM to address these challenges in numerous production applications are described in the descriptions which follows.

SUMMARY

The present invention is specified in the claims as well as in the below description. Preferred embodiments are particularly specified in the dependent claims and the description of various embodiments.

In some aspects, this invention discloses various systems and methods to configure and operate networks so that networks are more reliable, agile, and efficient. Improvements arise from the integration of NTMs, OTDRs, OPMs and PAs and the analysis of data collected by such devices. The NTM's Application Programming Interface (API) provides a streamlined approach to integrate physical automation into the operator's existing Operational Support Systems (OSS) and Business Support Systems (BSS).

An example of the automated management methods enabled by an NTM include the automated OTDR validation testing at the time of install for all fiber interconnects accessible to the one or more NTMs. Over the lifetime of a network, continued health monitoring and follow-on testing aids in the identification and replacement of non-functioning devices. This painstaking, meticulous process is technically complex, error prone and costly when performed manually.

In a second example, this new automation approach ensures the accuracy of the cabling testing process, connectivity records and measurement database. For instance, end-to-end physical links comprised of multiple physical cables can be tested automatically by the NTM in about 10 hours machine time (no labor time) for about 1,000 interconnects. This is in contrast to current manual approaches, which can take two technicians 0.5 hour each (1 person-hour total) to physically locate fiber endpoints, install launch and tail patch-cords, complete an OTDR scan, and finally interpret and record the data. For 1,000 interconnects, this corresponds to 1,000 hours.

As a result of applying automation to improve these processes, the agility and reliability of the network is enhanced, and execution times are reduced from days to minutes. Moreover, errors caused by manual configuration changes, mis-documentation and improperly cleaned fiber optic connectors are eliminated. These benefits are significant, because these activities incur significant operating expenses and more than 70% of network downtime is attributed to human error (rather than equipment failure).

Additional use cases that benefit from automation include service provisioning, automated troubleshooting, graceful migration/management of obsolescence cycle and multiple generations of equipment, and reconciliation of the fiber connectivity database. Moreover, network performance issues such as link congestion, oversubscription and low utilization can be monitored and corrected autonomously by activating automated physical reconfiguration.

An NTM enables full control and monitoring at layer-0 in coordination with higher network layers 1-7. This supports a holistic approach to data center operations with high-level traffic engineering services leveraging machine learning across all layers of the OSI stack. NTM automation capabilities provides multiple operational benefits, including:

Improves the management of physical layer fiber connectivity

Enables full health monitoring of the networks

Eliminates personnel deployment to a remote site

Permits scale

Enables new physical SDN physical network architectures and management applications Increases data center and network utilization.

These benefits are realized in a variety of use cases implemented with layer-0 automation, independent of the higher network layers 1-7.

An NTM system has a unique form, fit and function to enable service providers to incrementally scale high bandwidth, fiber optic network cross-connect fabrics from 144 duplex ports to more than 40K duplex ports, while maintaining the ability to provide fully non-blocking, any-to-any connectivity between all pairs of ports. The NTM-based system is fully automated, versus partially automated systems that require human intervention. Full automation eliminates the need to manually load fiber optic cables into a system and also eliminates the need to manually cut out and extract disconnected, stranded cables resulting from changes in the connections over time. Cross-connects can be reused/repeatedly reconfigured by a robot without entanglement or performance degradation. This eliminates the need for human intervention in the cross-connect provisioning, disconnecting, reprovisioning, and testing processes.

The low insertion loss of the NTM system relative to a manual patch-panel system provides an additional benefit in next generation multi-tiered Ethernet switch fabrics at 100G and 400G. The low loss NTM relaxes the power specifications (and reduces the cost) of high bandwidth optical transceivers, in "pluggable" or "co-packaged optics" form. Transceivers are becoming a significant expense in hyperscale data centers as the multi-tiered switch fabric grows. Low loss fiber interconnections are important to reduce the optical power requirement (hence the cost) of laser transceivers. The loss budget is typically 3.5 dB at 400G, a loss level that is challenging for current interconnect architectures using multiple cascaded manual patch-panels. The NTM's self-cleaning feature provides inherently low insertion loss and relaxes the loss budget for transceivers, and the OTDR feature enables excess insertion loss to be quickly mapped and remedied.

In some implementations, an automated NTM cross-connect system may be packaged within either a (1) 19-inch rack mount enclosure unit, (2) sealed, locked enclosure unit with integrated cable management, or (3) container with multiple interconnected units therein. An internal cleaning cartridge maintains clean, low loss connections over the system's 20+ year lifetime. The robot is maintenance-free, and all modules, including the robot, are easily replaced in the field without interrupting service. Highly reliable, fully latched LC-UPC connectors with an insertion loss of <0.15 dB and <−50 dB backreflection are provisioned and reconfigured by the robot. The unit may further include associated diagnostic equipment, such as an integrated optical power monitor, laser source(s) and an OTDR.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system for operating a data center physical fiber-optic interconnect fabric. The system includes a multiplicity of optical fiber signal carrying cables. The system also includes a software control system that generates a sequence of movement and sensing based instructions communicated to multiple distributed robotic fiber cross-connects such that they perform the specified robot service(s). The system also includes the multiple distributed robotic fiber cross-connects having internal robots configured to plug and unplug signal carrying cables in accordance with a non-entangling algorithm to enable the robot services, the software control system further configured to confirm, authenticate and track robot services and input corresponding records into a data file for storage.

Implementations may include the following features: The system where the robot services include one or more of: a fiber connection, a fiber disconnection, an optical power measurement, and/or an OTDR trace.

Another general aspect includes a fiber-optic interconnection system that includes at least one interconnection facility operated by an interconnection system provider serving a multiplicity of users and with a multiplicity of cages therein. The fiber-optic interconnection system also includes a fiber-optic interconnect fabric concurrently connecting the multiplicity of users residing within one or more of the multiplicity of cages, the fiber-optic interconnect fabric being controlled by a software management system and including a plurality of optical fibers connected to one or more robotic fiber-optic patch-panels. The system also includes a first cage of the multiplicity of cages for a first user of the fiber-optic interconnection system, the first cage having a terminated first subset of the plurality of optical fibers within. The system also includes a second cage of the multiplicity of cages for a second user of the fiber-optic interconnection system, the second cage having a terminated second subset of the plurality of optical fibers within. The system also includes the software management system configured to, in response to receiving a request for an interconnection between the first user and the second user, activate the one or more robotic fiber-optic patch-panels to connect, disconnect, and/or move a pre-populated, low insertion loss, passive, contiguous optical fiber connection between the first user and the second user.

Implementations may include one or more of the following features, alone or in various combination(s): The system where the contiguous optical fiber connection includes a first optical fiber of the first subset of the plurality of optical fibers, a second optical fiber of the second subset of the plurality of optical fibers, and the one or more robotic fiber-optic patch-panels connect the first and second optical fibers. The system where the software management system controls one or more OTDRs to test insertion loss and verify proper operation of the contiguous optical fiber connection. The system where the one or more robotic fiber-optic patch-panels includes a fiber-optic connector end-face cleaning device that cleans a polished fiber endface of fiber-optic connector prior to making a connection. The system where the fiber-optic connector end-face cleaning device creates a low insertion connection exhibiting less than 1 dB loss for optical signals passing through the connection. The system where a robot within the robotic fiber-optic patch-panels connects, disconnects, and/or moves the contiguous optical fiber connection without entangling other contiguous optical fiber connections, by routing the contiguous optical fiber connection according to a knots, braids and strands routing algorithm. Routing the contiguous optical fiber connection takes 0.5 to 5 minutes. The system where the software management system interconnects one or more visual fault finders at an NTM to illuminate an endcap of an optical fiber connector within a user cage and thereby properly identify the optical fiber connector. The system where the fiber-optic interconnect fabric also includes one or more photonic switches. The one or more photonic switches each add about 1 dB or more insertion loss and provide a photonic switching time of less than 1 second on a selected subset of interconnects.

Another general aspect includes a method of measuring one or more optical characteristics of a fiber-optic link with multiple serially arranged fiber-optic cable segments, each segment connected end-to-end. The method of measuring one or more optical characteristics also includes instructing the interconnect control system to measure one or more optical characteristics of a particular fiber-optic link. The method also includes determining a particular user port on the NTM to which the particular fiber-optic link is attached. The method also includes creating an internal fiber-optic strand connection between the particular user port and an available test port. The method also includes launching OTDR pulses down the particular fiber-optic link in a first direction and measuring a backreflected light signal to generate a first set of data.

Implementations may include one or more of the following features, alone or in various combination(s): The method where the method may include: processing the first set of data to determine insertion loss, back reflection and location of loss events along the particular fiber-optic link. The method where the particular fiber-optic link is a duplex fiber pair with transmit and receive fibers that terminates within a first customer cage at its first end. The method where the method may include connecting a tail cable through the NTM to receive the OTDR pulses returning from the first customer cage. The method where the particular fiber-optic link terminates within a second customer cage at its second end, with the NTM located along the particular fiber-optic link between the first end and the second end. The method where the method may include: connecting transmit and receive lines at the first end of the fiber-optic link within the first customer cage; connecting transmit and receive lines of a second end of the fiber-optic link within the second customer cage; launching OTDR pulses down the fiber-optic link in the opposite direction and measuring the back-reflected light signal to generate a second set of data; and processing the first set of data and the second set of data to determine insertion loss, back reflection, and location of loss events along the fiber-optic link. The method where the method may include connecting a tail cable through the NTM to receive the OTDR pulses returning from the second customer cage.

Another general aspect includes a method of visually identifying an end of a particular fiber-optic link with multiple fiber-optic cable segments connected end-to-end. The method also includes instructing the interconnect control system to identify a particular fiber-optic link endpoint. The method also includes connecting the particular fiber-optic link to a visual laser at an intermediate point connected to the NTM, such that a dust cap of the end of the particular fiber-optic link is illuminated.

Another general aspect includes an NTM pod including multiple NTMs preconfigured in a leaf-spine connection within a transportable container to provide any-to-any connectivity between pairs of external fibers.

Implementations may include one or more of the following features. The NTM pod where a fiber interface to the NTM pod may include one or more high fiber count optical fiber cables. The NTM pod where a fiber interface to the NTM pod may include one or more fiber-optic patch-panels.

Another general aspect includes an integrated system containing two NTMs within a shared volume that may include a first volume and a second volume, the first volume having a first robot module that reconfigures a first set of connectors there-below, and the second volume having a second robot module that reconfigures a second set of connectors there-above, wherein the first robot module and the second robot module have robot arms that travel substantially parallel to one another, and the connectors are at ends of fibers that emanate from a central backbone of low friction through guides with the fibers therein.

Implementations may include the integrated system where the first set of connectors may include about 500 to 1,000 connectors and the second set of connectors may include about 500 to 1,000 connectors.

Another general aspect includes a batch-processing system of elements including two partitions of interconnects, the two partitions of interconnects being a first partition of interconnects and a second partition of interconnects, the two partitions of interconnects in communication with a common optical fiber whose power in split into two separate first and second sets of fibers, wherein a first batch connected to first set of fibers requires the first partition of interconnects and a second batch connected to second set of fibers requires the second partition of interconnects, wherein the two partitions of interconnects can be transitioned therebetween by staging an inactive second partition of interconnects while the first partition of interconnects is active.

Implementations may include the batch-processing system of elements where the first partition of interconnects and the second partition of interconnects can be transitioned from their allocated to unallocated state in approximately (10 seconds)×(total number of interconnects).

Another general aspect includes a system including an SDN (software-defined networking) controller that subscribes to an average packet throughput for each port and provides a measure of utilization. The system also includes based on this data for each link, the SDN controller instructs an NTM system to reconfigure interconnects in a manner to combine traffic on links with less than a minimum utilization threshold onto a single link so that a combined utilization is less than or equal to a maximum utilization threshold to free up available ports. The system also includes traffic is moved off of links with more than the maximum utilization threshold onto a new parallel link, where. The system also includes after this process is completed, utilization of links lies between the minimum utilization threshold and the maximum utilization threshold.

Implementations may include the system where the minimum utilization threshold is 40% and the maximum utilization threshold is 60%.

Other embodiments of these various aspects include corresponding computer systems, apparatus, and computer programs recorded on one or more computer storage devices, each configured to perform the actions of the methods.

Below is a list of embodiments. System embodiments will be indicated with a letter "S." Whenever such embodiments are referred to, this will be done by referring to "S" embodiments. Process (or method) embodiments will be indicated with a letter "P." Whenever such embodiments are referred to, this will be done by referring to "P" embodiments.

S1. A system of operating a data center physical fiber-optic interconnect fabric, the system offering automated network services including some or all of: provisioning, verification, audit, troubleshooting, and/or authentification using distributed robotic fiber cross-connects, the system comprising:

a multiplicity of optical fiber signal carrying cables; and a software control system that generates a sequence of movement and sensing based instructions communicated to multiple distributed robotic fiber cross-connects to perform robot services; and the multiple distributed robotic fiber cross-connects having internal robots configured to plug and unplug signal carrying cables in accordance with a non-entangling algorithm to enable said robot services, the software control system further configured to confirm, authenticate and track robot services and input them into a data file for storage.

S2. The system of embodiment(s) S1 wherein the robot services include one or more of: a fiber connection; a fiber disconnection; an optical power measurement; and/or an optical time-domain reflectometer (OTDR) trace.

S3. A fiber-optic interconnection system comprising at least one interconnection facility operated by an interconnection system provider serving a multiplicity of users and with a multiplicity of cages therein, the fiber-optic interconnection system comprising:

a fiber-optic interconnect fabric concurrently connecting the multiplicity of users residing within one or more of the multiplicity of cages, the fiber-optic interconnect fabric being controlled by a software management system, and including a plurality of optical fibers connected to one or more robotic fiber-optic patch-panels;

a first cage of the multiplicity of cages for a first user of the fiber-optic interconnection system, the first cage having a terminated first subset of the plurality of optical fibers within; and a second cage of the multiplicity of cages for a second user of the fiber-optic interconnection system, the second cage having a terminated second subset of the plurality of optical fibers within; and the software management system configured to, in response to receiving a request for an interconnection between the first user and the second user, activate the one or more robotic fiber-optic patch-panels to connect, disconnect, and/or move a pre-populated, low insertion loss, passive, contiguous optical fiber connection between the first user and the second user.

S4. The fiber-optic interconnection system of embodiment(s) S3, wherein the contiguous optical fiber connection includes a first optical fiber of the first subset of the plurality of optical fibers, a second optical fiber of the second subset of the plurality of optical fibers, and the one or more robotic fiber-optic patch-panels connect the first and second optical fibers.

S5. The fiber-optic interconnection system of any of embodiment(s) S3-S4, wherein the software management system controls one or more optical time-domain reflectometers (OTDRs) to test insertion loss and verify proper operation of the contiguous optical fiber connection.

S6. The fiber-optic interconnection system of any of embodiment(s) S3-S5, wherein the one or more robotic fiber-optic patch-panels includes a fiber-optic connector end-face cleaning device that cleans a polished fiber endface of fiber-optic connector prior to making a connection.

S7. The fiber-optic interconnection system of any of embodiment(s) S3-S6, wherein a robot within the robotic fiber-optic patch-panels connects, disconnects, and/or moves the contiguous optical fiber connection without entangling other contiguous optical fiber connections, by routing the contiguous optical fiber connection according to a knots, braids and strands routing algorithm.

S8. The fiber-optic interconnection system of any of embodiment(s) S3-S7, wherein the software management system interconnects one or more visual fault finders at an NTM (Network Topology Manager) to illuminate an endcap of an optical fiber connector within a user cage and thereby properly identify the optical fiber connector.

S9. The fiber-optic interconnection system of any of embodiment(s) S6-S8, wherein the fiber-optic connector end-face cleaning device creates a low insertion connection exhibiting less than 1 dB loss for optical signals passing through the connection.

S10. The fiber-optic interconnection system of any of embodiment(s) S3-S9, wherein routing the contiguous optical fiber connection takes 0.5 to 5 minutes.

S11. The fiber-optic interconnection system of any of embodiment(s) S3-S10, wherein the fiber-optic interconnect fabric also includes one or more photonic switches.

S12. The fiber-optic interconnection system of any of embodiment(s) S11, wherein the one or more photonic switches each add about 1 dB or more insertion loss and provide a photonic switching time of less than 1 second on a selected subset of interconnects.

P13. A method of measuring one or more optical characteristics of a fiber-optic link with multiple serially arranged fiber-optic cable segments and connected end-to-end, within a dynamic fiber-optic interconnect fabric managed by an interconnect control system, with one of more of the fiber-optic cable segments connected to a multiplicity of user ports of an NTM (Network Topology Manager), the NTM containing a multiplicity of reconfigurable internal fiber-optic strands, each with a fixed connector at one end and a moveable connector at the other end, the moveable connector being movable between one or more test ports and the multiplicity of user ports, each port associated with an external receptacle and internal receptacle joined midway along a central axis, and further with an OTDR (Optical Time-Domain Reflectometer) connected to one or more external test ports on the NTM through fiber-optic test cables, with any internal fiber-optic connector able to be moved and inserted in an internal side of any port, the method comprising:

instructing the interconnect control system to measure one or more optical characteristics of a particular fiber-optic link;

determining a particular user port on the NTM to which the particular fiber-optic link is attached;

creating an internal fiber-optic strand connection between the particular user port and an available test port; and launching OTDR pulses down the particular fiber-optic link in a first direction and measuring a backreflected light signal to generate a first set of data.

P14. The method of embodiment(s) P13, further comprising processing the first set of data to determine insertion loss, back reflection and location of loss events along the particular fiber-optic link.

P15. The method of any of embodiment(s) P13-P14, wherein the particular fiber-optic link is a duplex fiber pair with transmit and receive fibers that terminates within a first customer cage at its first end.

P16. The method of any of embodiment(s) P13-P15, further comprising connecting a tail cable through the NTM to receive the OTDR pulses returning from the first customer cage.

P17. The method of any of embodiment(s) P13-P16, wherein the particular fiber-optic link terminates within a second customer cage at its second end, with the NTM located along the particular fiber-optic link between the first end and the second end.

P18. The method of any of embodiment(s) P13-P17, further comprising: connecting transmit and receive lines at the first end of the fiber-optic link within the first customer cage;

connecting transmit and receive lines of a second end of the fiber-optic link within the second customer cage;

launching OTDR pulses down the fiber-optic link in the opposite direction and measuring the backreflected light signal to generate a second set of data; and processing the first set of data and the second set of data to determine insertion loss, back reflection, and location of loss events along the fiber-optic link.

P19. The method of any of embodiment(s) P13-P18, further comprising: connecting a tail cable through the NTM to receive the OTDR pulses returning from the second customer cage.

P20. A method of visually identifying an end of a particular fiber-optic link with multiple fiber-optic cable segments connected end-to-end, within a dynamic fiber-optic interconnect fabric managed by an interconnect control system, with one of more of the fiber-optic cable segments connected to user ports of an NTM (Network Topology Manager), the NTM containing a multiplicity of reconfigurable internal fiber-optic strands with a fixed connectors at one end and a moveable connector at an other end, a movable connector being movable between one or more test ports and the user ports, each port associated with an external receptacle and internal receptacle joined midway along a central axis, and further with an OTDR (Optical Time-Domain Reflectometer) connected to one or more external test ports on the NTM through fiber-optic test cables, with any internal fiber-optic connectors able to be moved and inserted in an internal side of any port, the method comprising:

instructing the interconnect control system to identify a particular fiber-optic link endpoint; and connecting the particular fiber-optic link to a visual laser at an intermediate point connected to the NTM, such that a dust cap of the end of the particular fiber-optic link is illuminated.

S21. An NTM (Network Topology Manager) pod comprising multiple NTMs preconfigured in a leaf-spine connection within a transportable container to provide any-to-any connectivity between pairs of external fibers.

S22. The NTM pod of embodiment(s) S21, wherein a fiber interface to the NTM Pod comprises one or more high fiber count optical fiber cables.

S23. The NTM pod of any of embodiment(s) S21-S22, wherein a fiber interface to the NTM Pod comprises one or more fiber-optic patch-panels.

S24. An integrated system containing two NTMs (Network Topology Managers) within a shared volume comprising a first volume and a second volume, the first volume having a first robot module that reconfigures a first set of connectors there-below, and the second volume having a second robot module that reconfigures a second set of connectors there-above, wherein the first robot module and the second robot module have robot arms that travel substantially parallel to one another, and the connectors are at ends of fibers that emanate from a central one-dimensional backbone of low friction through guides with the fibers therein.

S25. The integrated system of embodiment(s) S24, wherein the first set of connectors comprises about 500 to 1,000 connectors and the second set of connectors comprises about 500 to 1,000 connectors.

S26. A batch-processing system of elements, including two partitions of interconnects, the two partitions of interconnects being a first partition of interconnects and a second partition of interconnects, the two partitions of interconnects in communication with a common optical fiber whose power in split into two separate first and second sets of fibers, wherein a first batch connected to first set of fibers requires the first partition of interconnects and a second batch connected to second set of fibers requires the second partition of interconnects, wherein the two partitions of interconnects can be transitioned therebetween by staging an inactive second partition of interconnects while the first partition of interconnects is active.

S27. The batch-processing system of elements of embodiment(s) S26, wherein the first partition of interconnects and the second partition of interconnects can be transitioned from their allocated to unallocated state in approximately (10 seconds)×(total number of interconnects).

S28. A system including an SDN (Software-defined Networking) controller that subscribes to an average packet throughput for each port and provides a measure of utilization, wherein based on this data for each link, the SDN controller instructs an NTM (Network Topology Manager) system to reconfigure interconnects in a manner to combine traffic on links with less than a minimum utilization threshold onto a single link so that a combined utilization is less than or equal to a maximum utilization threshold to free up available ports; and traffic is moved off of links with more than the maximum utilization threshold onto a new parallel link, wherein, after this process is completed, utilization of links lies between the minimum utilization threshold and the maximum utilization threshold.

S29. The system of any of embodiment(s) S28, wherein the minimum utilization threshold is about 40% and the maximum utilization threshold is about 60%.

Below is a list of article of manufacture embodiments. Those will be indicated with a letter "A."

A30. An article of manufacture comprising non-transitory computer-readable media having computer-readable instructions stored thereon, the computer readable instructions including instructions for implementing a computer-implemented method, said method operable on a device comprising hardware including memory and at least one processor and running a service on said hardware, said method comprising the method of any one of the preceding method aspects or embodiments.

Below is a list of device embodiments. Those will be indicated with a letter "D."

D31. A device, comprising:
(a) hardware including memory and at least one processor, and
(b) a service running on said hardware, wherein said service is configured to: perform the method of any one of the preceding method aspects or embodiments.

The above features along with additional details of the invention are described further in the examples herein, which are intended to further illustrate the invention but are not intended to limit its scope in any way.

DESCRIPTION OF DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIG. 5A is a flow diagram of an exemplary automated process of installing new fiber interconnects;

FIG. 13 depicts a multiplicity of enclosed, secure NTMs with interconnects therebetween (not shown) configured as a self-contained Meet-Me-Room interconnect system;

FIG. 14 illustrates aspects of an example process flow for on-demand, automated MMR provisioning according to exemplary embodiments hereof;

FIGS. 15 and 16 are flowcharts of topology discovery and network optimization, respectively, according to exemplary embodiments hereof;

FIGS. 24A-24B are top view of different NTM pod configurations, according to exemplary embodiments hereof, with multiple NTM elements of either 1,008 or 2,016 interconnects each, arranged within a 30'×10' container with a central access aisle;

FIG. 28A illustrates a multi-NTM configuration according to exemplary embodiments hereof, in which each signal channel is split into two parallel channels A and B;

FIG. 29 is a flow chart of the batch-processing process according to exemplary embodiments hereof to rapidly switch between unallocated and allocated interconnect states.

Glossary & Abbreviations

As used herein, including in the claims, unless used or described otherwise, the following terms or abbreviations have the following meanings:

5G means Next generation mobile services (e.g., 1 GBps downloads).

Access Network means portion of network connecting directly to subscribers in neighborhoods.

API means Application Programming Interface.

BERT means Bit Error Rate Tester.

Brownfield means existing data center late in technology obsolescence cycle.

CO means Central Office.

Configuration means process to establish initial state of fiber interconnections within a DC.

Cross-Connect means short jumper cables between one or more adjacent patch-panels used to provision connections between network elements.

DC means Data Center.

Deprovision means remove cross-connect between network elements.

DPI means Deep Packet Inspection.

Edge Data Center means smaller, decentralized Data Centers in vicinity of end users at mobile access points.

ESW means Edge Switch.

FDH means Fiber Distribution Hub.

FSW means Fabric Switch.

Greenfield means New data center.

Insertion Loss means undesirable degradation of the optical signal power level.

Interconnect means fiber optic cables to enable devices such as servers to communicate with one another at high speeds.

IoT means Internet of Things.

KBS Algorithm means Knots, Braids, Strands Algorithm.

Latching means maintaining connectivity even during power or equipment failure.

Layer-0 means physical Layer of network interconnections.

MMR means Meet-Me-Room.

MTDC means Multi-tenant Data Center.

Non-Blocking means ability to create arbitrary interconnections between any two points.

NTM means Network Topology Manager.

OCDR means Optical Coherence Domain Reflectometer.

OLT means Optical Line Terminal.

OPM means Optical Power Meter.

OSI means Open Systems Interconnection.

OSP means Outside Plant.

OTDR means Optical Time-Domain Reflectometer to test optical fiber cables.

PA means Packet Analyzer.

Port means the physical communication interface on a network element.

Provision means establish cross-connect between network elements.

QR Code means Quick Response Code.

Reconfiguration means feature of NTM in which robot reconfigures cross-connections.

Reprovision means Change cross-connect between network elements.

RFID means Radio Frequency Identification.

SDN means Software-defined Networking.

SSW means Spine Switch.

Stranded Cables means fiber optical cables that are eventually left unused due to poor recordkeeping and lack of traceability.

Tap Monitor means fiber optic components that splits a fraction of optical signal onto a separate fiber.

ToR means Top of Rack.

Truck rolls means Deployment of costly service vehicles to perform on-site reconfiguration, troubleshooting and repair.

Tx/Rx means Transmit/Receive.

WAN means Wide Area Network.

DETAILED DESCRIPTION OF PRESENTLY PREFERRED EXEMPLARY EMBODIMENTS

Figure 1:
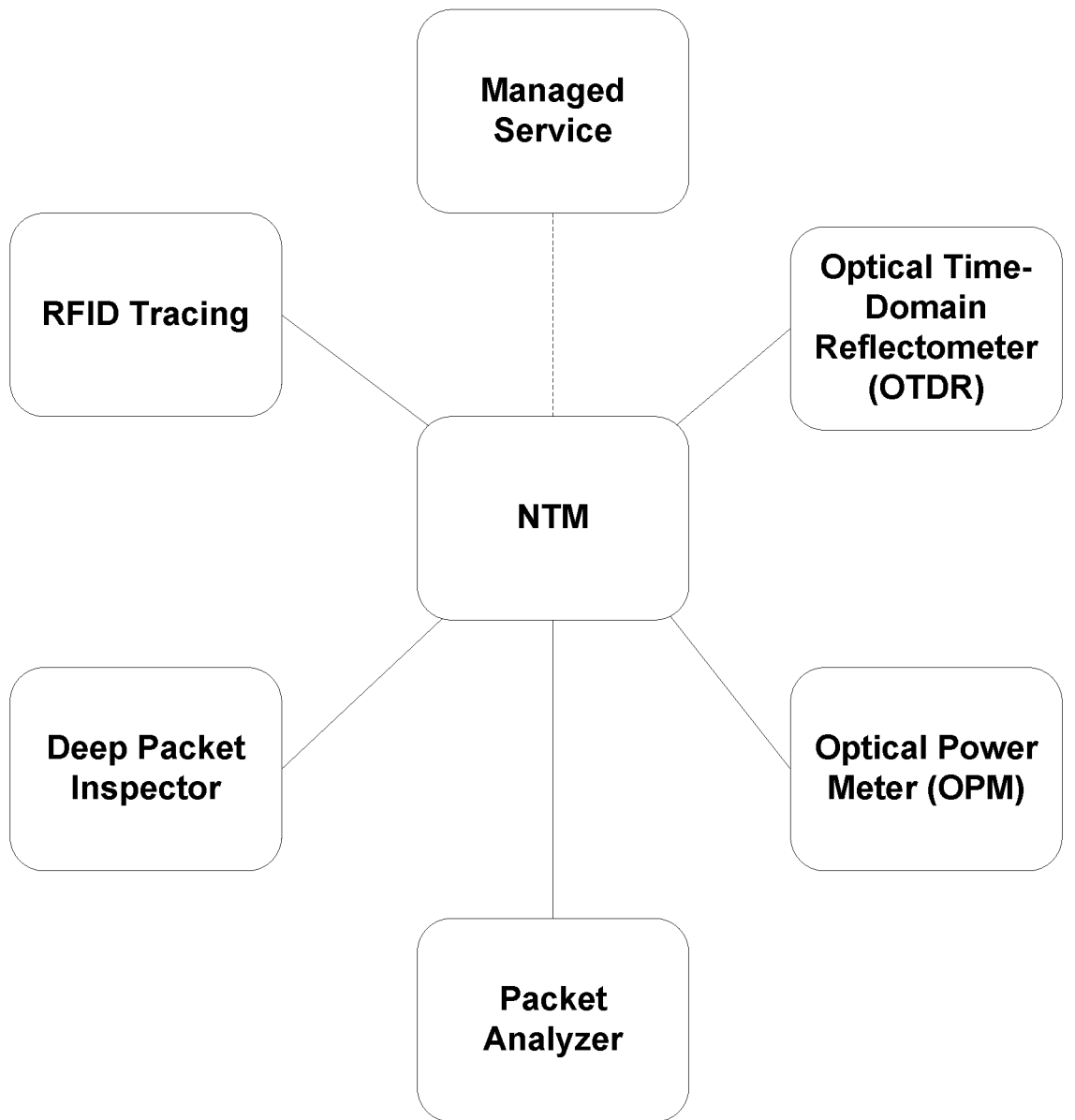
FIG. 1 is a diagram illustrating different classes of instrumentation that may be accessed and controlled by an NTM according to exemplary embodiments hereof.

NTMs according to exemplary embodiments hereof may access and control various classes of instrumentation to configure and operate networks so that networks are more reliable, agile, and efficient. Improvements arise from the integration of NTMs, OTDRs, OPMs and PAs and the analysis of data collected by such devices. The NTM's Application Programming Interface (API) provides a streamlined approach to integrate physical automation into the operator's existing Operational Support Systems (OSS) and Business Support Systems (BSS) (see, e.g., FIG. 1).

Systems and processes to automate network management operations, particularly those at large scale, are disclosed, including in the examples below. These include:

(1) Accelerated installation, inventory, OTDR validation, service delivery (2) Network testing and troubleshooting (3) Graceful migration and management of technology lifecycles (4) Rapid provisioning, deprovisioning and reprovisioning of network services (5) Automated meet-me-room and premium cross-connect service in colocation centers (6) Enhanced network availability and resiliency thru agile layer-0

(7) Agile connectivity in large scale layer 2, 3 switch fabric to enhance bandwidth capacity (8) Flexible interconnection of heterogeneous server and switch environments to improve utilization (9) Automation and software control to enhance cybersecurity and harden the network

(10) Advanced health monitoring and analytics through automated scheduling and time sharing to improve data center availability and resilience

(11) Large scale, containerized cross-connect pods to simplify and accelerate deployment

(12) High port density NTM utilizing a pair of robots and interconnect sections

(13) Fast robotic execution of batches of interconnect reconfigurations.

Figure 2:
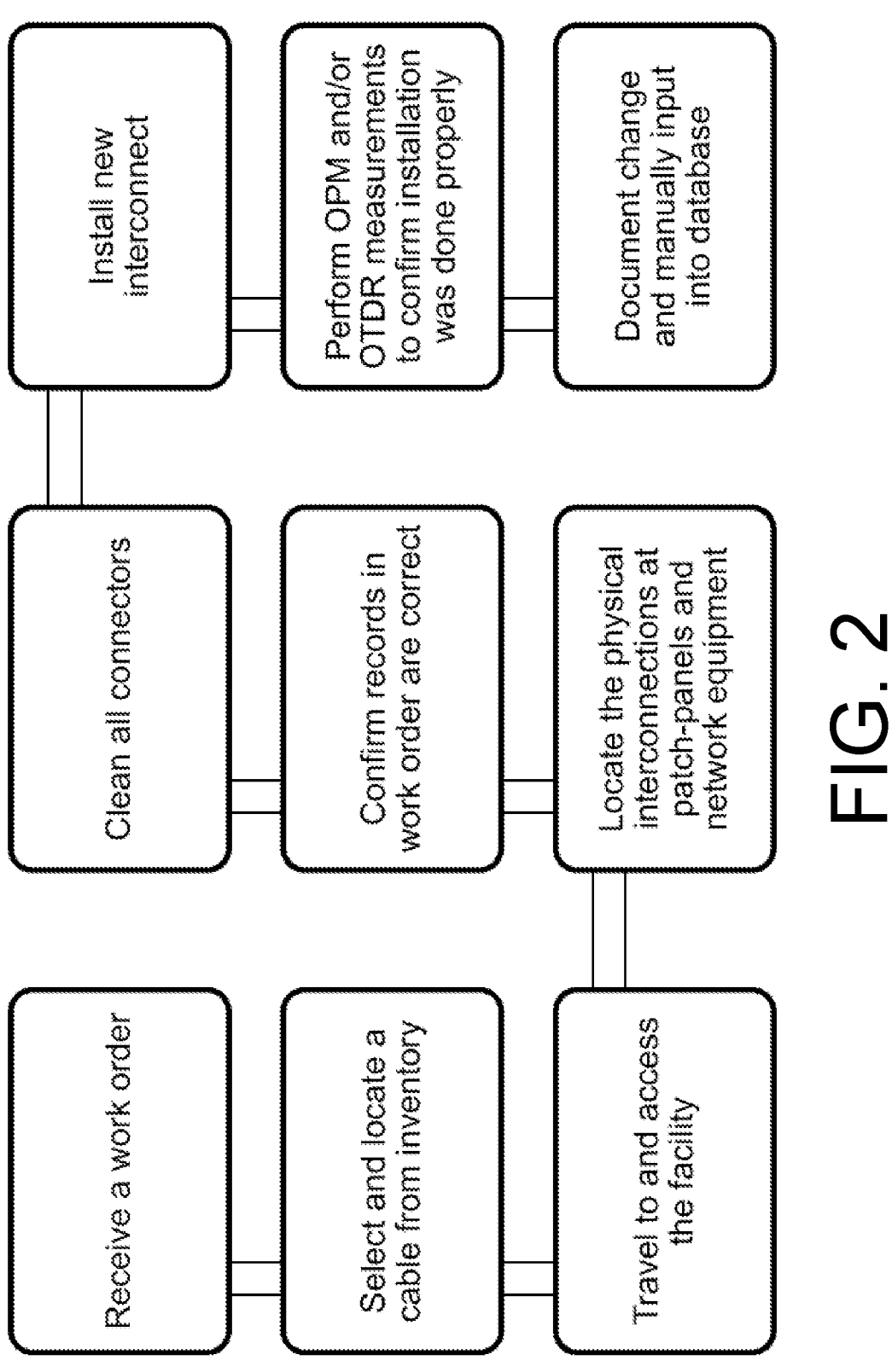
FIG. 2 is an example of a typical manual fiber reconfiguration process.

FIG. 2 shows an example of a typical manual fiber reconfiguration process. According to embodiments hereof, including those in the above examples, a variety of NTM systems configured in one or more different form factors automates the configuration, monitoring and troubleshooting of optical fiber interconnects. A programmable, intelligent (i.e., self-monitoring) fiber interconnect fabric with optical performance (namely the end-to-end optical insertion loss) equal to or better than manual patch-panels, with an insertion loss of typically less than 0.5 dB, is thereby realized. In embodiments hereof, the automated cross-connect hardware may, for example, be housed within a (1) 19-inch rack mount enclosure unit, or (2) a sealed, locked enclosure unit with integrated cable management, or (3) a container with multiple interconnected units therein.

Figure 3A:
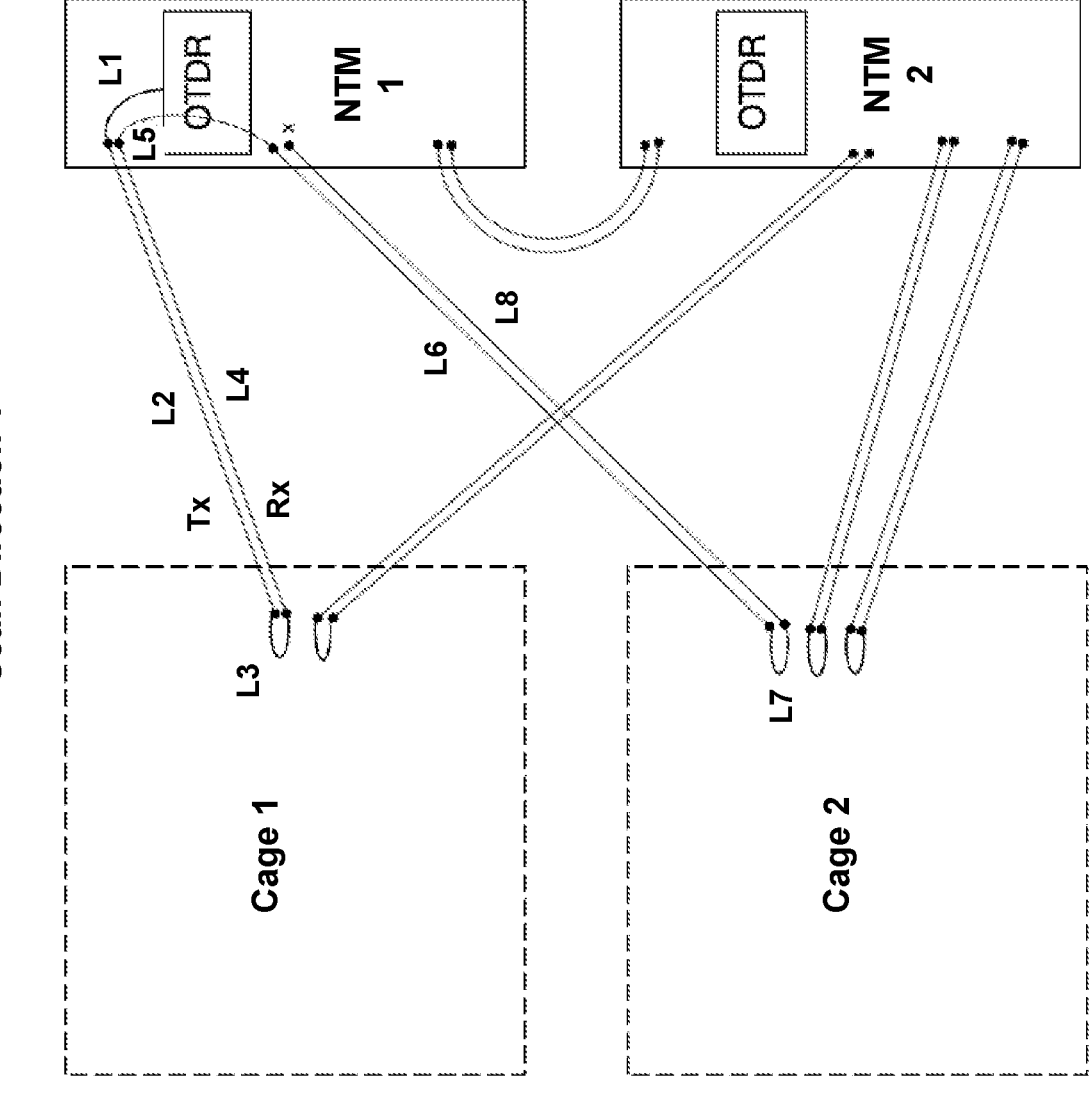
FIGS. 3A-3B and 4A-4B depict aspects of exemplary embodiments hereof with a fiber interconnection fabric.
Figure 3B:
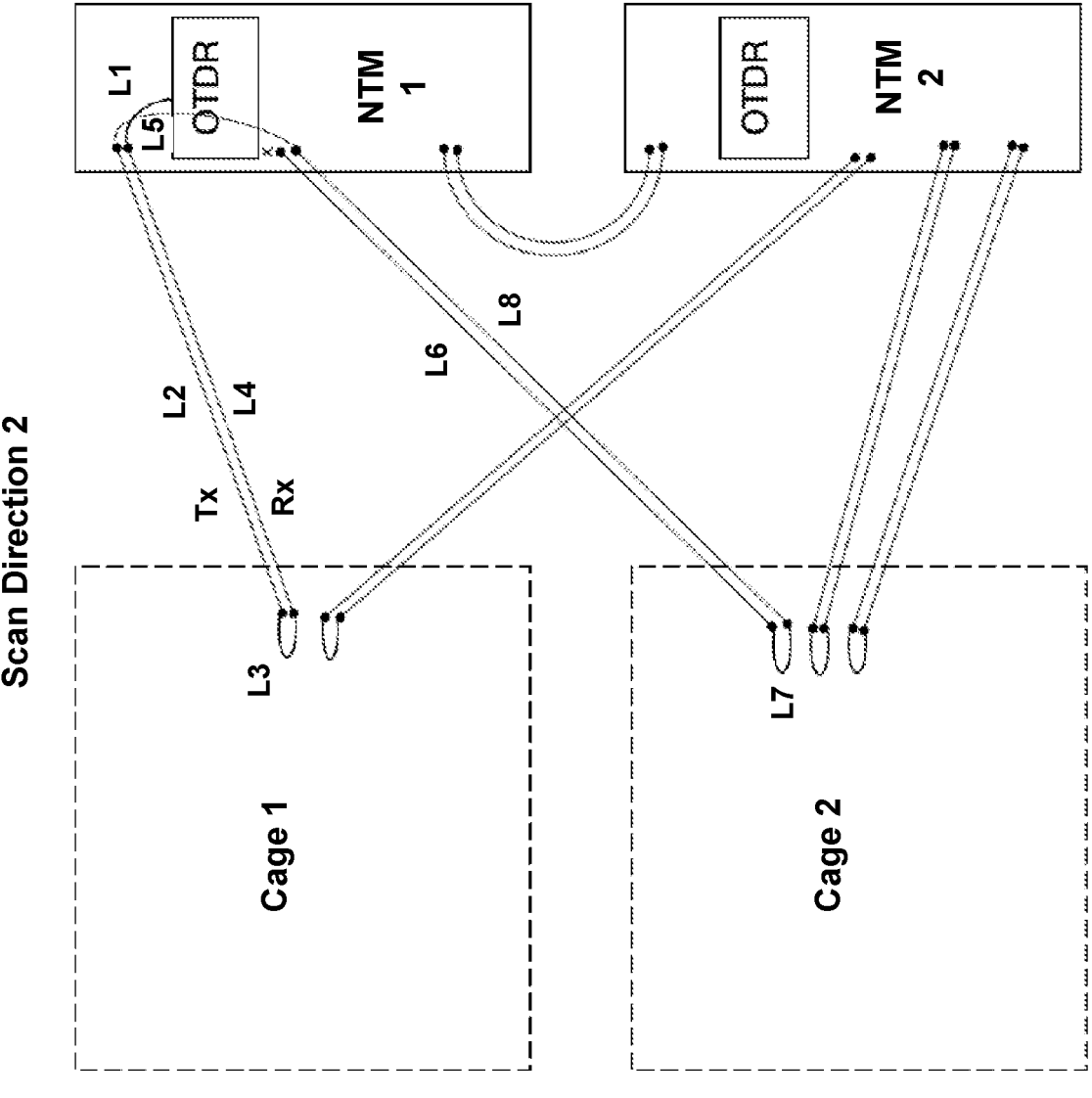

FIG. 3A is a diagram of a fiber interconnection fabric connecting two users in a MTDC, wherein one of the interconnects within the fabric, comprised of a duplex fiber pair, is scanned using NTMs, OTDRs and/or OCDRs, wherein the scan is performed in a first direction. FIG. 3B is a diagram of the same interconnect of FIG. 3A, scanned using NTMs, OTDRs and/or OCDRs in a second configuration, wherein the scan is performed in the opposite direction through the same serial arrangement of fiber segments, then processing/merging data from both the forward and backwards scans for higher accuracy.

Figure 4A:
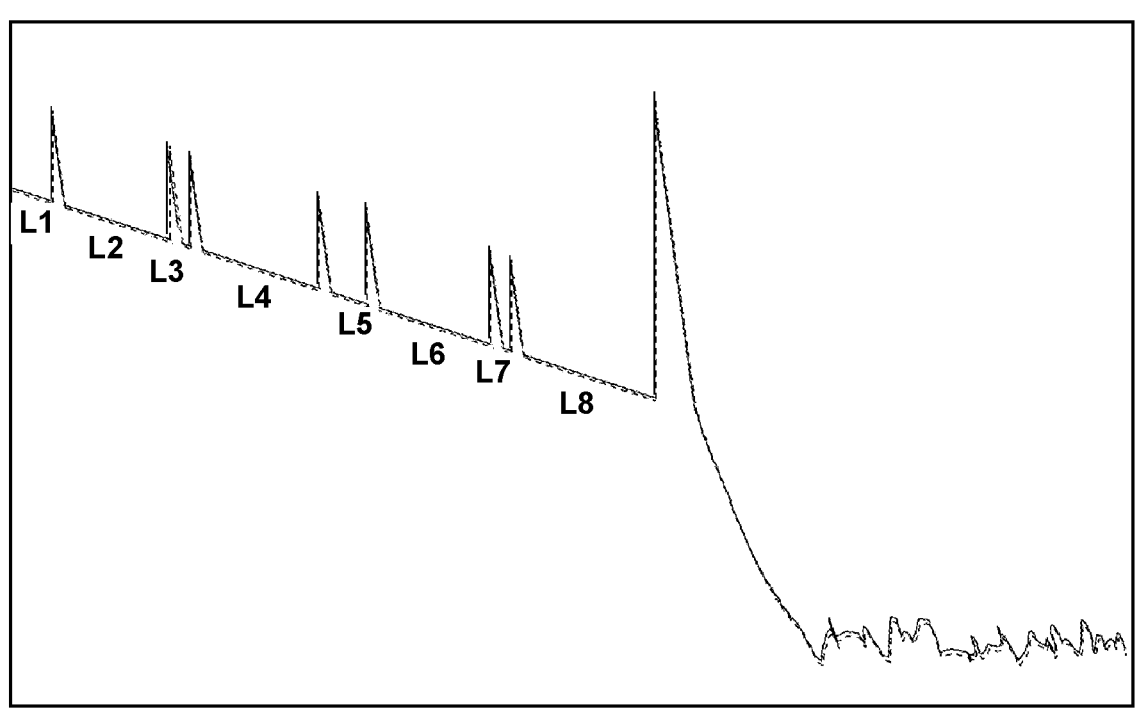
Figure 4B:
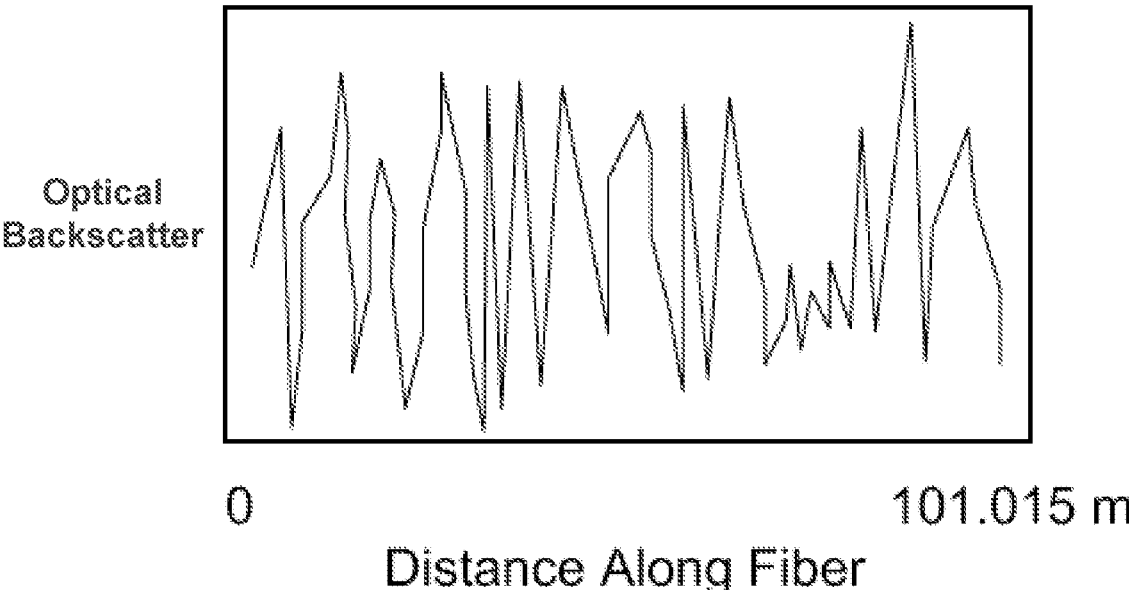

FIG. 4A illustrates an overlay of the OTDR scans for the first and second configurations, and FIG. 4B illustrates an example optical reflection scan along a length of fiber optic cable.

Example 1: Accelerated Installation, Inventory, OTDR Validation, Service Delivery An exemplary automated physical layer system and a method of provisioning said system using one or more NTMs is described. This system and method accelerate installation, inventory recordkeeping, OTDR validation, and importantly, service delivery. In conventional systems, the non-automated management of patch-panels, cross-connects, network devices and the interconnects therebetween involves a slow, labor-intensive installation process that is complicated by three primary issues:

1) Bends in fiber optic cables cause insertion loss that can lead to intermittent link failures 2) Improper cleaning of fiber optic connectors causes insertion loss that contributes to intermittent link failure 3) Swapped Transmit and Receive (Tx/Rx) connectors result in link failure and requires repair by an on-site technician.

FIG. 5A is a flow diagram of an exemplary automated process 500 of installing new fiber interconnects. The NTM is installed (at 502), and the NTM cleans all the internal connectors (at 504). Then the installer must clean, inspect, and install external cables (at 506). The installation of external cables is generally performed one-time during the initial installation and is subsequently managed by the NTM over the lifecycle of the cables. In addition, temporary loopbacks are installed at the far ends of each external cable (at 508) by connecting, for example, the Tx and Rx connectors together or by installing a jumper cable therebetween. Next (at 510), the NTM performs reflectometer scans of each external cable, through loopbacks, and these scans are saved to a database (at 512). Then (at 514) these data are processed to determine the length of each cable, insertion loss, reflections, etc. The NTM may, optionally, also determine a unique backscatter/length signature of each cable (at 516).

The magnitude of problems associated with prior methods is significant. A typical production data center has on the order of 100,000 cables connected to about the same number of optical transceiver ports. Depending on the technology and manufacturer, transceiver ports can have a failure rate of about 5% per year and failed ports often are allowed to accumulate before being replaced. For some network operators, incorrectly installed swapped transmit and receive fibers have been noted for about 50% of new interconnections. Incorrect installation delays the provisioning of networks (and hence revenue generating services) and adds significant labor cost due to the troubleshooting process.

Figure 5B:
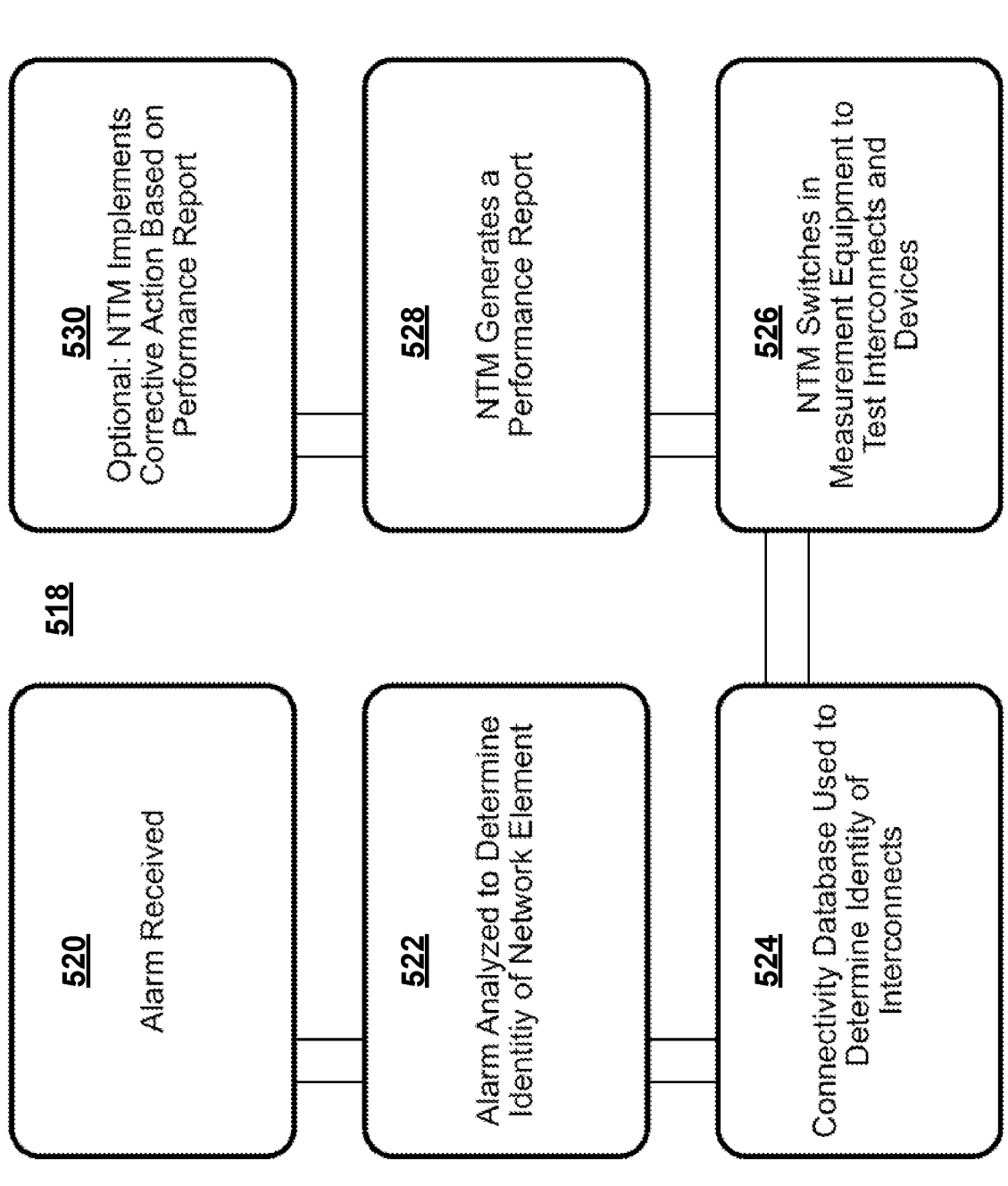
FIG. 5B is a flow diagram of an exemplary automated process of troubleshooting the network interconnections after they are installed.

FIG. 5B is a flow diagram of an exemplary automated process 518 of troubleshooting the network interconnections after they are installed. An alarm is received (at 520) and the alarm is analyzed (at 522) to determine the identity (identities) of the network element(s) that triggered or caused the alarm. A connectivity database is used (at 524) to determine the identity of the interconnects. Next (at 526), the NTM switches in measurement equipment to test interconnects and devices. The NTM then generates a performance report (at 528). The NTM may, optionally, implement corrective action based on the performance report (at 530).

Manual approaches to record and track fiber connectivity (i.e., which cable is plugged into what device, patch-panel, etc.) include barcodes, QR codes, labels, and RFID tags. However, offline databases of fiber connectivity inevitably get out of sync with the true state of the network infrastructure because technicians introduce errors, even if the records were 100% accurate at the time of installation. Human error is common during database input, reconfiguration, and repair. It is estimated that 10-20% of connectivity records are incorrect for a typical network operator.

As a consequence of such errors, a further operational challenge is the accumulation of stranded cables whose connectivity at both ends is unknown. These stranded cables fill overhead and under-floor cable trays and block air flow. For instance, the sub-floor plenum used to distribute cooling may become obstructed by cables that are no longer in use. The number of stranded cables (not to mention the costly stranded pluggable optics and line cards) can be sufficiently large that the overall cooling capacity of the data center is compromised.

In contrast, for the systems and methods described herein, NTM(s) robotically provision interconnects without human intervention, recording the connectivity history as well as the current physical interconnect state to the level of individual cables and connectors. As a result, cable inventory records are machine accurate. The database is automatically synchronized to the reality of the fiber network, and subsequent Moves, Adds and Changes (MACS) executed by robots are accurately captured by the system and archived.

In a further example, the NTM system stores the history of optical power, OTDR loss events and any other monitoring functions within its fiber connectivity database. It takes about 30 minutes on average to manually OTDR test, troubleshoot and validate each interconnect when a large number are tested in sequence at the time of initial installation (when inventory errors are initially at their lowest percentage). In this case, automation saves about five hundred hours of technician labor to provision 1,000 interconnects. After the initial installation, when only a small number of cables are provisioned and re-provisioned, the labor time typically increases to an average of greater than 1 hour per process. As more data is accumulated over time and used to train a machine learning system, future issues can be anticipated and fixed proactively.

Figures 6A, 6B:
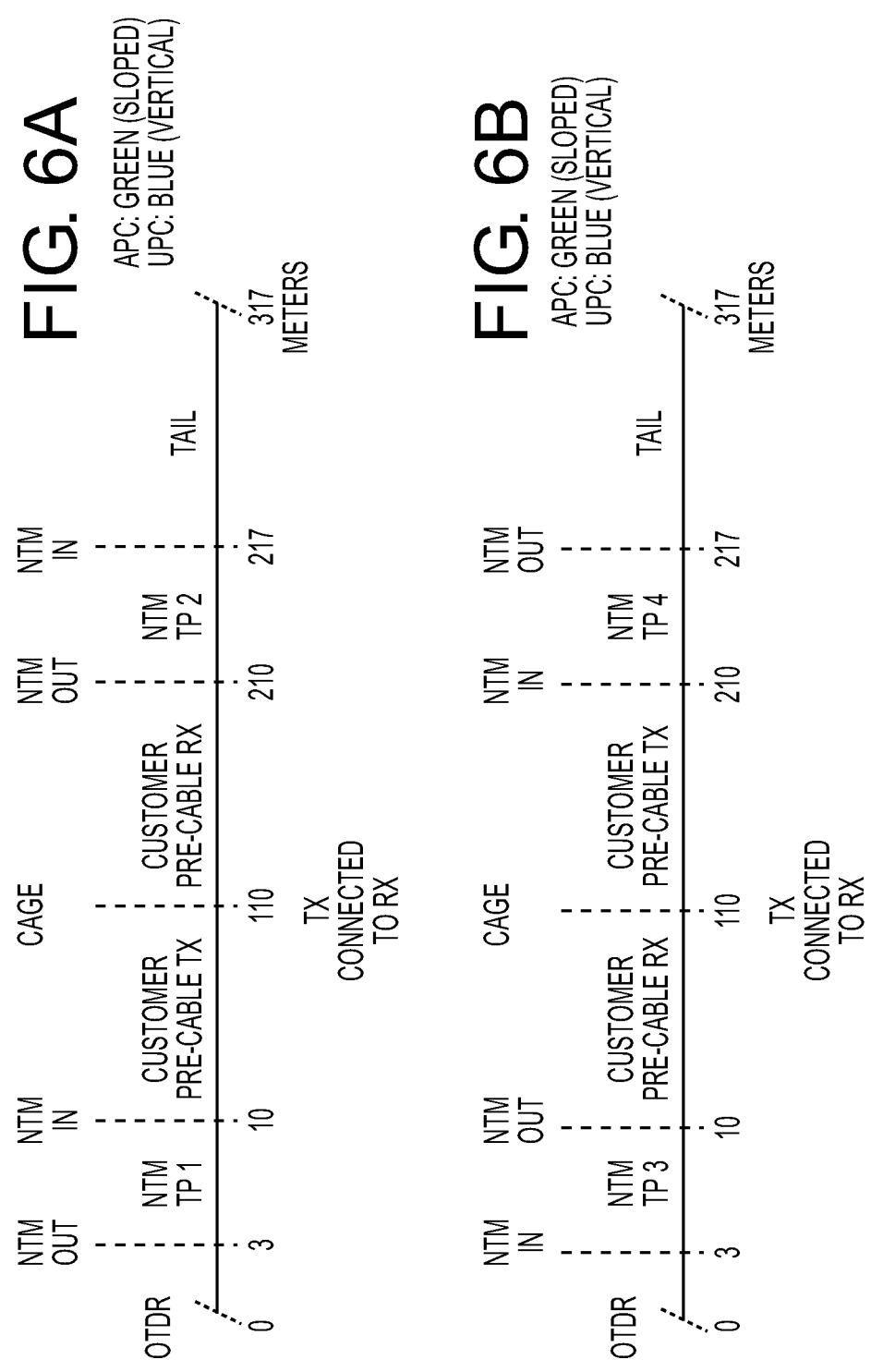
FIG. 6A is a diagram of an exemplary initial validation of pre-cabling to a cage in a MTDC for an OTDR pulse traveling in a first direction.
FIG. 6B is a diagram of an exemplary initial validation of a cross-connect between a cage 1 and a cage 2 for an OTDR pulse traveling in an opposite direction.

FIG. 6A is a diagram of an initial OTDR validation step to measure the NTM and pre-cabling from the MMR to a customer cage in a MTDC. The length of cable from the customer's cage to the NTM serving as an MMR is 100 m in this example and the NTM selects an OTDR test port so that the pulse travels in a first direction. The Tx and Rx cables for a particular duplex pair entering each customer's cage are connected together (e.g., looped-back) to allow light to pass into the cage on one fiber and out of the cage on the other fiber. In general, the length of this cable is in the range of 1 m to 10 km, depending on the data center application (e.g., single small DC, large DC, campus with multiple DCs).

In a further example, the NTM(s) not only connects the OTDR to the link being measured, but it also connects a "tail cable" at the end of link to enable an accurate end-to-end insertion loss measurement for the final Rx pre-cable segment in the sequence. The tail cable is typically a 30 to 1000 m patch-cord. In a specific example, the distal end of tail cable is terminated in an APC connector for low backreflection even when the distal end remains disconnected.

FIG. 6B is a diagram of the initial validation of pre-cabling to a cage in a MTDC for an OTDR pulse traveling in the opposite direction to that depicted in FIG. 6A. The traces taken from these two opposite directions are merged to provide a more accurate measurement of insertion loss along the cable, compensating for issues such as fiber Rayleigh coefficient mismatch and mode-field diameter mismatch between dissimilar cables.

Figures 7A, 7B:
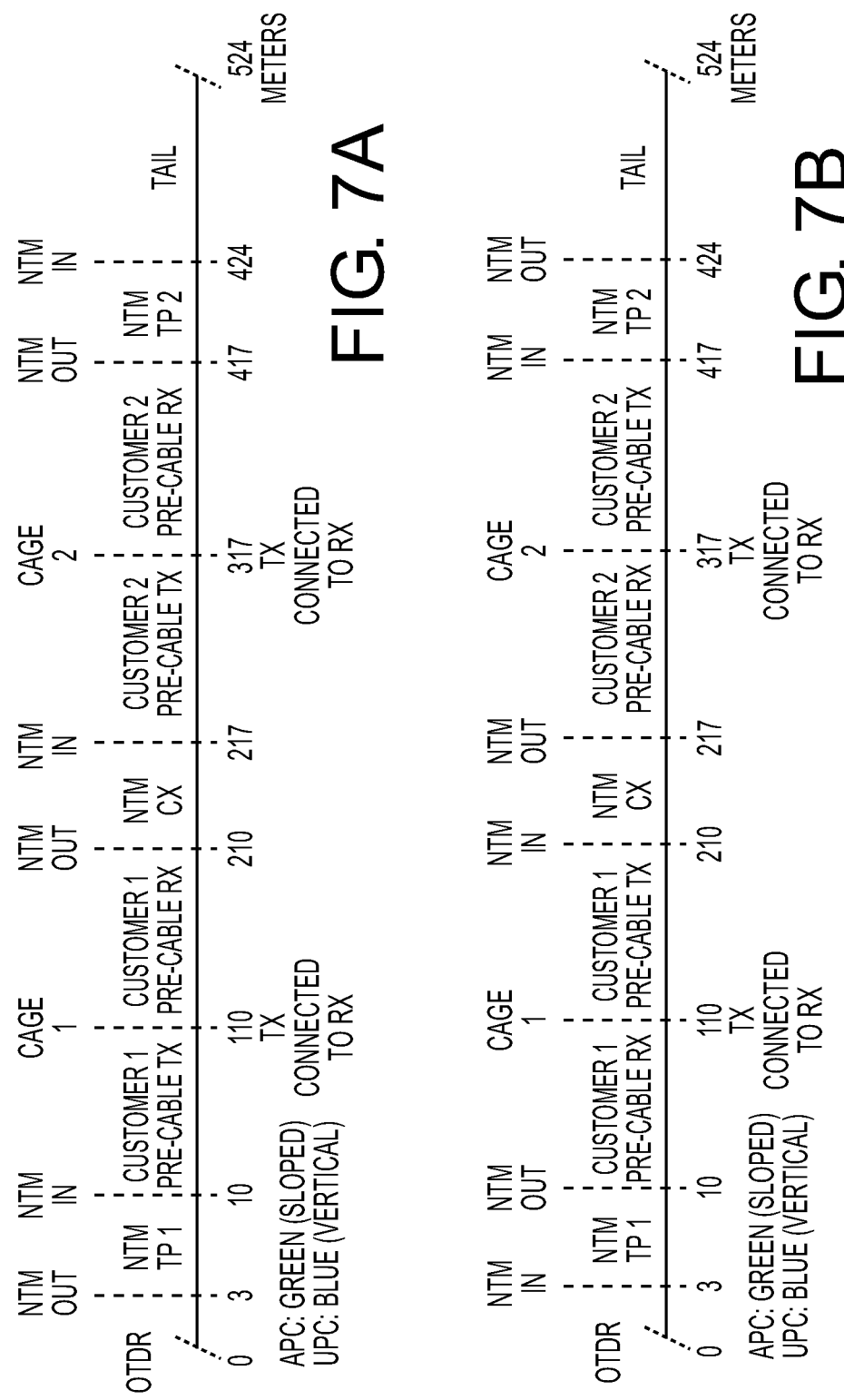
FIGS. 7A-7B are diagrams of an exemplary validation of a cross-connect between a cage 1 and a cage 2 for an OTDR pulse traveling in first and opposite directions.

In a further example, FIG. 7A is a diagram of the initial validation of pre-cabling after installation from the MMR to a cage in a MTDC. The OTDR pulse is travelling in a first direction. The length of cable from cage 1 and cage 2 to the NTM serving as an MMR is also, for example, 100 m. The Tx and Rx cables of the particular duplex pairs entering cage 1 and cage 2 are connected together to allow light to pass into the cage on one fiber and out of the cage on the other fiber. In general, the length of this cable to the cage is in the range of 1 m to 10 km, depending on the data center application (e.g., single small DC, large DC, campus with multiple DCs). The NTM(s) is used not only to connect the OTDR to the link, but also to connect a tail cable at the end of link to enable an accurate insertion loss measurement for the final Rx pre-cable segment in the sequence. FIG. 7B is a diagram of the initial validation of pre-cabling to a cage in a MTDC for an OTDR pulse traveling in the opposite direction. The traces taken from these two opposite directions can then be merged to provide a more accurate measurement of insertion loss at each interface.

In each of these examples, the far ends of the tail cables are terminated in a UPC or APC connector. The length of the tail is typically in the range of 30 to 300 meters, selected based on the pulse width settings of the OTDR, which are typically as short as 5 nanoseconds to minimize the attenuation dead zone (to 1 to 4 meters).

Figure 8:
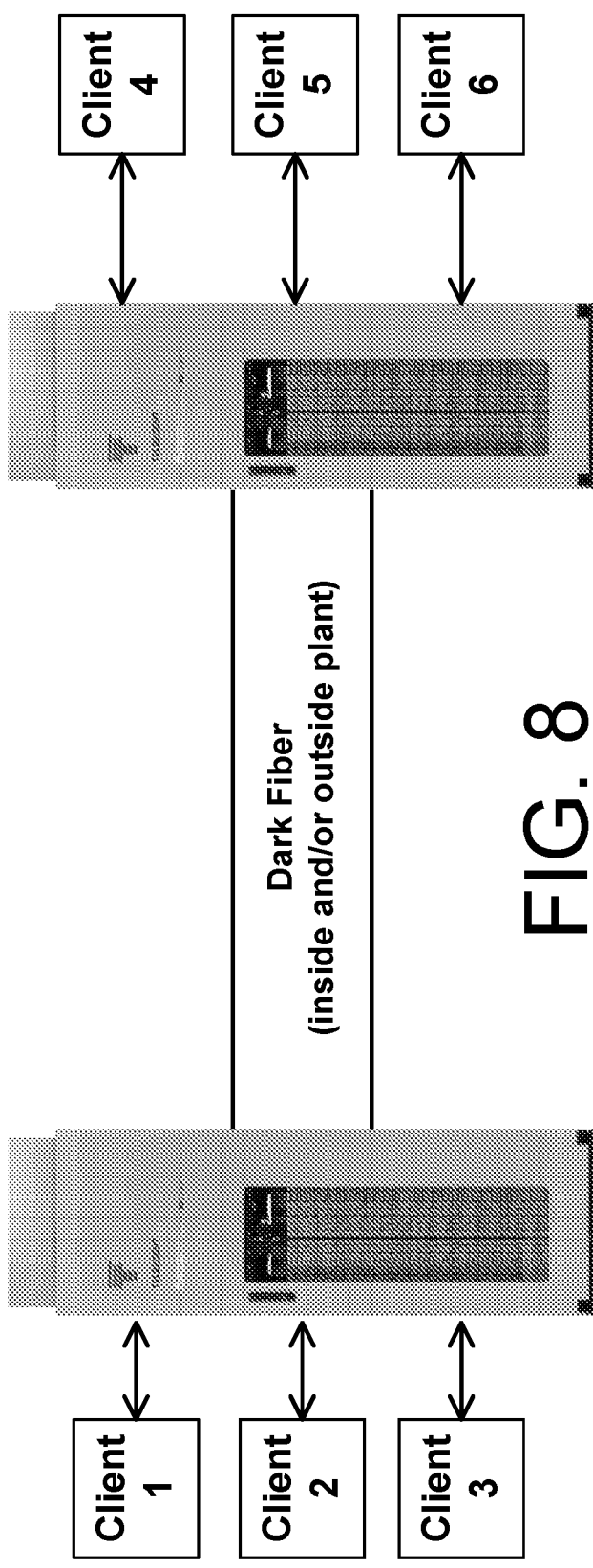
FIG. 8 is a diagram of a configuration to perform dark fiber testing, verification and provisioning according to exemplary embodiments hereof.

Dark fiber testing and verification is a further example of an important health monitoring process able to be automated by an NTM instrumented with an OTDR. FIG. 8 is a diagram of a configuration to perform dark fiber testing, verification and provisioning according to exemplary embodiments hereof. Providers of leased dark fiber typically wait to test their fibers after customer contract execution. Problems often arise, delaying dark fiber provisioning, service turn on and revenue generation. Even dark fiber that was successfully tested shortly after cable install can develop problems at a later time due to, for example, the unintended consequences of other nearby maintenance activities (e.g., resplicing in the incorrect order after a fiber cut) or dirty connectors whose original insertion loss passed but was marginal. The NTM enables automated verification testing to accelerate service delivery.

In a further example, one or more test ports on the NTM is connected to a visual fault finder, typically a diode laser emitting visible red light. The NTM is instructed to connect the fault finder to the proximal end of the interconnect and the distal end of the interconnect is located in the user's cage. When the red-light signal is launched down the known fiber, it will illuminate the fiber end and/or dust cap at the distal end within the user's cage. This process is valuable to identify the correct fiber within their cage. In situations where there are multiple connector interfaces between the proximal and distal ends of the interconnect, this adds considerable value as a verification tool to speed installation.

In summary, this automation method delivers financial benefits to the data center operator that extend beyond labor savings. Namely, accurate records are key to ensure operational excellence, reducing the frequency and duration of costly downtime and the loss of reputation resulting from operational missteps. Accurate recordkeeping also enables cables and ports to be re-used without risk of disconnecting an active circuit. Finally, the time to provision new services and start billing is reduced from weeks to minutes.

Example 2: Network Testing and Troubleshooting

Due to the complexity of fiber optic networks at scale, an automated method to perform network testing and troubleshooting is necessary. Even in highly reliable networks, unplanned troubleshooting is common because of the massive number of networked devices. A dirty or damaged fiber optic connector is one of the most common causes of packet loss, packet corruption and ultimately communication link failure [Danyang Zhuo, Monia Ghobadi, Ratul Mahajan, Klaus-Tycho Förester, Arvind Krishnamurhy, Thomas Anderson, "Understanding and Mitigating Packet Corruption in Data Center Networks," Proceedings of SIGCOMM '17, Los Angeles, CA, USA, August 21-25]. Other common causes of packet loss include damaged or excessively bent fiber optic patch-cords, fiber breaks or degraded/failed optical transceivers. These problems become even more prevalent as data rates increase beyond 100 Gbps, because these high bandwidth transceivers operate with a narrow optical power margin and are thus prone to packet loss and packet corruption even at relatively low insertion loss levels. It is challenging for a technician to rapidly identify and fix these insertion loss problems, particularly when a problem occurs during off-hours.

The NTM can be instrumented with test equipment to facilitate such problem identification and resolution. For example, the NTM injects optical test equipment and sensors onto any link by moving a corresponding interconnect to one of the test ports, collecting diagnostics and ultimately determining the root case (FIG. 5B). This eliminates the need to deploy technicians with handheld test equipment. Shared test gear such as OPMs, OTDRs, OCDRs, and PAs interconnected via NTM(s) streamlines troubleshooting and validation testing at a cost per reconfiguration or per measurement that is negligible compared to today's manual approach (at least 1 hour of labor per reconfiguration/ measurement). As a result, proactive maintenance and health monitoring procedures are now possible. Service can be automatically restored by routing around the failure point based on data collected from alarms or measurement probes.

In a particular troubleshooting method, the NTM system is capable of checking the signal power on incoming receive (Rx) and transmit (Tx) fibers, identifying locations of fiber breaks or loss, and provisioning a new standby backup circuit. Once the NTM system verifies link integrity, client traffic is on-boarded to the newly provisioned fiber to restore service. The corresponding manual troubleshooting process would have required several technicians deployed at distant locations.

Figure 9:
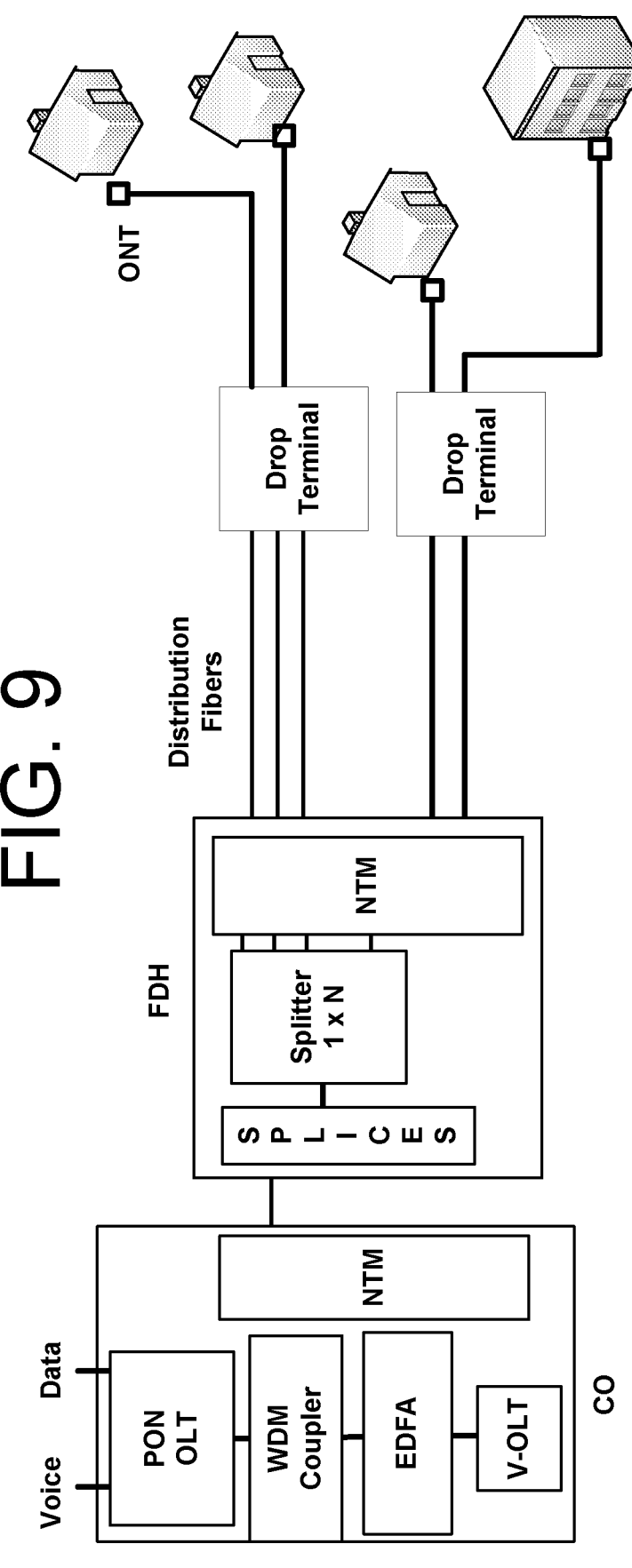
FIG. 9 is a diagram of an access network with NTMs deployed in an outside plant according to exemplary embodiments hereof.

The distributed nature of Access, Edge and 5G networks is introducing greater fiber management complexity because the number of fibers interconnecting large numbers of devices and locations is growing. At the same time, future 5G applications such as the Internet of Things (IoT) and autonomous vehicles in particular may demand higher network availability and lower latency than current wireless services. A determination of when and where the failure occurred is critically important. In addition, fiber interconnections in distributed Access networks (FIG. 9) typically change more often than in other parts of the core network because of churn as end users change service providers. If a fiber access network has, for instance, 1,000 ports into a business park and 20% churn per year, then the service provider must decommission 200 businesses per year and turn on 200 new customers per year (in absence of subscriber growth). An NTM deployed between the active OLT port and the OSP subscriber port can manage this churn very efficiently so that ports are re-used rather than stranded.

The automated testing and health monitoring method also improves network reliability and operating efficiency. Customers running networks that span a broad geography can reduce operating expenses if they have the ability to conduct remote testing. Truck rolls to unmanned sites such as Edge Computing Centers are very costly. The NTM enables technicians to perform initial testing and subsequent verification remotely through, for example, a web interface. This eliminates the need to travel to the Edge Data Center, a CO or an FDH. This translates into significant savings in time, fuel, transportation and labor.

As a key factor impacting reliability, distributed network testing and monitoring is necessary to ensure high network availability. Availability is a big challenge for service providers, particularly in complex, fiber rich 5G and edge networks. Failure to deliver the contracted level of availability because of poor infrastructure design, natural disasters, human error, cybersecurity attacks, etc. results in significant financial penalties incurred by service providers. For example, the fiber service could be part of a Metropolitan Access Network (MAN) in New York City carrying critical financial transactions. The loss of connectivity for one major customer for a day can equate to a loss of tens of millions of dollars. The NTM enables rapid troubleshooting, proactive health monitoring and fast restoration of high value services.

Example 3: Graceful Migration From Obsolete Hardware to New Hardware

Data center operators deploy single mode fiber interconnect systems designed to last over several IT equipment generations (~10-20 years). In contrast, network and compute assets are replaced every 3-5 years as new server and networking technologies render previous generations obsolete. As a result, data center operators operate in a mode of continuously installing new devices (routers/switches/servers), moving physical fiber optic interconnects from old devices to new devices, configuring and testing devices, releasing interconnects to production, moving traffic off of old devices, de-provisioning devices, and finally removing the old interconnects and devices. This is very labor intensive manual process. A data center complex with 40,000 server racks may replace 10,000 racks per year or 50 per day. Services must be migrated onto these 50 new racks on a daily basis without disrupting operations. The alternative automated process utilizing NTM(s) performs many of these tasks using robotics to improve operational efficiency.

In particular, the NTM system automates the steps (FIG. 10) of reconfiguring interconnects, updating the connectivity database, testing optical links and validating operation of each network interface. This coordinated, non-service affecting process my include the following:

1) Turn off old client optical interfaces (e.g., 10G Ethernet port))
2) Issue the commands for NTM to move the client ports from legacy network to new network
3) Turn on new client optical interfaces (e.g., 100G Ethernet port)
4) Use NTM to insert optical measurement probe(s) into new network and verify performance of interconnection
5) Upon verification, instruct NTM to establish final interconnection
6) Hand-off service to customer.

Figure 10:
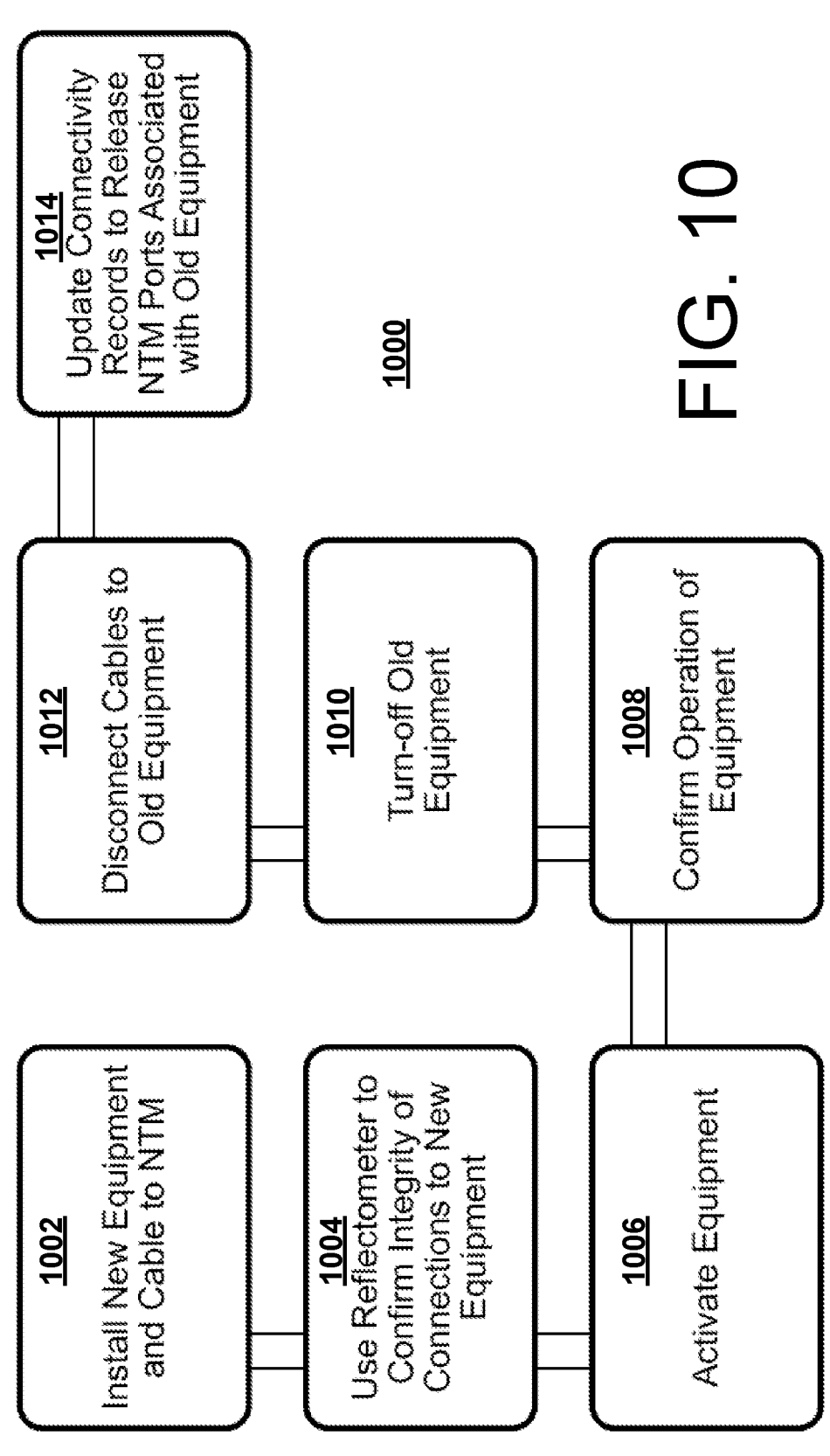
FIG. 10 is a flow diagram of an exemplary automated process of migrating a network of physical fiber interconnections from obsolete equipment to new equipment, according to embodiments hereof.

With reference to the flowchart in FIG. 10, an exemplary migration process 1000 includes installing new equipment and cable(s) to an NTM (at 1002), confirming the integrity of connections to the new equipment (e.g., using a reflectometer) (at 1004). Then the equipment may be activated (at 1006) and its operation may be confirmed (at 1008). Then the old equipment may be turned off (at 1010) and cable(s) to the old equipment may be disconnected (at 1012). Then (at 1014) connectivity records may be updated to release NTM ports that were associated with the old equipment.

By following this process, next generation equipment (for example, more advanced firewalls, routers) may be migrated into the network as needed.

Example 4: Rapid Provisioning, Deprovisioning and Reprovisioning of Network Services Manual patch-panels in a Meet-Me-Room (MMR) are used to provision physical cross-connections between customer equipment cages and service providers at a centralized location. The manual provisioning process requires the identification of patch-panels, cables/conduits and other infrastructure with spare capacity. It further involves the configuration of the interconnection, validation of its performance, and finally transfer to the customer. Typically, this process takes 4-8 hours of labor over a 1-2-week period. The NTM enables this manual provisioning process (FIG. 11) to be automated and performed in near real-time.

Figure 11:
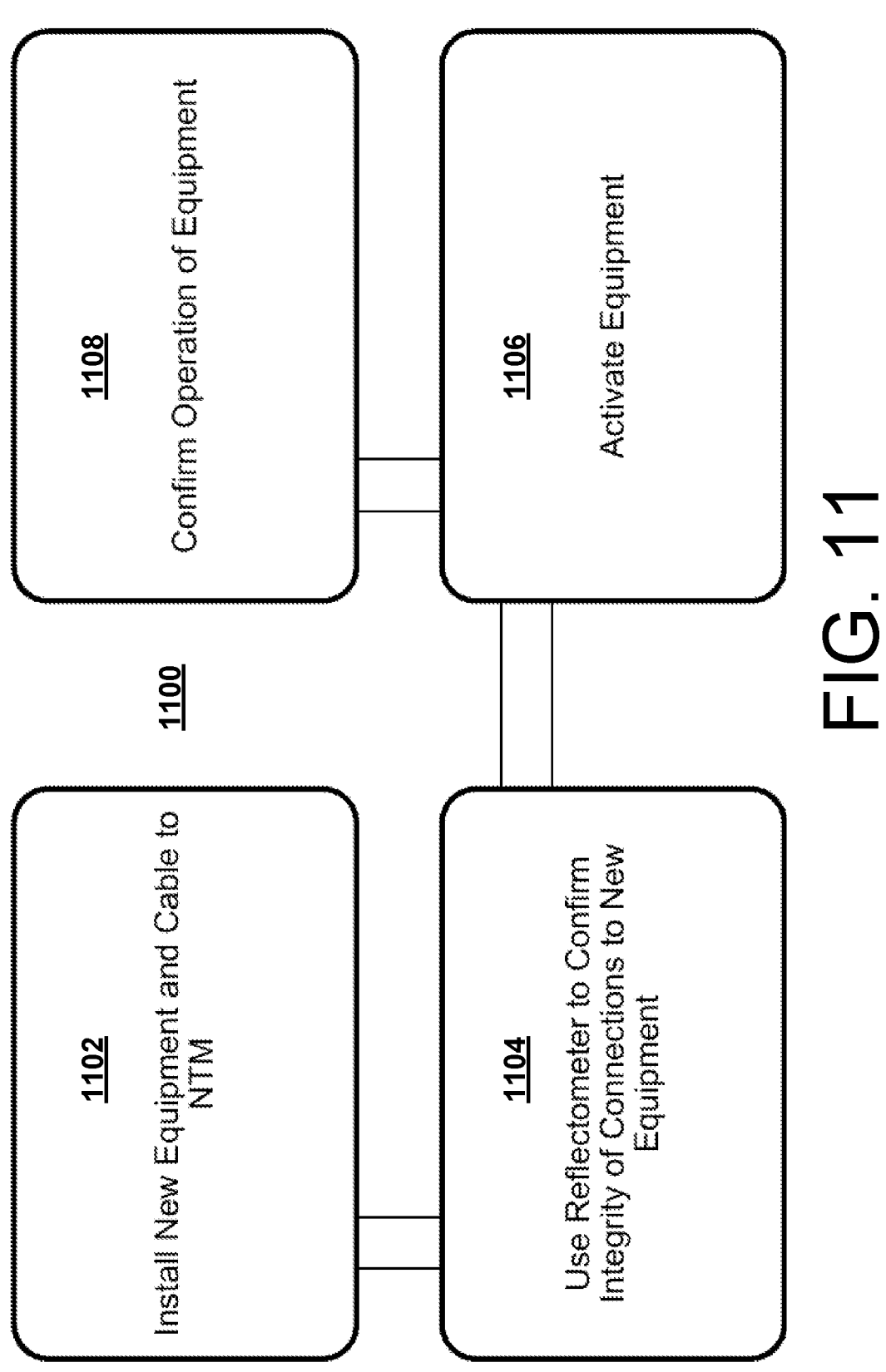
FIG. 11 is a flow diagram of an exemplary automated process of provisioning a new connection, according to exemplary embodiments hereof.

FIG. 11 is a flow diagram of an exemplary automated process 1100 of provisioning a new connection, according to exemplary embodiments hereof. With reference to FIG. 11, new equipment is installed and cabled to the NTM (at 1102). The integrity of connections to the new equipment is confirmed (at 1104), e.g., with a reflectometer. Then the new equipment is activated (at 1106), and operation of the new equipment is confirmed (at 1108).

Figure 12:
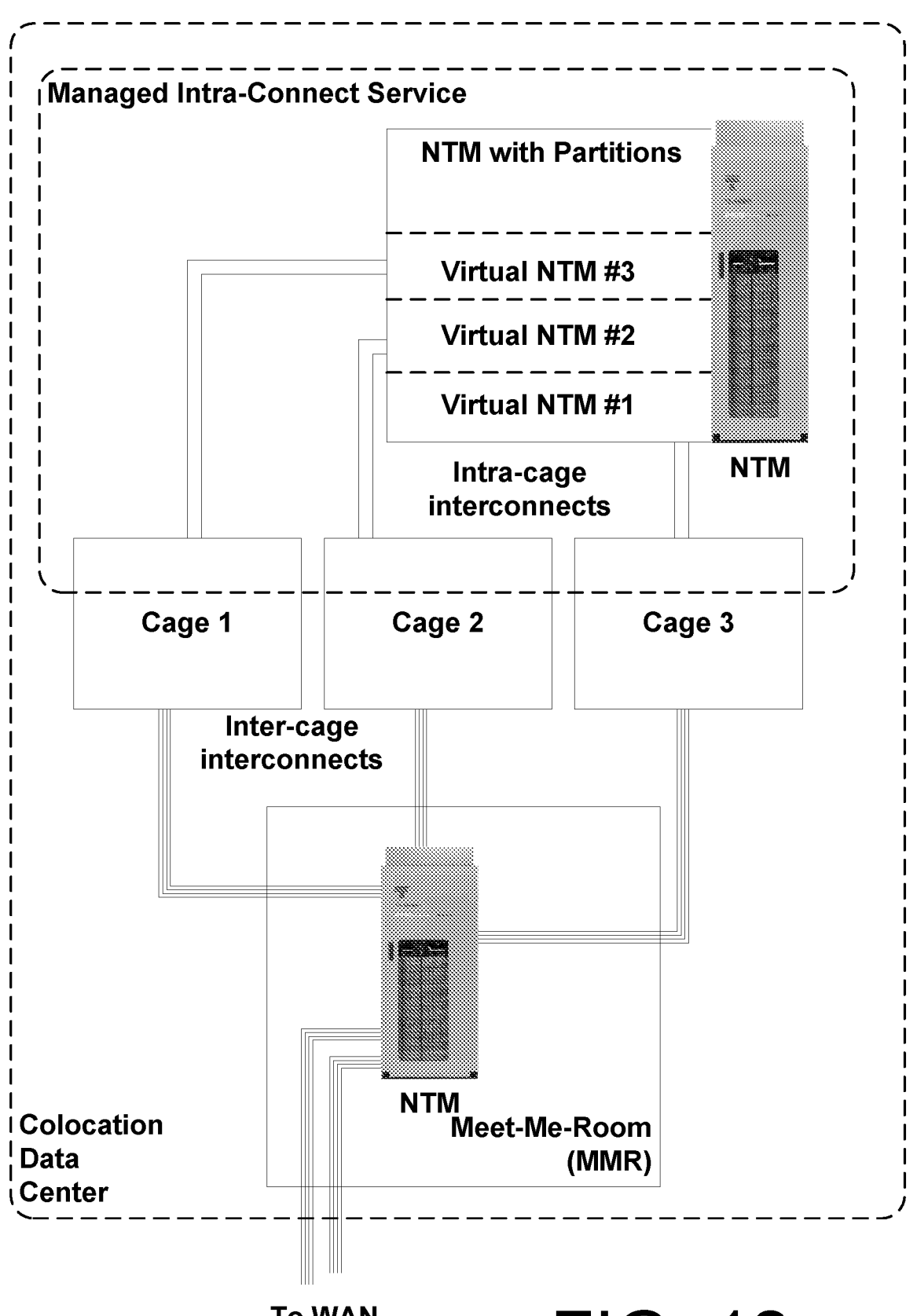
FIG. 12 is a diagram of a colocation center having multiple customer cages, wherein one or more NTMs automate the management of inter-cage and intra-cage connections.

Data center and telco operators routinely provision, deprovision and reprovision high bandwidth fiber optic network connections and network requirements evolve. These processes occur frequently for MTDC operators in particular, because of the large number of collocated enterprises and network operators seeking and/or providing services. MTDCs provide interconnect services to customers collocating within their data centers. These services include manual inter-cage fiber interconnections connecting customer cages to service providers, as well as manual intra-cage interconnections entirely within an individual customer's cage(s) (FIG. 12). The automation of these inter-cage connections in a MTDC is a particularly compelling use case for the NTM. These connections are high value and are frequently reconfigured and tested as a result of customer churn and growth.

In a further example, stranded cables may be left behind and overfill the cable trays of MTDCs when services are deprovisioned in a MTDC. Potential errors in connectivity records discourage technicians from disconnecting cables because the cable might actually be carrying live customer traffic. This leads to overfilled cable trays, limiting the ability to continue to grow the network. A labor-intensive process is required to remove unused cables and regain this lost capacity without bending, pinching or disconnecting live cables. As a result, a technician might take a full day to remove a single cable, which in most cases is more costly than simply leaving the disconnected cable in place within the cable trays.

In a further example, the inter-cage and intra-cage connections are managed by NTMs (see, e.g., FIG. 12). Rather than terminating intra-cage cables at a patch-panel within the customer's cage, those local interconnections within a customer's own cage can instead be directed to and from a central NTM. The customers can then securely reconfigure the internal connections in their cage using this central NTM. This NTM-enabled service allows multiple MTDC customers to independently and securely manage their own interconnections residing on the NTM through a remote interface and open API. An individual customer may have only 100 interconnections, so it is advantageous from a cost perspective to interconnect multiple customers to the same NTM. This enables cost-sharing of the NTM automation engine (e.g., the robot). It does not compromise security, because the system software limits each customer's view and control to their subset of interconnections.

Tenants of a MTDC conventionally hire an onsite remote hands technician to configure and troubleshoot devices in their cage. This eliminates the expense of sending one of their own employees, but adds risk that a technician unfamiliar with the cage and equipment therein makes a critical error. While remote hands technicians are trained to enter cages, install interconnects, provision equipment, install line cards and verify connections, they are often unfamiliar with the customer's specialized equipment configurations. The risk of errors and service disruption is high. Delays are also common, especially during times when access to the data center is restricted. The NTM enables physical interconnections between cages in MTDCs to be reliably and predictably provisioned, reprovisioned and deprovisioned in minutes instead of hours by a robot, eliminating the risks inherent when technicians must intervene.

Example 5: Automated Meet-Me-Room and Automated Cross-Connect Service in Colocation Data Centers The automation of provisioning is particularly valuable for the large scale, dense physical cross-connects within the Meet-Me-Rooms (MMRs) of colocation data centers. NTM architectures such as those disclosed in International Patent Application PCT/US2020/035776 (published as WO 2021/021280, Feb. 4, 2021) and U.S. Patent Publication 20200359117, published Nov. 12, 2020 (U.S. application Ser. No. 16/888,602) may be utilized to scale to greater than 10,000 interconnections using a multiplicity of NTMs deployed in distributed locations or a centralized suite. In a particular example, the NTMs may be arranged in a two-tier architecture supporting a "leaf and spine" or "hub and spoke" configuration. The NTM system orchestrator controls the system and determines the optimal set of physical cross-connects (for a pre-selected cost function) to make the required end-to-end connection.

Automation of physical interconnects is difficult or impractical at scale using conventional automation approaches. Photonic switch-based systems to automate interconnections in a central MMR are described in U.S. Pat. Nos. 10,206,017 and 9,736,556, wherein photonic switches refer to the class of opto-electronic devices that switch optical signals between fibers within 10 ms or less, such as MEM steering mirrors, arrays of beam steering collimators, and finally general electro-optics or thermo-optic devices. A drawback of photonic switches is that they add significant complexity and insertion loss. They introduce a transmission discontinuity when optical signals exit the optical fiber medium to be redirected by MEMs mirror arrays, active waveguides, piezoelectric beam steering collimators, etc. Moreover, in high reliability production network applications, photonic switches have the shortcoming of requiring continuous electrical power and active electronic connection control/feedback to maintain signal transmission. Their optical connections are not electrically passive nor latching. That is, they fail in the "disconnect" rather than the "connect" state. In practice, the high cost, poor reliability and limited scalability of optical switches and photonic switches has prevented their installation in production data centers.

Therefore, it is of great practical value to deploy a scalable, highly reliable, low-cost alternative to photonic switches. The NTM eliminates the optical switch and uses a robot and a continuous fiber cross-connect to scale gracefully to thousands of non-blocking ports, far greater than the limited 192 to 384 non-blocking ports for the largest photonics switches. Moreover, the NTM's internal fiber connectors are magnetically latched and potentially self-cleaned using an internal cleaning cartridge, ensuring the highest level of reliability and lowest insertion loss.

The NTM incorporates a compact robot to move physical fiber optic cables connected to the backside of a fiber patch-panel. The NTM fiber connectors are passive (not opto-electronic), and thereby maintain the connected state at all times, even if there is a power generator failure, internal power supply failure, software or firmware bug, etc.

An NTM or multiplicity of NTMs can function as a Meet-Me-Room (MMR), as described by the current inventor in a recent article: OCP 2019 Regional Summit in Amsterdam on Sep. 27, 2019:

https://2019ocpregionalsummit.sched.com/event/VGTs/
        automated-meet-me-room.

As described herein, the MMR may be either distributed or centralized, depending on the physical placement of the individual NTMs and the type of data center facility (e.g., multi-building data center campus, multi-floor building, etc.). NTMs in an MMR application are able to provision new services using an Open API supporting interoperability. Bandwidth variability, changing workflows, disasters, equipment failures, upgrades and expansions are all effectively managed by this software-controlled physical interconnect system.

In a specific example, an individual NTM may be configured with 1,008 active ports and 36 parking ports out of an array of 1,044 ports. 1,008 connectivity solution (average <0.25 dB). Each automated interconnect may be, for example, a 1 m to 5 m length of optical fiber with LC-UPC, LC-APC or other connector types. The NTM scales from 48 to 1,008 fully non-blocking duplex interconnections (2,016 ports) in a single rack. Speeds from 10G up to and beyond 400G are supported with zero packet loss and essentially zero latency.

Fiber optic cables from the cages of tenants and service providers are plugged into the active NTM ports at the time of installation. The NTM's external physical connections remain fixed thereafter. The robot reconfigures the internal fibers connected to active and parking ports. In fact, the NTM's robot configures and reconfigures, connects and disconnects, troubleshoots and validates these internal fibers. A robot executes the arbitrary rearrangement of "active ports" and "parking ports" within the NTM in a minimum time. Active ports by definition contain internal fibers and parking ports by definition do not contain internal fibers. The resulting automated optical connections are pristine and reliable, with the lowest possible insertion loss of any technology or manual internal connection.

In a further example of an automated Meet-Me-Room system and method, the NTM robot can temporarily redirect optical links to optical test equipment such as an OTDR, OPM and high-speed PA to provide full health monitoring and traceability of MMR interconnects. These measurement tools are accessible on-demand by tenants of the MTDC, so that tenants can remotely test and monitor any of their interconnections. The scalable, non-blocking (potentially two tier) system of NTMs (FIG. 13) automates any-to-any connections within a user's cage (intra-cage), as well as between cages of the same or different users (inter-cage) (FIG. 14). This system enables remote fiber reconfiguration, provisioning, optical performance testing, automated recordkeeping and troubleshooting through an open software API.

This automated MMR system facilitates a multi-user environment and marketplace for services delivered over cross-connects, hosting interconnects between a large number of customers that subscribe to such services. The one or more NTMs comprising the interconnect system securely partitions a particular user's ports and isolates their private connections from those of other users interconnecting to the same NTM system. Enterprises and service providers are able to perform arbitrary, non-blocking reconfiguration and optical monitoring of all connections within their own NTM partition. They are also able to request inter-cage connections to other organizations in the MTDC through this platform. Multiple concurrent interconnection requests are prioritized and managed by the NTM system's queuing system.

FIG. 15 illustrates an example process flow to provision and validate a new on-demand interconnect service in a MTDC in a matter of minutes using an NTM system according to exemplary embodiments hereof. First, an enterprise tenant in the MTDC accesses the NTM software portal to select from services within the marketplace (e.g., 100G connection to cloud provider, Internet, etc.). The user may be first authenticated when they log-in, and they can then perform a limited set of the functions supported by the NTM system, based on their pre-defined port permissions within their secure partition of the NTM. These permissions are assigned by the MTDC administrator as tenants sign up for services. Each tenant's partition may be securely isolated through software from other customer partitions, so that any tenant cannot see the connections or data of any other tenant even though they may reside on the same physical hardware. This sharing of hardware is sometimes described as a form of "virtualization" or "network function virtualization." Therefore, this automated MMR may be referred to as a "virtual MMR."

In a particular example, the provisioning process may require a handshake between an enterprise requesting service and a service provider delivering the requested service. Each entity independently authorizes the creation of the cross-connect therebetween. The process workflow also includes validating the integrity of each cross-connect using an OTDR connected to an NTM test port. This step may be sometimes skipped in the present mode of operation because it is labor intensive, error prone and requires skill to perform the measurement. The NTM management system enables this to be performed in a fully automated way.

The NTM may be attached to the distal ends of the two interconnects comprising the cross-connect. The proximal end of a first interconnect resides within a first cage and the proximal end of second interconnect resides within a second cage. In the context of the MMR, the complete interconnection between the proximal end in first cage and proximal end in second cage is called a cross-connect.

The NTM with internal OTDR can perform a bi-directional OTDR scan from proximal end of first duplex cable at the one or more NTMs, to the distal end of first cable within a first cage (connecting the Tx and Rx connectors of duplex cable together), back to the proximal end of a second duplex cable at the one or more NTMs, to the distal end of second duplex cable in the second cage (connecting the Tx and Rx connectors of duplex cable together), then returning to the proximal end of second duplex cable at the one or more NTMs, and finally terminating in a length of cable typically referred to in the art as a "tail cable." Following these measurements, the transmit and receive connectors at the distal ends of the first and second duplex cables within the cages are disconnected from each other (loopback removed) and inserted into corresponding ports on a device within the cage.

An interconnection facility serves a multiplicity of users within a multiplicity of cages. The fiber optic interconnect fabric connects the multiplicity of users residing within one or more of the multiplicity of cages. The interconnect fabric may be controlled by an interconnect provisioning, test and inventory system (i.e., a software management system), and includes a plurality of optical fibers connected to one or more robotic fiber optic patch-panels.

The first cage contains switching, network, storage and compute equipment of a first user of the interconnection system, the first cage having a terminated first subset of the plurality of optical fibers. The second cage contains the equipment of a second user of the interconnection system, the second cage having a terminated second subset of the plurality of optical fibers within. The interconnect software management system may be configured so that in response to receiving a request for an interconnection between the first user and the second user, this system instructs the one or more robotic patch-panels to connect, disconnect or test a low insertion loss, passive, contiguous optical fiber connection between the first user and the second user.

For example, the contiguous optical fiber connection includes a first optical fiber of the first subset of optical fibers, a second optical fiber of the second subset of optical fibers, with one or more robotic fiber optic patch-panels connecting the first and second optical fibers.

In a further example, the interconnect provisioning, test and inventory software management system controls one or more OTDRs to test the insertion loss and verify the proper operation of the contiguous optical fiber connection.

In a further example, the one or more robotic fiber optic patch-panels include a fiber optic connector end-face cleaning device to clean the optical fiber connector prior to insertion into mating port to ensure that the contiguous optical fiber connection exhibits low insertion loss.

The connectivity requirements typically change over time. For instance, enterprises connect to cloud or telecom service providers to access their services.

Example 6: Enhanced Network Availability and Resiliency Thru Agile Layer-0

In a further example, the system of one or more NTMs enables one or more spare router, switch or other network devices to be shared across the network and inserted into the physical interconnect fabric when needed to restore operation of the network. Warm standbys can therefore be introduced into the network in a matter of minutes without the need for manual intervention. For example, a network management controller instructs the NTM to move a fiber from a failed line card to a spare line card, wherein the controller may be automatically alerted by layer 1, 2, or 3 network elements when a link failure occurs. The NTM subscribes (e.g., "listens") to these alarms and determines reconfiguration and monitoring actions based on these messages. The corrective action implemented by the NTM involves a sequence of reconfigurations and tests to execute an end-to-end link restoration process.

The NTM improves availability and eliminates the delay of on-site technicians to restore services. Fast mitigation of outages by the data center operator reduces financial losses. High availability SLAs (e.g., 24/7 by 1-hour response times) are facilitated by programming the NTM to share costly spare line cards across multiple chassis, pods, floors, locations, etc. The sharing of spares provides significant cost savings. 1:1 protection switching may require 1 spare port per active port, and the spare port may be very costly. The NTM enables 1:N protection switching in which one spare may be shared among N=1,000 ports for example. This eliminates a large number of unused spares and their corresponding cost.

While equipment failures are relatively infrequent, they can have a disproportionate financial impact when they do occur. It may be impractical to have technicians on standby at a patch-panel 24-7-365 waiting to respond to relatively infrequent failures, but it is natural and economical for a robot to perform this task upon receiving instructions from the controller. For typical router and transport equipment, about 5% of the ports fail per year. For an e-commerce site, an outage lasting minutes can lead to millions of dollars in lost revenue. For customers operating a geographically diverse Wide Area Network (WAN), the improved utilization of costly backup fiber links is valuable. The enhanced self-diagnostics and automation enabled by the NTM provides "insurance" for system operators and vendors through switchable optical monitoring, traffic re-routing and redundancy. The NTM offers a cost-effective approach to improve availability and reduce financial penalties associated with downtime.

Example 7: Agile Connectivity in Large Scale Switch Fabric for Performance Optimization Networks can be optimized based on the characteristics of the workflows generated by the one or more software applications running concurrently on the same infrastructure. It is advantageous if the network topology and connectivity to support these workflows can be programmed. These workflows may be dynamic and diverse. A web service and a MapReduce application can coexist on the same hardware. Each may have different network bandwidth requirements that evolve over time.

Mathematically, all the inter-cage and intra-cage fiber paths can be modeled as a multigraph. The NTM then enables dynamic reconfiguration of this graph or network topology. The optimal topology may be realized by implementing a predictive, pre-planned process as new workloads are deployed. The data center can then be dynamically assembled from a collection of physical resources (routers, switches, servers, storage, etc.) by programming the physical fiber connections using the NTM. With intelligence provided by high level monitoring and analytics, the optimal data center topology can be implemented using the one or more NTMs.

For example, a large or "hyperscale" data center consists of multiple data center halls, each hall containing many pods. A pod includes aisles of server racks, with each rack loaded with 30 to 40 servers. Servers connect to Top-of-Rack Switches (ToR or RSWs) that provide high bandwidth communication (10 Gbps to 40 Gbps) between servers within a rack. To communicate with other racks, the RSWs include upstream links at 40 Gbps to 100 Gbps to Fabric Switches (FSWs) and Spine Switches (SSWs). FSWs support communication between servers within different racks, and SSWs support non-blocking communication between servers in different pods and ultimately the WAN through Edge Switches (ESWs).

An exemplary topology discovery process 1500, according to exemplary embodiments hereof, is shown in the flowchart in FIG. 16A. First (at 1502), the NTM is installed. The NTM cleans all connectors (at 1504), and cleans, inspects, and installs external cables (at 1506). Temporary loopbacks are installed at the far ends of each external cable (at 1508). The NTM then (at 1510) performs reflectometer scans of each external cable (through the loopbacks). The scans are saved to a database (at 1512). The saved data are then processed (at 1514) to determine the length of each cable, insertion loss, and reflections. Then (at 1516) a unique backscatter/length signature is determined for each cable. The reflection scans are then analyzed for connectivity relationships between the cables (at 1518). A map is created (at 1520) based on matching cable endpoints to other cable endpoints and/or equipment.

Communication between servers in different racks and pods consumes more energy than between servers in the same rack because of the need to move data packets through the higher-level SSW results in multiple stages of optical-to-electrical conversion. This is costly and inefficient. The NTM offloads a significant portion of the fabric and spine switch traffic. Direct express fiber paths can be provisioned based on workflows to bypass the spine switch and reduce its port count/radix. NTMs can automate the reconfiguration and load balancing of the lower tier switch fabric for approximately 15K servers in 500 racks. In a particular example, one hundred NTMs, each with about 1,000 ports, can automate 600K servers in 25,000 racks.

Networks are commonly overbuilt with spare capacity based on the forecasted growth and churn of customers. Oversubscription of the multi-tiered switch fabric may be employed to reduce cost. Ideally, express links for back-end processing are often desirable to offload the large-scale workflows associated with data analytics, computation and indexing. For web browsing workloads, the user traffic is typically short, while internal traffic to analyze, index, backup, and replicate data requires high bandwidth at specific times.

This agile fabric switch use case drives potentially frequent NTM reconfiguration to dynamically optimize the distribution of bandwidth between server racks (i.e., load balancing). The high labor costs and slow speed of manual reconfiguration make this use case impractical to implement manually. From an economic standpoint, an estimated 5% to 10% of the total data center capital expenditures are eliminated by optimizing available resources and reducing or eliminating underutilized cables, ports, switches and servers. "Zero-cost" physical reconfiguration of the switch fabric using the NTM enables operators to allocate resources dynamically, advance the efficiency of their data centers, and cost-effectively scale their networks.

Software-defined Networking (SDN) controllers are able to load balance at the packet level (layer 2, layer 3) to mitigate short duration hot spots and manage bursty traffic. Load balancing at Layer 0, the physical interconnect layer, is not performed today. However, average utilization changes over time as major workflows evolve and new workflows come online or go offline. In this situation, there are two options: (1) the network can be significantly over-provisioned based on forecast peak bandwidth demands, or (2) the utilization at physical link level can be balanced to reduce need to overprovision. In this situation it may be advantageous to incorporate load balancing at the physical interconnect level.

Figure 17A:
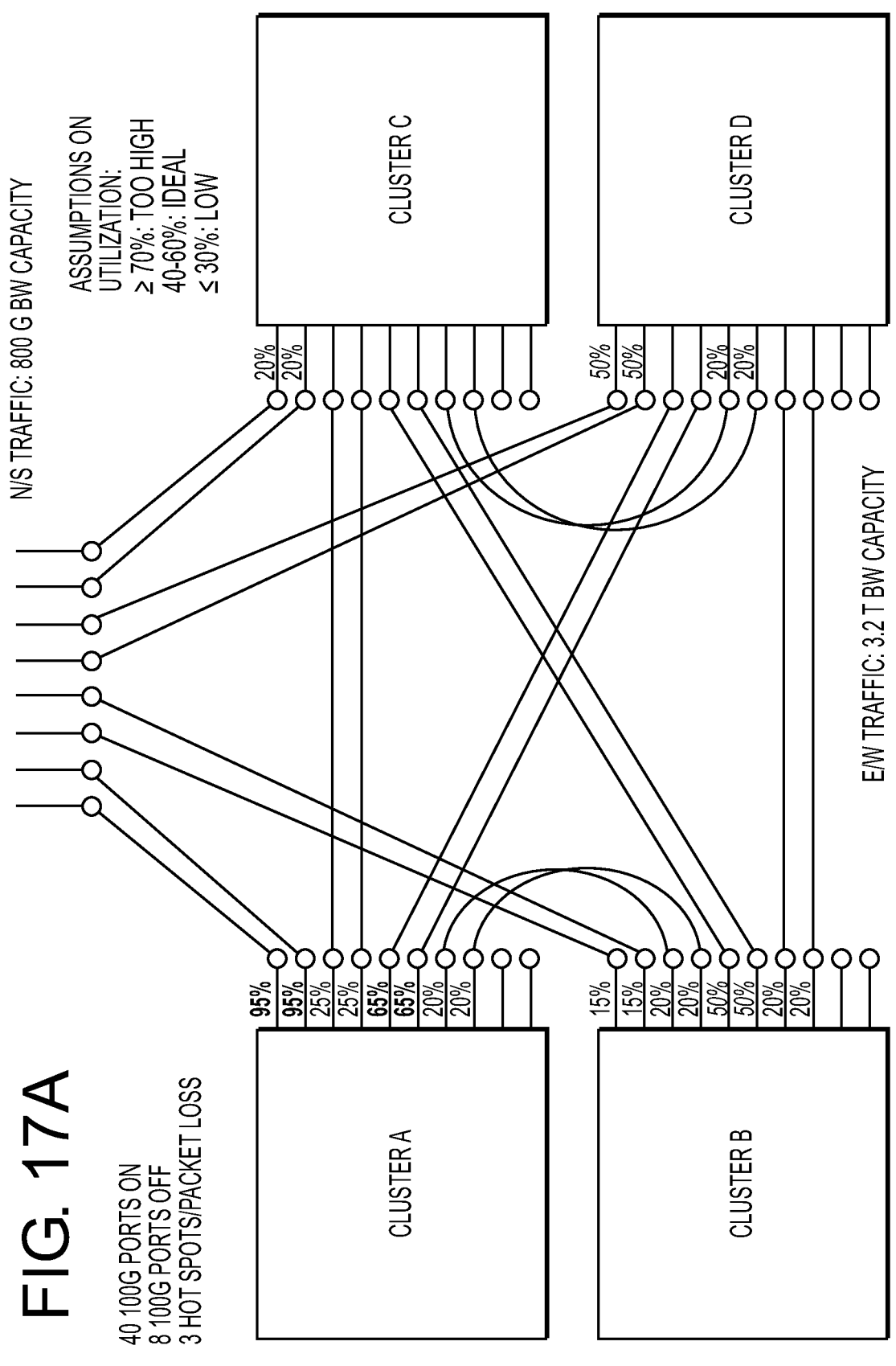
FIGS. 17A-17K depict various configurations of an example data center with four compute clusters connected to a static network.
Figure 17B:
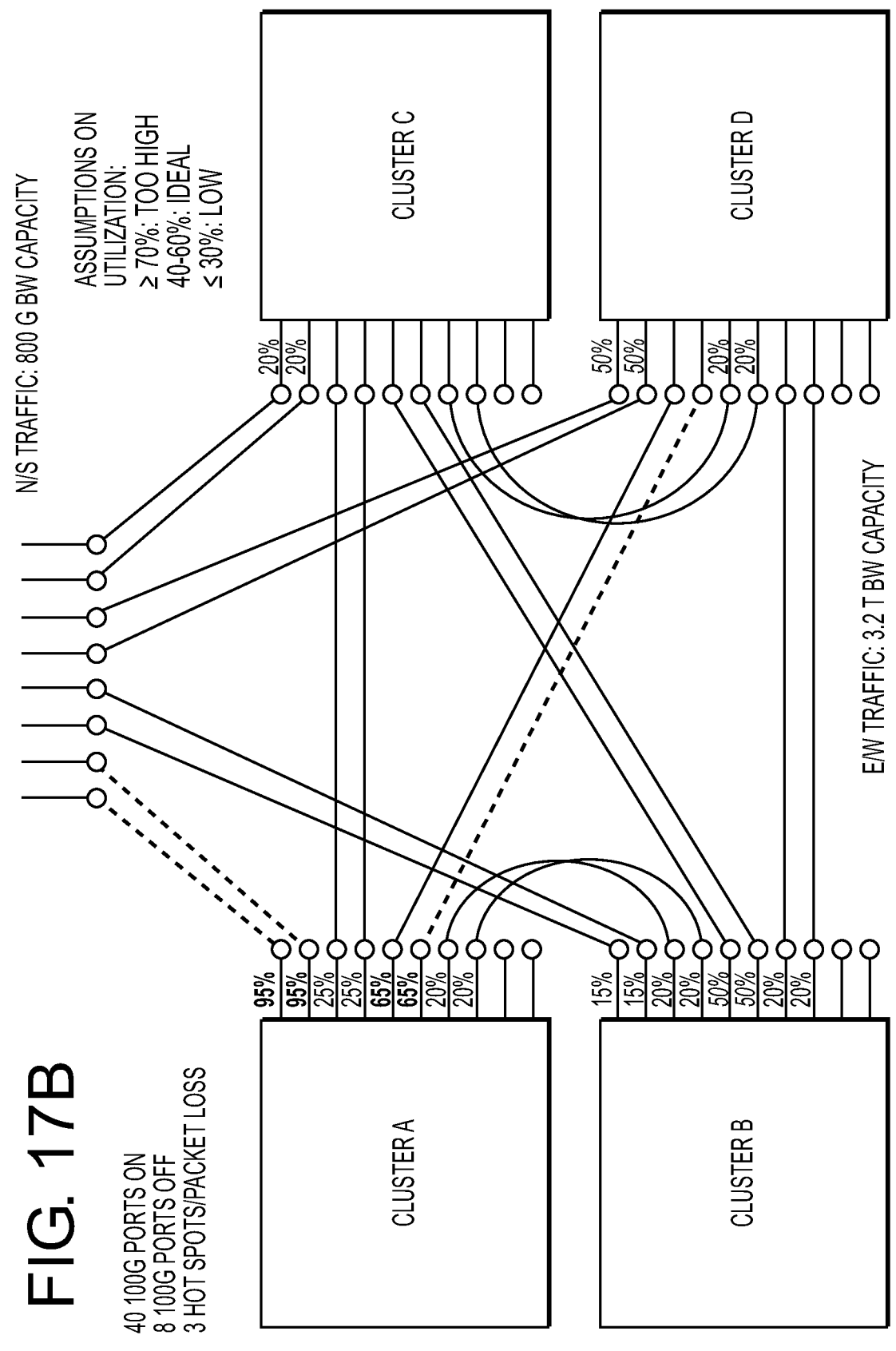
Figure 17C:
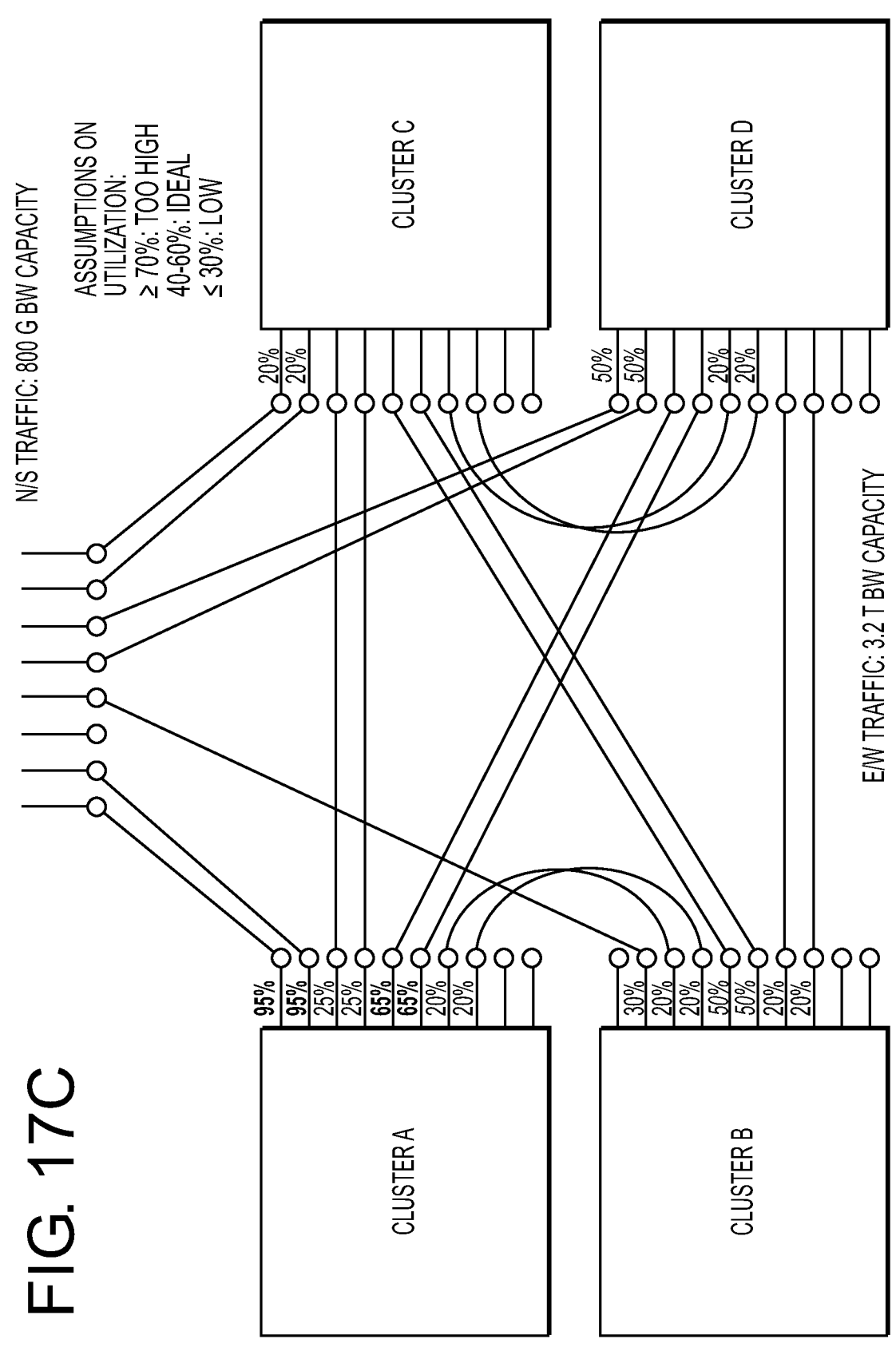
Figure 17D:
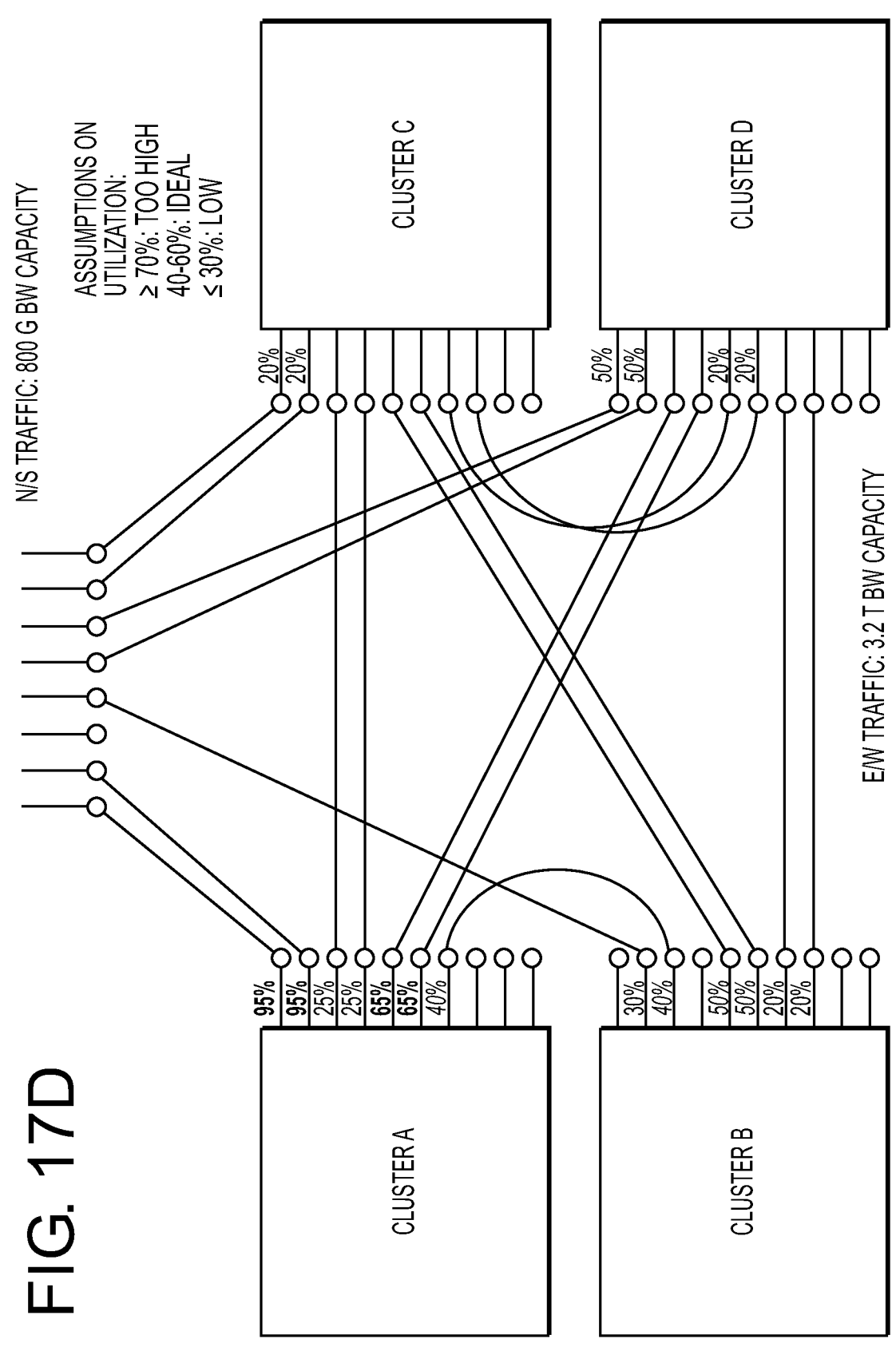
Figure 17E:
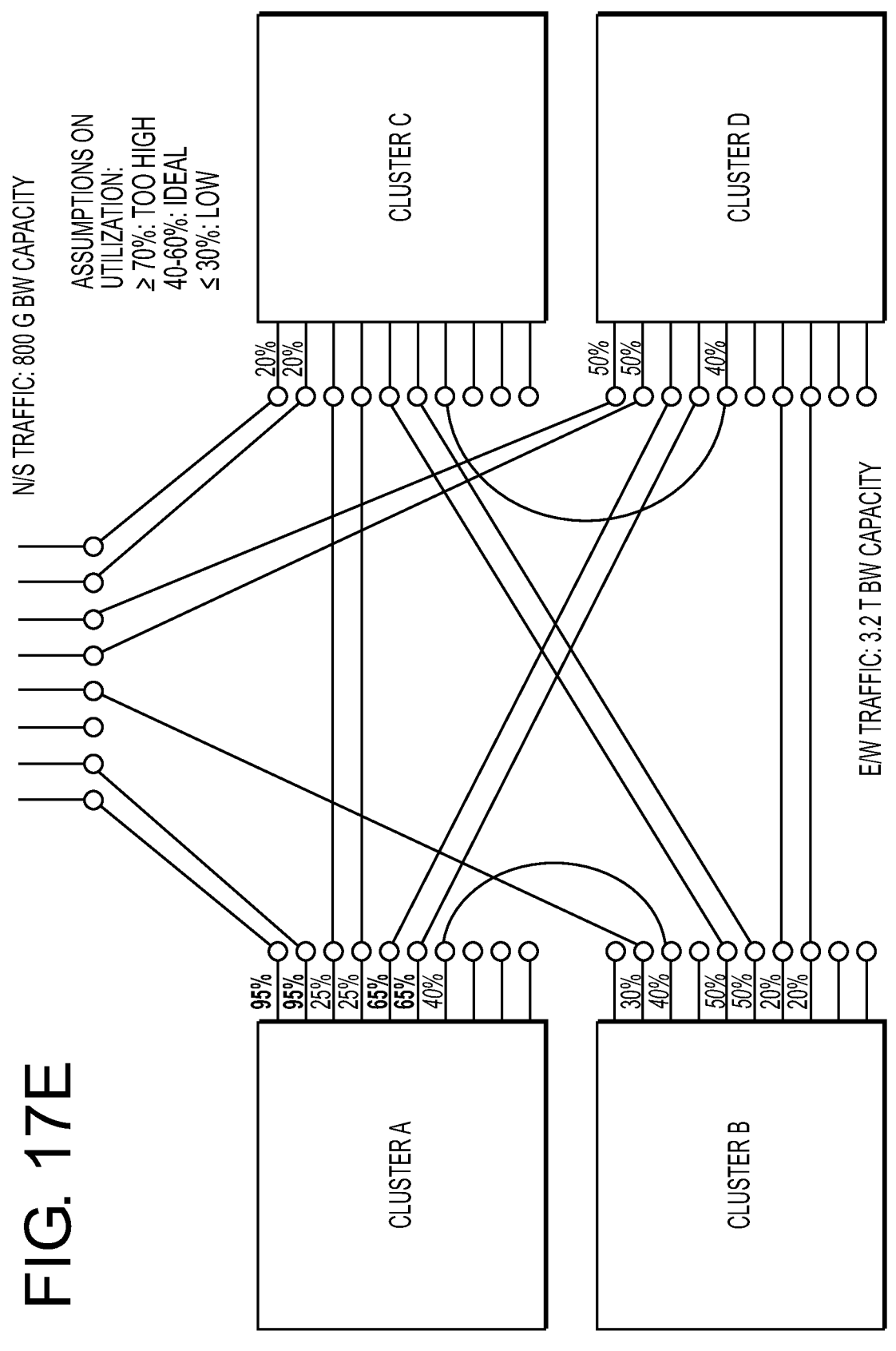
Figure 17F:
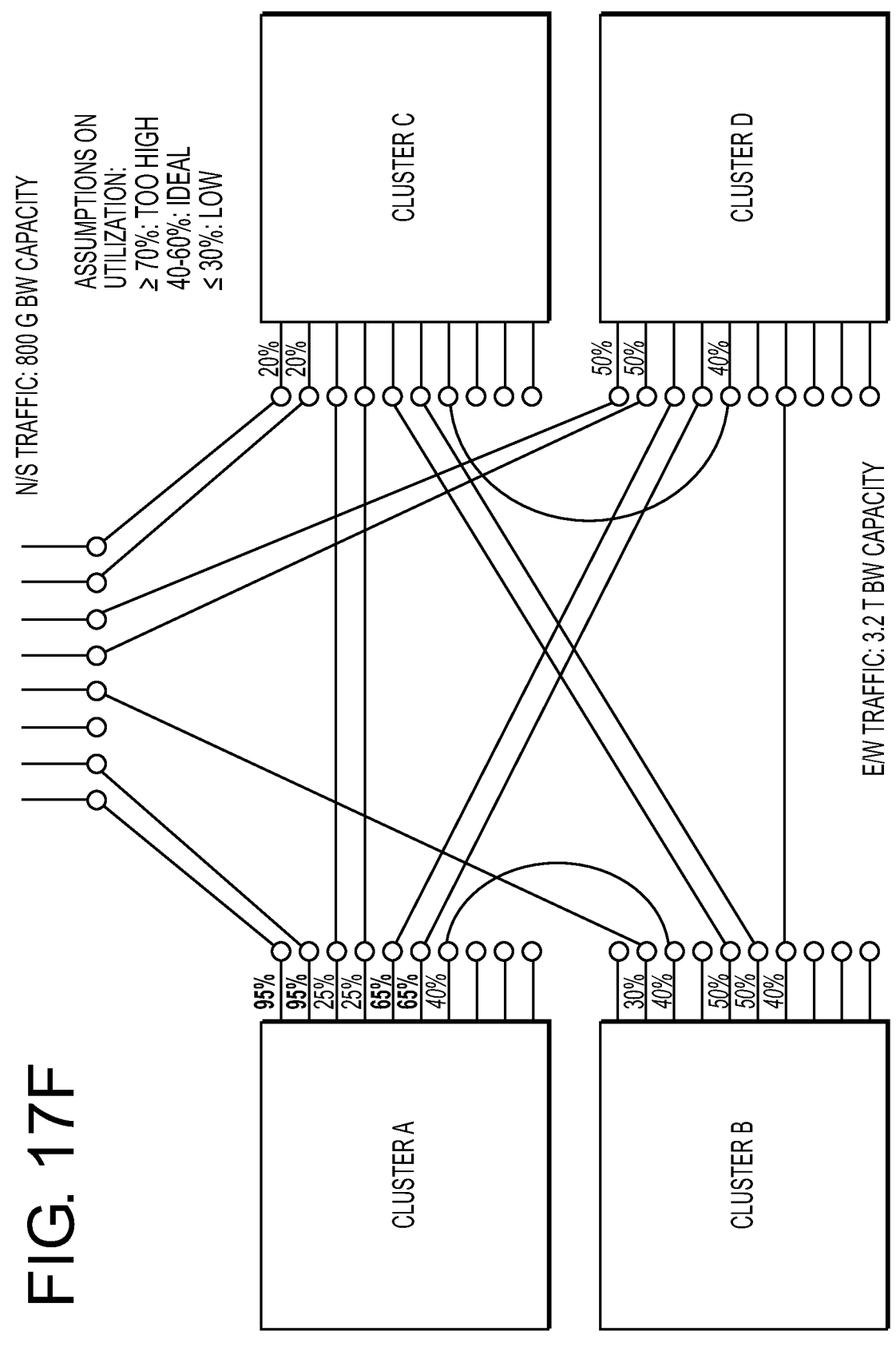
Figure 17G:
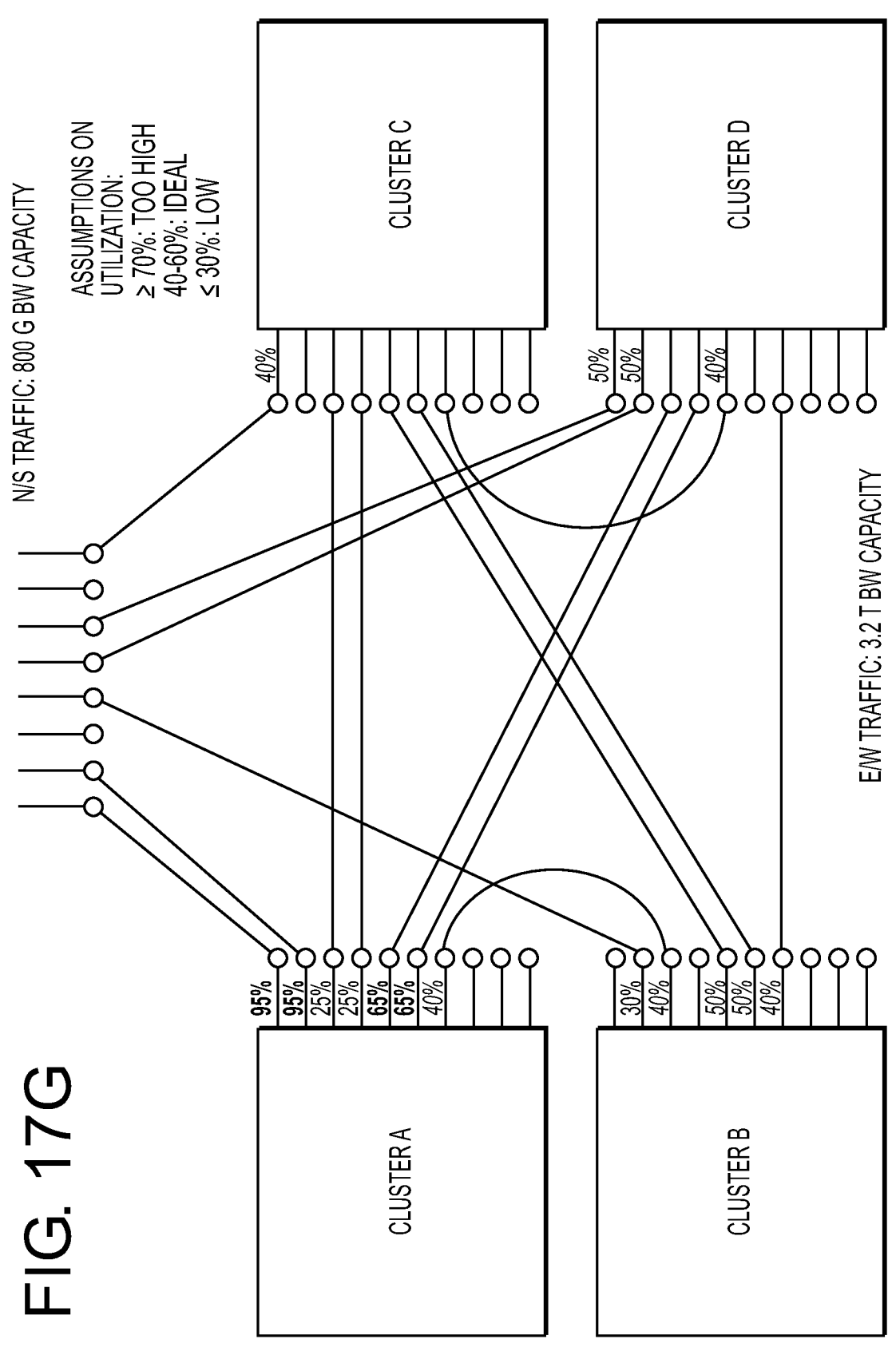
Figure 17H:
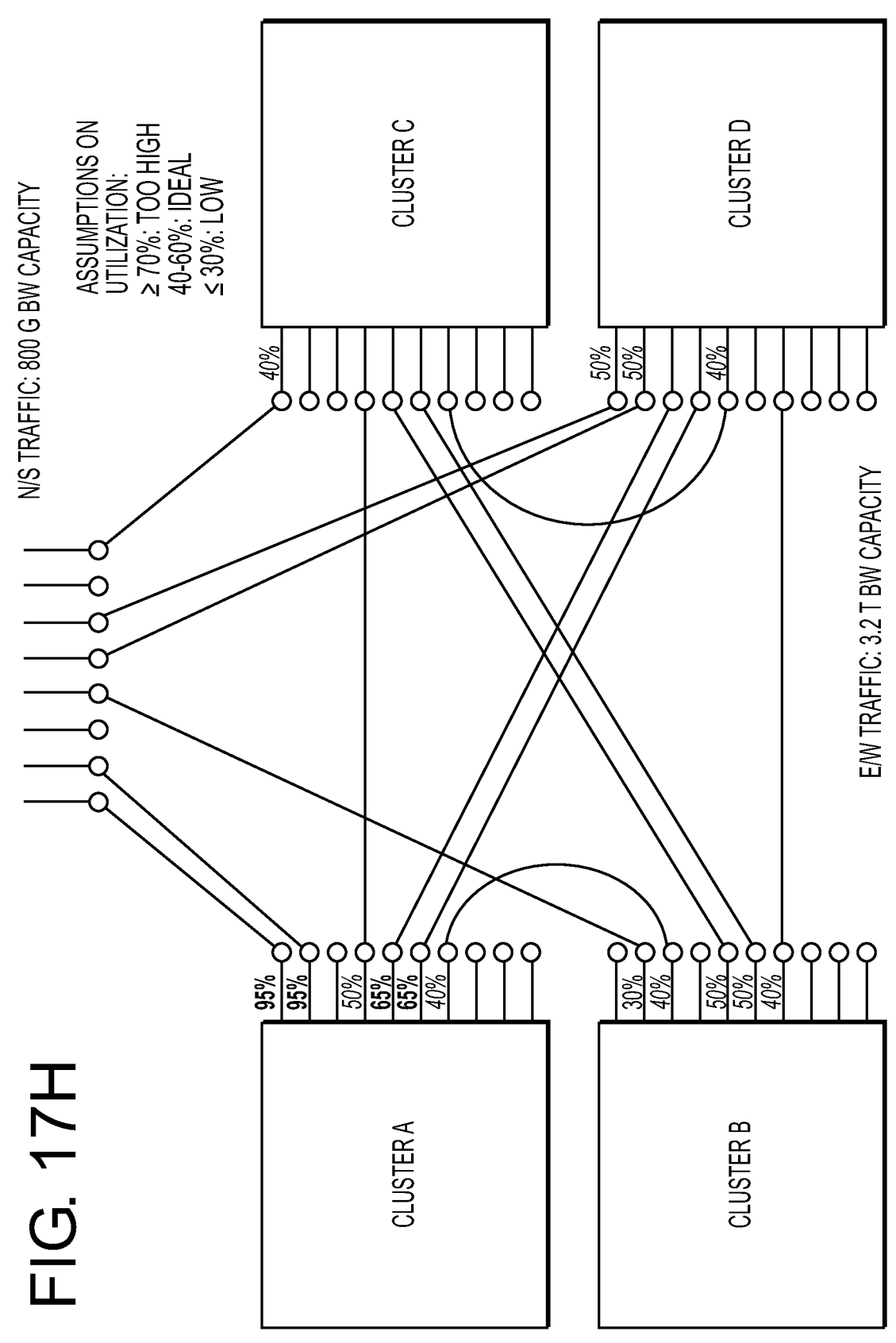
Figure 17I:
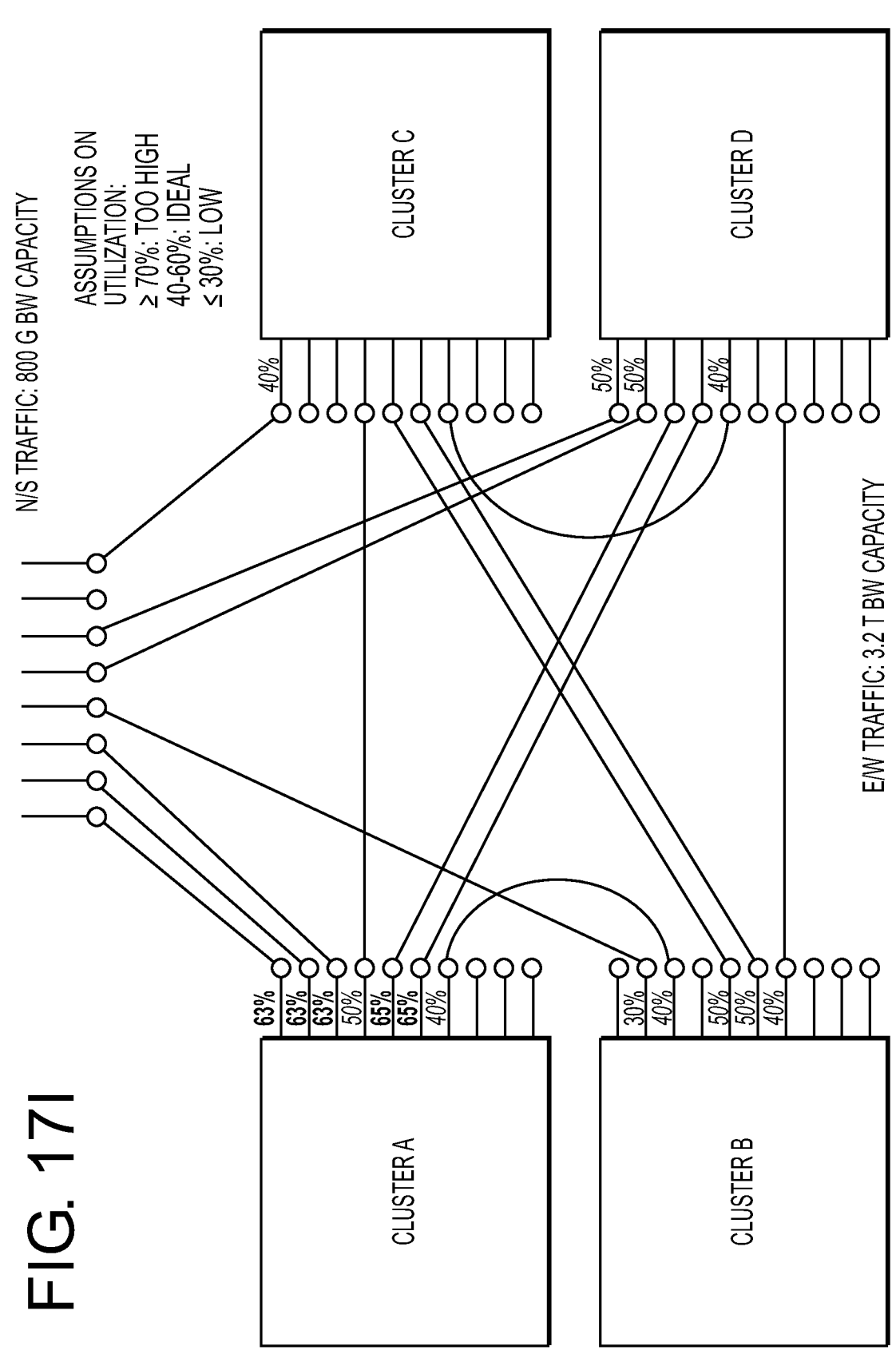
Figure 17J:
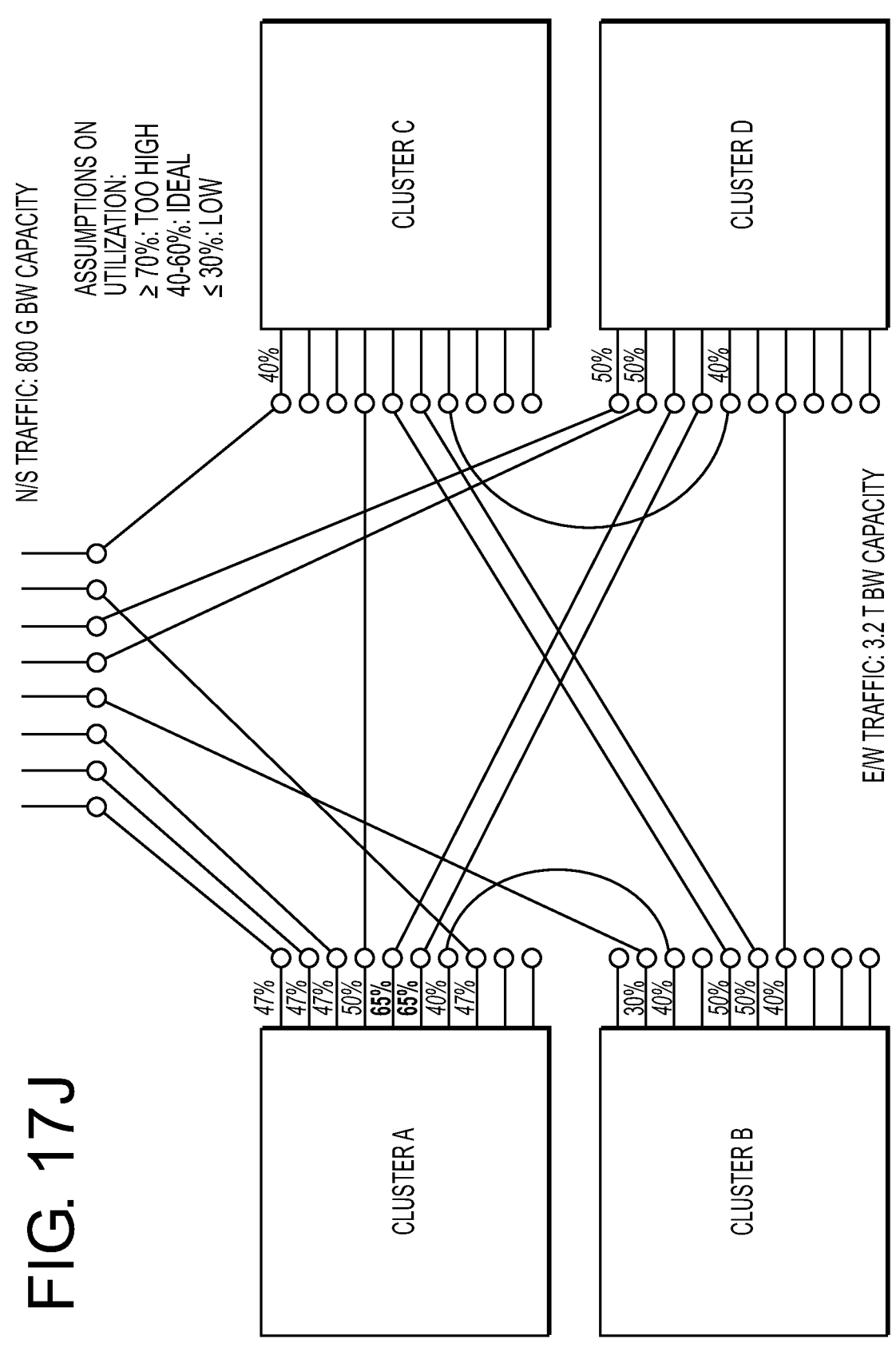
Figure 17K:
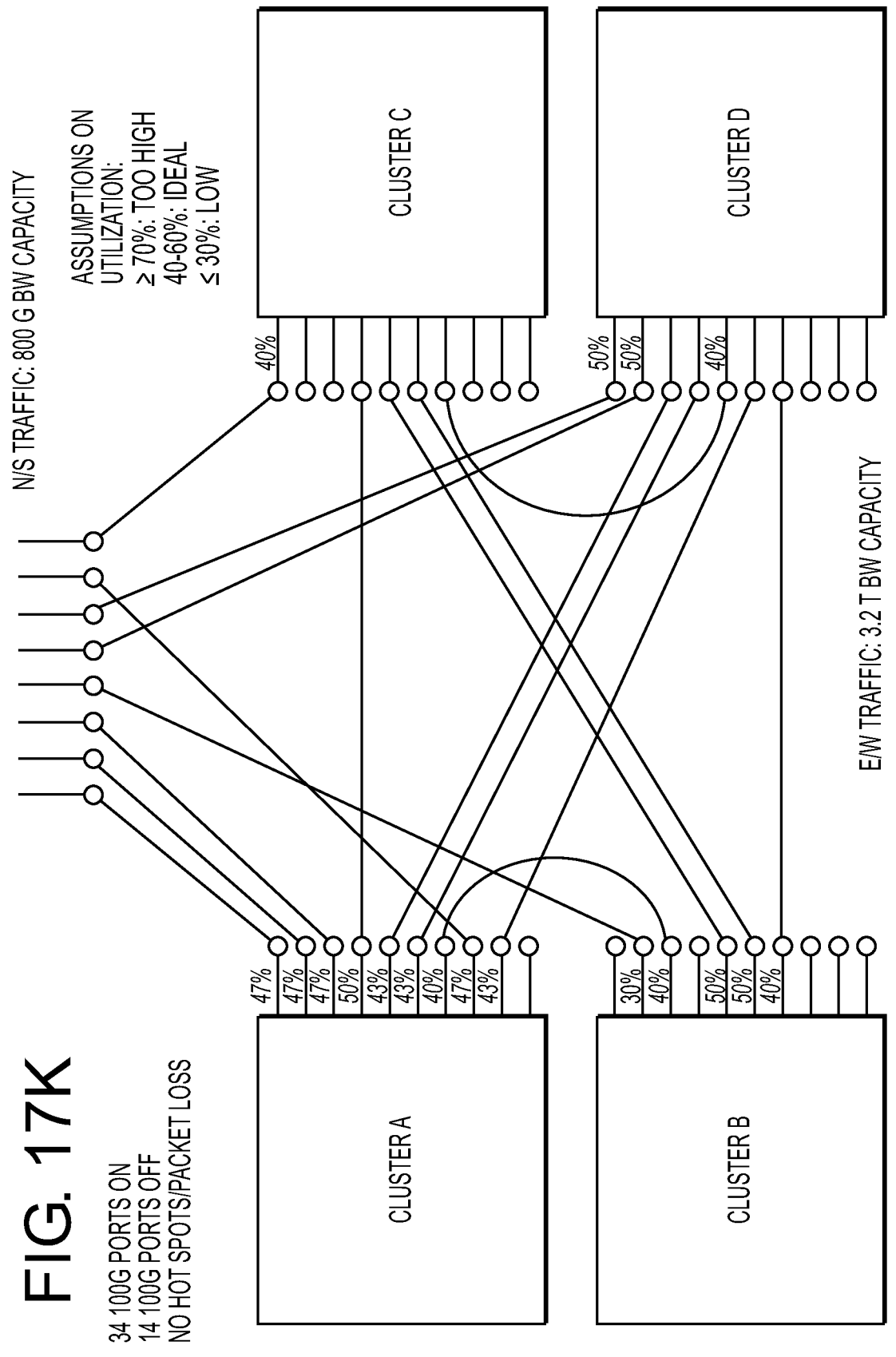

FIGS. 17A-17K depict various configurations of an example data center with four compute clusters connected to a static network. FIG. 17A is a diagram of an example data center with four compute clusters connected by a static network with overutilized links with packet loss in red; FIG. 17B is a diagram of an example data center with four compute clusters connected by a static network with a first pair of underutilized links combined into one link; FIG. 17C is a diagram of an example data center with four compute clusters connected by a static network with a second pair of underutilized links combined into one link; FIG. 17D is a diagram of an example data center with four compute clusters connected by a static network with a third pair of underutilized links combined into one link; FIG. 17E is a diagram of an example data center with four compute clusters connected by a static network with a fourth pair of underutilized links combined into one link; FIG. 17F is a diagram of an example data center with four compute clusters connected by a static network with a fifth pair of underutilized links combined into one link; FIG. 17G is a diagram of an example data center with four compute clusters connected by a static network with a sixth pair of underutilized links combined into one link; FIG. 17H is a diagram of an example data center with four compute clusters connected by a static network with a seventh pair of underutilized links combined into one link; FIG. 17I is a diagram of an example data center with four compute clusters connected by a static network with a first overutilized link split into two links to reduce utilization to 50% or less; FIG. 17J is a diagram of an example data center with four compute clusters connected by a static network with a second overutilized link split into two links to reduce utilization to 50% or less; and FIG. 17K is a diagram of an example data center with four compute clusters connected by a static network with a third overutilized link split into two links to reduce utilization to 50% or less.

Consider an example in which an SDN controller subscribes to the average packet throughput for each port, which provides a measure of utilization. Based on this data for each link (as illustrated in FIG. 17A), the controller instructs the NTM system to reconfigure interconnects in a manner to combine traffic on links with less than minimum utilization threshold (e.g., 40% utilization) onto a single link so that the combined utilization may be less than or equal to a maximum utilization threshold (e.g., 60% utilization) (FIGS. 17B-17H) to free up available ports. Next, traffic may be moved off of links with more than the maximum utilization threshold (e.g., 60% utilization) onto a new parallel link (FIGS. 17I-17K). After this process is completed, utilization lies between the minimum and maximum utilization limits, which, in this particular example, is in the range of 40% to 60%. The determination of optimal values for these limits is dependent on the application (e.g., latency requirements, etc.) and workflows.

Figure 18:
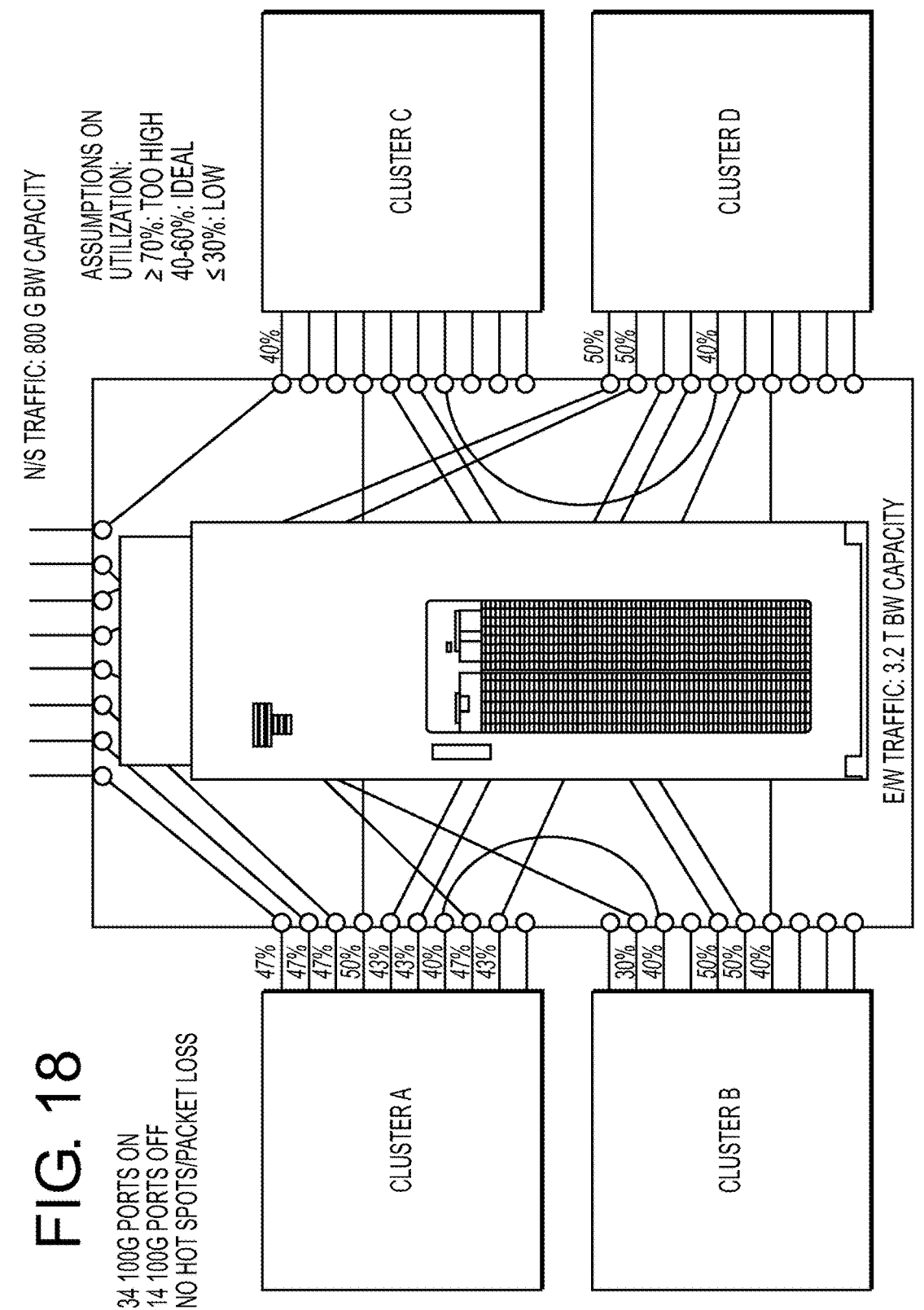
FIG. 18 is a diagram of an example data center with four compute clusters connected by a programmable network using an NTM according to exemplary embodiments hereof.

As a result of this load balancing process, ports are freed up and available in reserve for future bandwidth growth, or as hot standbys in case of line card and/or transceiver failure. It is generally impractical to perform this load balancing process by directing technicians to move cables. However, this load balancing process can be performed automatically using the NTM as shown in FIG. 18 to make this process a routine part of network operations.

Congestion is a significant cause of packet loss in data center networks, and it typically occurs on highly utilized or over-utilized links. Packet corruption occurs when receiver cannot correctly decode the transmitted bits. For instance, decoding errors cause the cyclic redundancy check in the Ethernet frame to fail and forces the receiver to drop the packet. The primary cause of packet corruption is damaged, dirty fiber optic connectors and excessive fiber bends.

Packet loss results from both congestion and corruption. Corruption impacts fewer links than congestion but imposes a heavier loss rate. Unlike packet congestion, the packet corruption rate on a link is stable over time and is not correlated with its utilization. Load balancing therefore helps to mitigate packet congestion and the resulting packet loss. Packet loss has a significant impact on data center performance. According to Riverbed Technology: "Comparing Simulated Packet Loss and Real-World Network Congestion,"

Packet losses in data center networks hurt applications and lead to millions of dollars in lost revenue Loss rates of 0.01% can cause TCP throughput to drop by 50%

Sporadic packet loss can cause catastrophic virtual machine reboots

In a particular example, the benefits of physical link load balancing include the elimination of packet loss due to congestion. It can reduce the number of optical ports by 15% and thereby reduce the power consumption of the networks by 15%. The use of NTM versus technicians to make physical connections eliminates excess insertion loss due to human error and the resulting packet loss.

FIG. 16 is a flowchart of a network optimization process 1600 according to exemplary embodiments hereof. With reference to FIG. 16, an NTM is installed (at 1602) and the connectors are cleaned (at 1604). Then (at 1606), external cables are cleaned, inspected, and installed and the network is turned on (at 1608). Switches and servers are monitored for packet corruption (at 1610). Equipment exhibiting high packet loss is identified (at 1612), and an interconnect database is searched (at 1614) to determine which interconnect(s) in which NTM(s) are connecting affected equipment. Next (at 1616), reflectivity scans are performed on the identified interconnects. The scans are then analyzed (at 1618) for high insertion loss and/or high backreflections, and, based on the scans, the location(s) of the problem is determined (at 1620). The NTM may then be used (at 1622) to bypass or fix the problem or to instruct a technician as to what location in the physical network is causing the problem.

Figure 19:
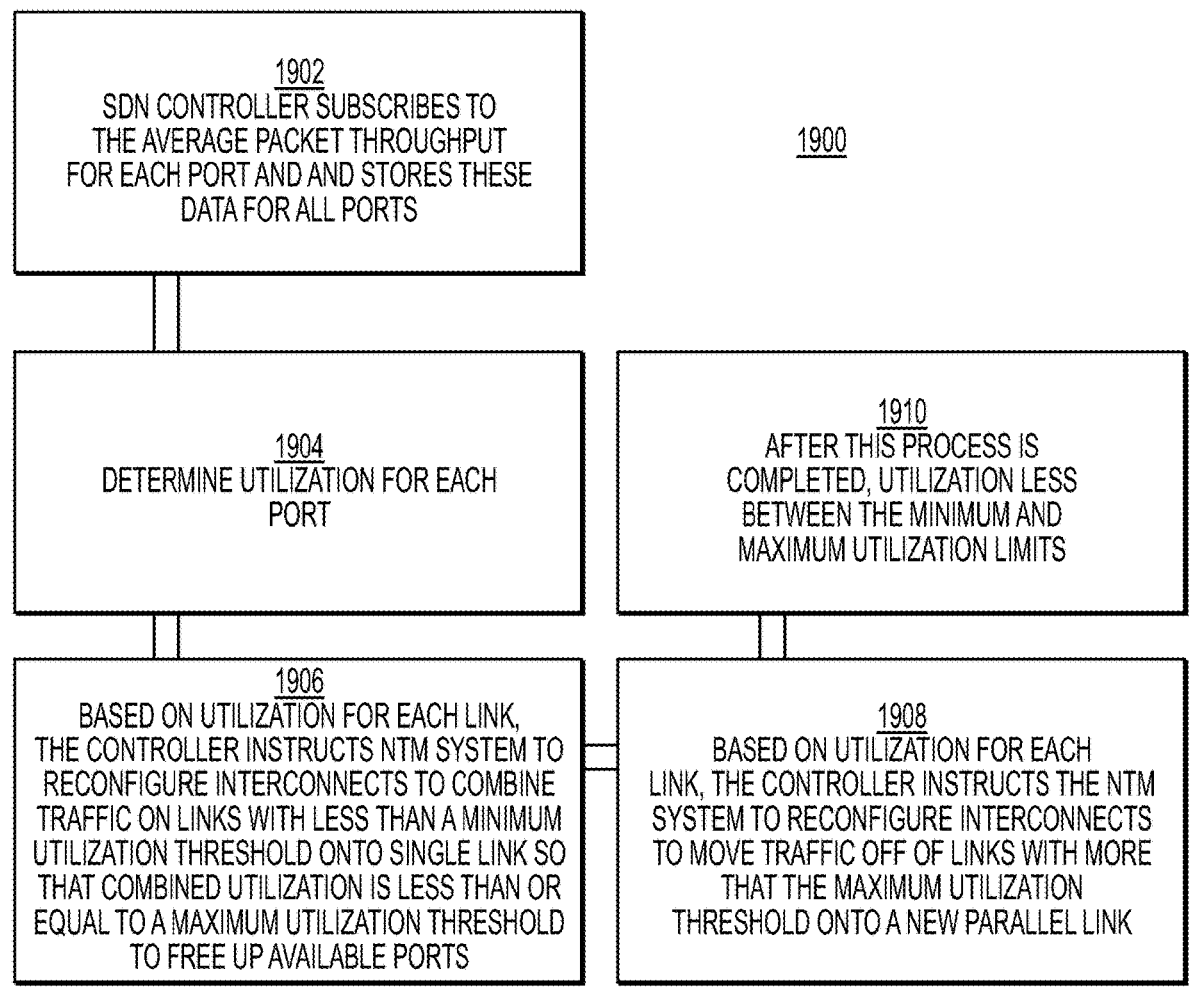
FIG. 19 is a flow diagram in which port utilization data is used to physically load balance a multiplicity of links using the NTM according to exemplary embodiments hereof.

FIG. 19 is a flow diagram of an exemplary process in which port utilization data are used to physically load balance a multiplicity of links using the NTM, according to exemplary embodiments hereof. With reference to the flowchart 1900 in FIG. 19, first (at 1902), the SDN controller subscribes to the average packet throughput for each port and stores these data for all ports. Then the utilization for each port is determined (at 1904). Based on utilization for each link, (at 1906) the controller instructs the NTM system to reconfigure interconnects to combine traffic on links with less that a minimum utilization threshold onto a single link so that the combined utilization is less than or equal to a maximum utilization threshold to free up available ports. Based on utilization for each link, (at 1908) the controller instructs the NTM system to reconfigure interconnects to move traffic off of links with more than the maximum utilization threshold onto a new parallel link. After this process is completed (at 1910), utilization lies between the minimum and maximum utilization limits.

By applying machine learning to the link utilization data for the network, as illustrated in block diagram of FIG. 19, the system determines how to optimally pre-provision unused, spare ports for future capacity demands and transceiver failures. Moreover, automatic OTDR testing may be used to identify the cause of packet corruption and these measurements are used to fix problem or reroute traffic. As should be appreciated, physical link load balancing enables the cloud to accelerate cloud service turn-on and revenue generation, improve network availability, improve overall network/data center utilization and improve customer satisfaction.

Example 8: Flexible Interconnection of Heterogeneous Server and Switch Environments to Improve Utilization In an additional example, data centers typically deploy IT equipment (web servers, storage servers, cache servers, switches, etc.) that is heterogeneous (e.g., many different CPU/GPU server types optimized for different workflows) to support a wide range of customer requirements (web hosting, database, data mining, machine learning, backup, secure transactions, 3D graphics, analytics, etc.). Dynamic workflow changes drive significant changes in how the cloud hardware infrastructure may be provisioned for each customer. The heterogeneous hardware must be assembled into clusters based on each cloud customer's requirements. In many cases, high performance custom applications cannot run efficiently on generic virtualized servers and require dedicated physical servers.

In a further example, the NTM enables traffic optimization to alleviate hot spots by provisioning supplemental links that support peak demand while a set of static baseline links handles the average demand. The NTM first provisions a supplemental link in parallel with congested baseline link, to ensure that the network remains operational. The software management system integrates with the NTM platform to add and remove servers, switches and routers to the baseline configuration based on demand. This enables hardware partitioning and optimizes the fiber network to support cloud data center back-up, caching and migration. Reconfiguration can also accommodate predictable diurnal variations in network traffic, allowing topology changes to be pre-tested and introduced into the production network on a scheduled basis.

Example 9: Automation and Software Control to Enhance Cybersecurity and Harden the Network The physical network topology of even the most advanced data centers is relatively static. This may be partly the result of the labor cost and risk associated with manual reconfiguration. This has important consequences from a cybersecurity perspective, as the "target surface" in the context of vulnerabilities to a cyber-attack is large for such a static system. Attackers can collect information about the network over an extended period of time to map out vulnerabilities and plan attacks.

Therefore, in a further example the NTM system enables the physical network connectivity to be changed and adds a level of unpredictability when viewed from the outside. In addition, the NTM can robotically deploy dynamic honeypots, so that cyber attackers are monitored and trapped within dummy networks free of critical assets. The detection of an attack can, for example, be used to trigger the automated deployment of an "air gap" or physical disconnection within the NTM. Similar to the previous use case, the ability of robots to perform rapid, low cost, error-free reconfigurations enable this agile mode of operation. The concept of an agile network enabled by the NTM is synergistic with a moving-target defense strategy.

In addition, Deep Packet Inspection (DPI) and monitoring across a broad network can be economically implemented using the NTM. The NTM enables security devices such as DPI testers to be shared across a network by deploying tap couplers on each interconnect and switching-in shared monitor resources on-demand. This reduces the enormous costs associated with adding security devices to each and every network link.

Example 10: Advanced Health Monitoring and Analytics Through Automated Scheduling and Time Sharing In a further example, the NTM system enables each interconnect to be configured with a switchable, low loss tap monitor output fiber that allows signals to be extracted or inserted onto each interconnect in a low loss, non-invasive fashion. An NTM configures/reconfigures these monitor output fibers to a suite of test equipment integrated into the NTM. The NTM periodically reconfigures and monitors every port for key optical performance indicators. Machine learning tools and analytics allow this data to be processed, driving reconfigurations and corrective actions to improve the reliability, availability and utilization of the data center.

Figure 20:
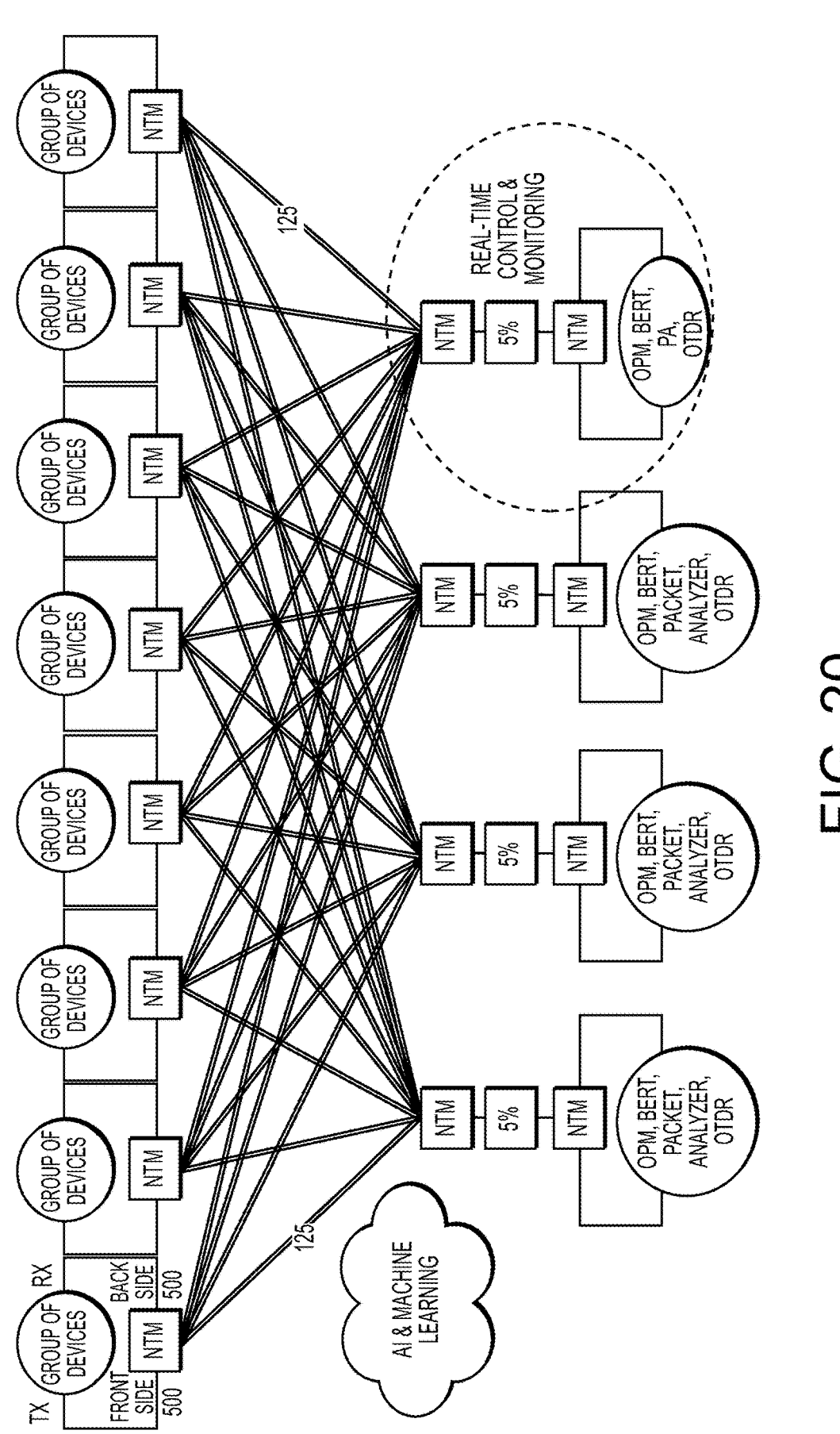
FIG. 20 is a diagram of an example two-tier leaf-spine or hub and spoke NTM system with in-line tap splitters for real time control and monitoring.

A schematic diagram of an exemplary multi-stage NTM with integral 5% tap monitors switched among shared test equipment (OPM, BERT, Packet Analyzer, OTDR, OCDR) is shown in FIG. 20. This configuration supports non-blocking connectivity over 4,000 duplex devices with the ability to monitor the health of every link non-invasively and in real time.

Processes that currently take weeks to schedule and require an onsite technician can be replaced by a robot performing these same processes with no delay and no errors. Advanced NTM health monitoring applications result in particularly high NTM usage rates (10,000+ reconfigurations per year). Since monitoring instrumentation may be shared among a large number of interconnections, robotic reconfiguration of optical test circuits may be required to extend the monitoring capability to all interconnects in a facility. For an average of 1 hour of labor per reconfiguration and 5,000 reconfigurations, this high rate of reconfiguration would be cost prohibitive to perform manually and would subject the network to an increased risk of human error and downtime.

Example 11: Large Scale, Containerized Cross-Connect Pods

The automated cross-connect system can be deployed in a container with multiple interconnected units therein. For example, a system of NTMs as illustrated in FIGS. 38A-44 can be arranged in a leaf/spine configuration and packaged within a transportable container is disclosed. The inputs/outputs of the leaf and connected to the outputs/inputs of the spine. The container includes a user accessible aisle and each NTM can be moved/slid into or out of the aisle on rollers, floor tracks, etc.

Benefits of the NTM pod architecture include some or all of the following:

(1) Frees-up space in a potentially full Meet-Me-Room (MMR) in a colocation data center (2) Eliminates inventory errors resulting from incorrect, intermediate manual connections (3) Fiber plant becomes static and hard-wired, with fixed inventory of connections, while having the flexibility of software programmability (4) Eliminates excess insertion loss by eliminating intermediate connectors along the interconnect and thereby eliminates connector contamination issues (5) Frees technicians from menial and tedious cabling tasks (6) Frees up operations to focus on higher priority and more common servicing responsibilities including power, A/C, UPS, security (7) Enables trunk cabling to be reused over the 10+year lifecycle of facility (8) Eliminates 3-year obsolescence cycle of cabling due to churn of physical cross-connect services (9) Accelerates installation of fiber plant and data center turn-up.

Figures 21A, 21B:
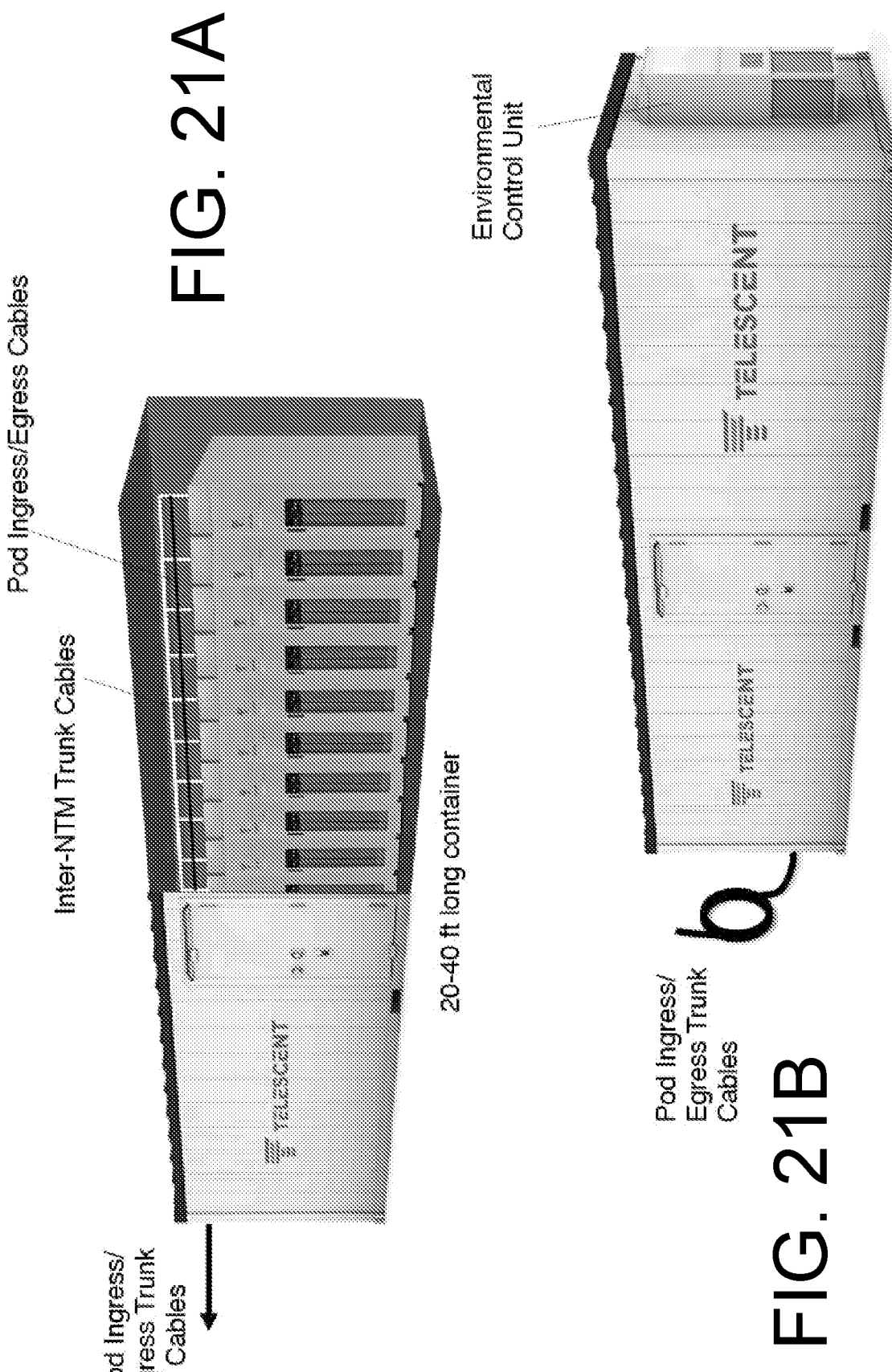
FIGS. 21A-21B depict aspects of NTMs within containers to form pods, according to exemplary embodiments hereof.

FIG. 21A is a partial cutaway view of an exemplary system of NTMs within a container to form an NTM pod, according to exemplary embodiments hereof, as shown in a partial cutaway view. For example, the containerized NTMs may have a capacity 10K-50K ports in leaf-spine architecture. Management complexity and path optimization is controlled by a software orchestrator. The interconnections internal to the container are factory preconfigured and pretested and terminated in large fiber count trunk cables (e.g., 864 fibers per cable) that can be spliced directly to customer cage pre-cabling. An integrated OTDR/light source can be switched onto any interconnect terminated within the pod, to certify and validate the operation of the interconnect fabric of an entire data center, data center campus, or metro area network. Containers NTMs can speed the commissioning of new data centers.

FIG. 21B illustrates an exemplary system of NTMs within an air conditioned, lockable container to form an NTM pod, according to exemplary embodiments hereof, shown in perspective view with multi-fiber trunk cables exiting therefrom. For example, the system may be enclosed by a shipping container and/or modular office with dimensions of, e.g., 8×20, 8×30, 8×40, or 10×30 feet.

Figure 22:
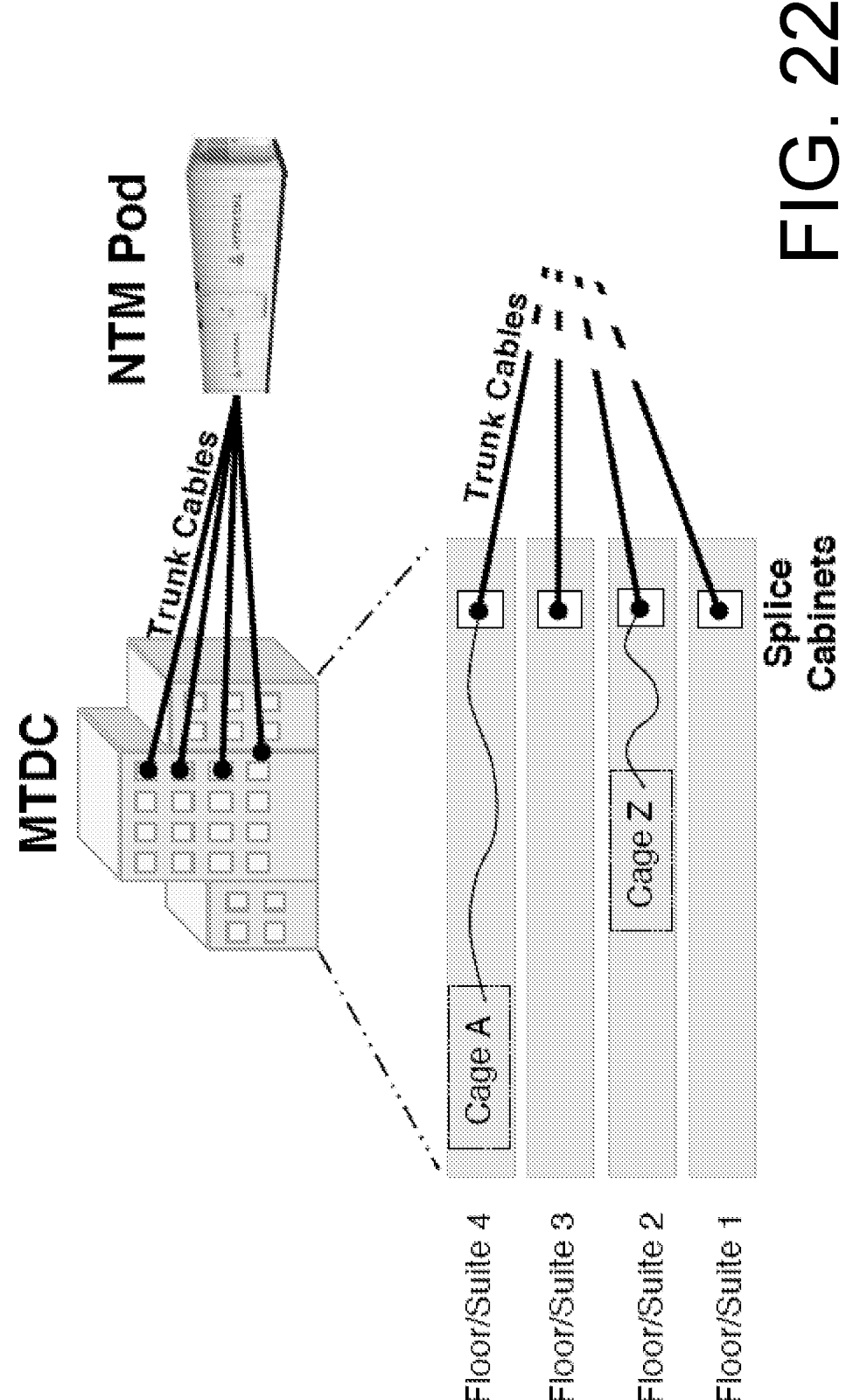
FIG. 22 is a diagram of an NTM pod with multiple multi-fiber trunk cables, each trunk cable routed to a different location within a facility, such that relatively short cables emanating from cages can be spliced to constituent fibers within jacketed multi-fiber trunk cables.

FIG. 22 is a diagram of an NTM pod according to exemplary embodiments hereof, with multiple multi-fiber trunk cables, each trunk cable routed to a different location within a facility, such that relatively short cables emanating from cages can be spliced to constituent fibers within jacketed multi-fiber trunk cables.

Figure 23:
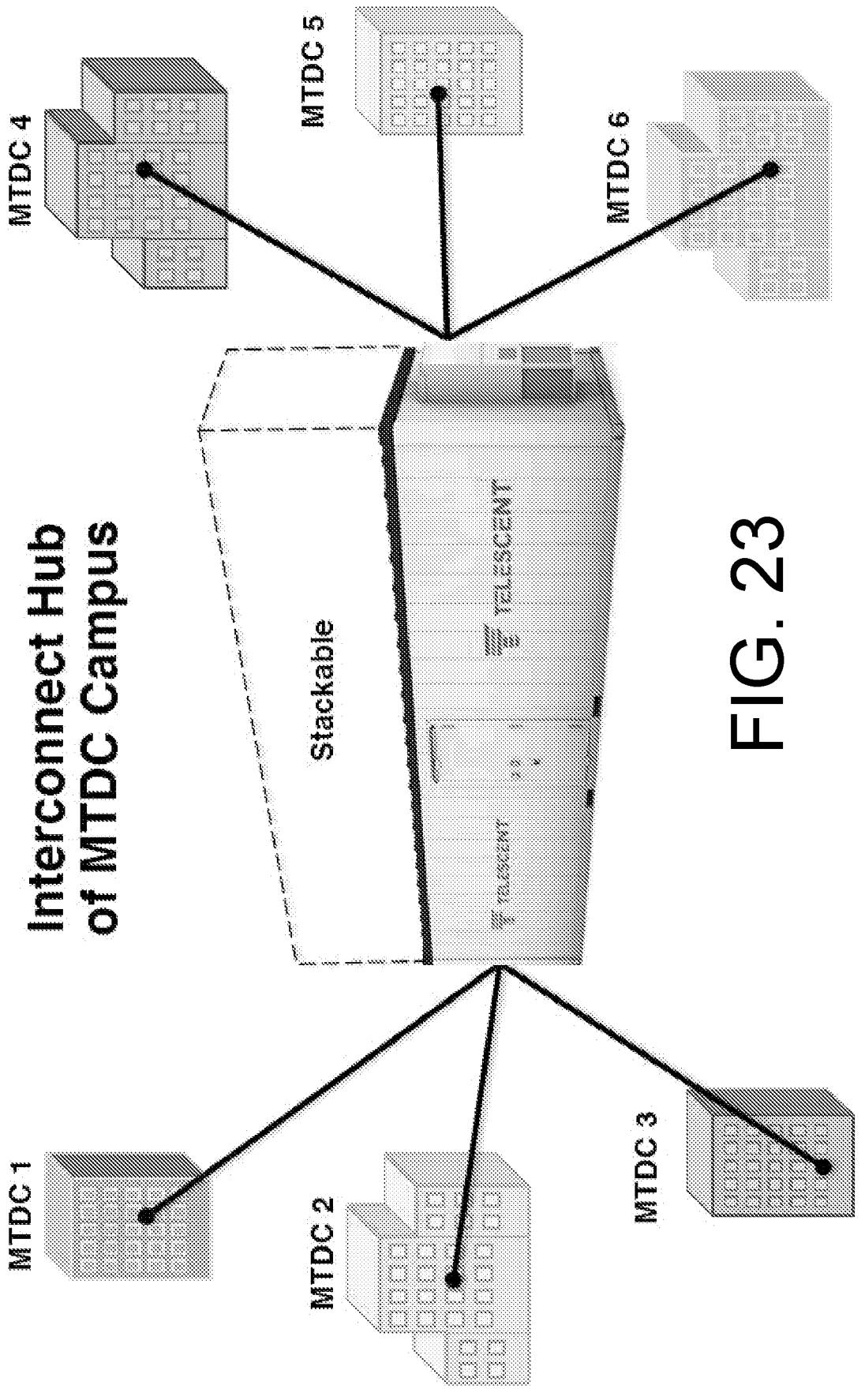
FIG. 23 is a diagram of an NTM pod serving as an interconnect hub, interconnecting multiple buildings in a campus, for example, according to exemplary embodiments hereof.

FIG. 23 is a diagram of an NTM pod, according to exemplary embodiments hereof, serving as an interconnect hub, interconnecting multiple buildings in a campus, for example. In this example, multiple pods can be stacked on top of one another to increase port capacity.

FIGS. 24A-24B/42 are top views of two different NTM pod configurations according to exemplary embodiments hereof, with multiple NTM elements of either 1,008 or 2,016 interconnects each, arranged within a 30'×10' container with a central access aisle.

Figure 25A:
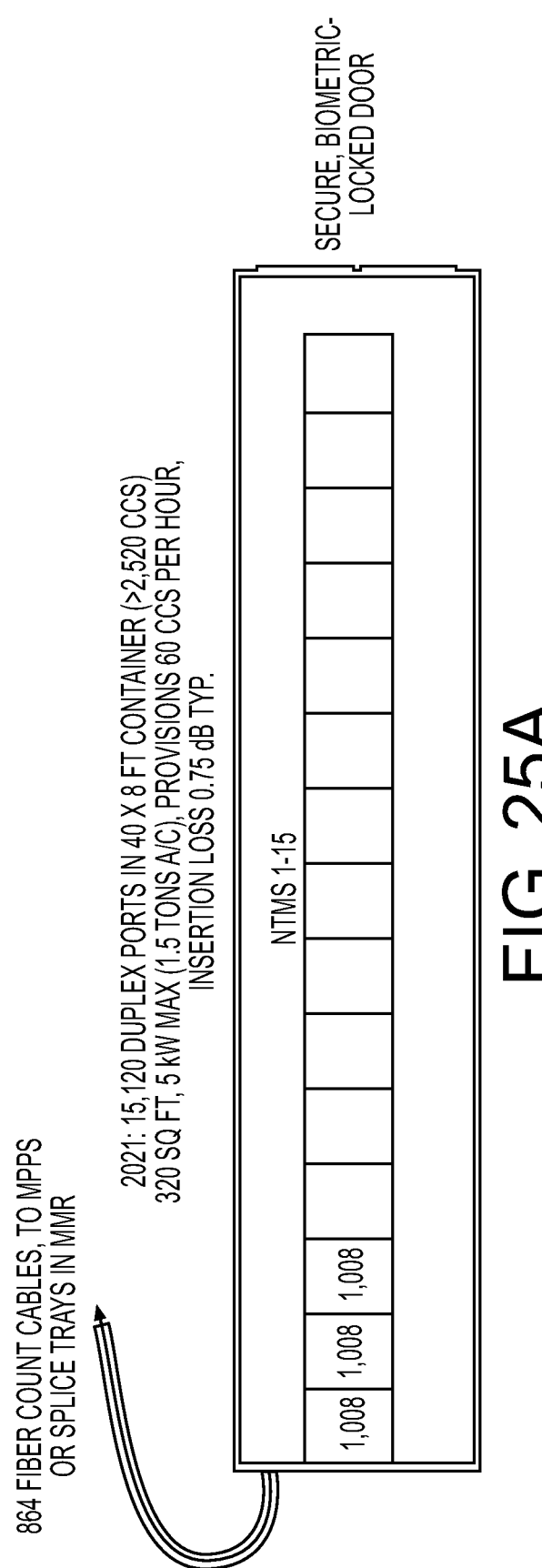
FIGS. 25A-25B are top views of two NTM pod configurations, according to exemplary embodiments hereof, with multiple NTM elements of either 1,008 or 2,016 interconnects each, arranged in a 40'×8' container with an access aisle.
Figure 25B:
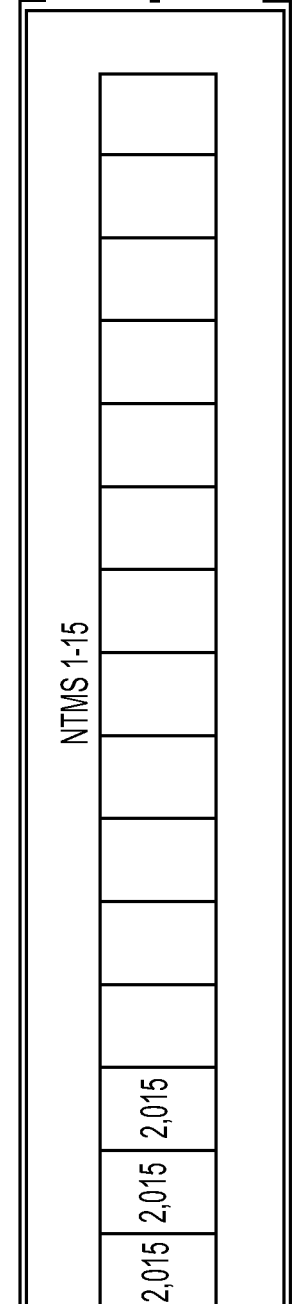

FIG. 25A-25B are top views of two NTM pod configurations according to exemplary embodiments hereof, with multiple NTM elements of either 1,008 or 2,016 interconnects each, arranged in a 40'×8' container with an access aisle.

Figure 26:
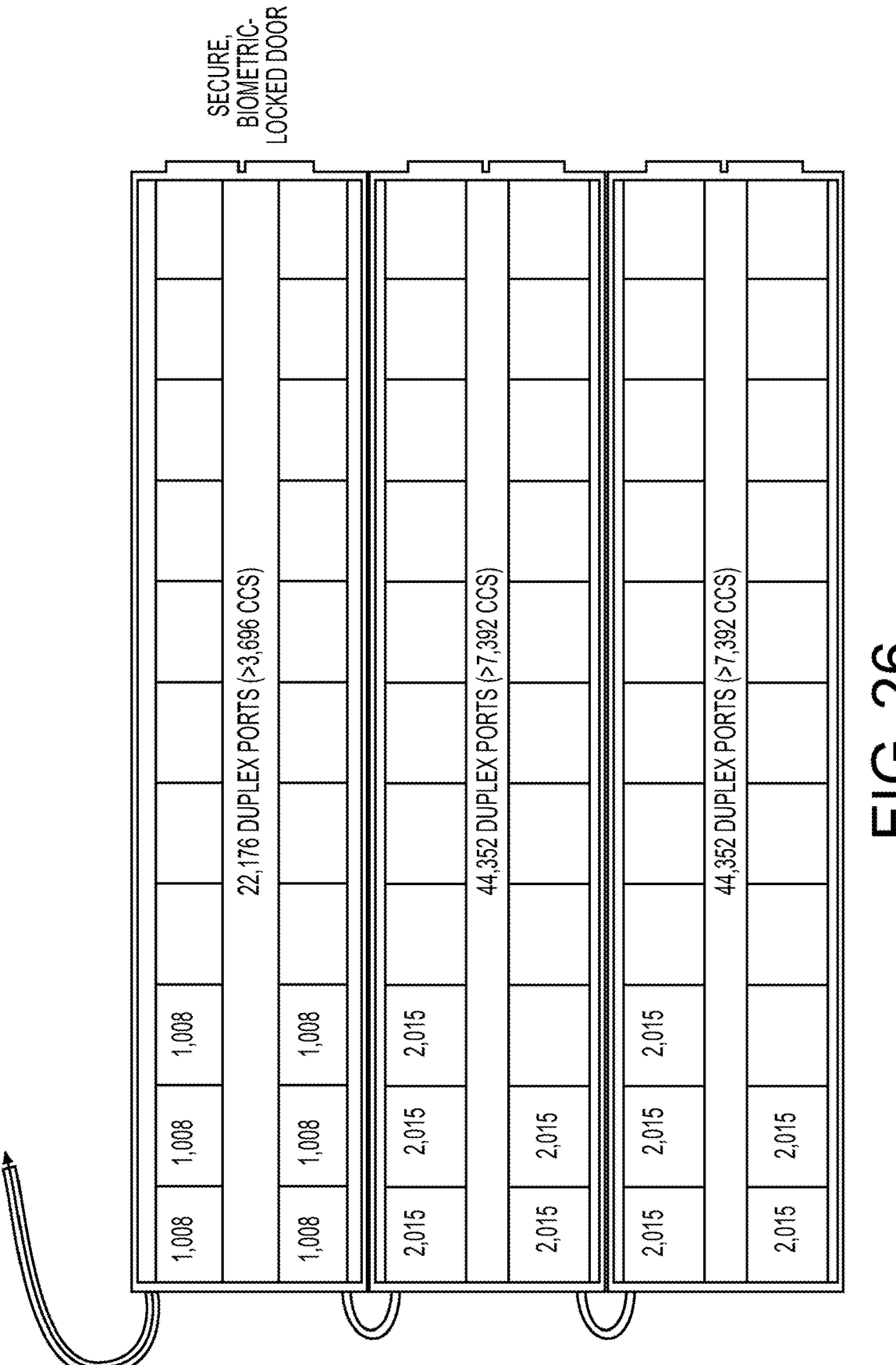
FIG. 26 is a top view of a multi-pod configuration according to exemplary embodiments hereof, with three pods combined and interconnected with one-another to form a larger pod with substantially non-blocking connectivity.

FIG. 26 is a top view of a multi-pod configuration according to exemplary embodiments hereof, with three pods combined and interconnected with one-another to form a larger pod with substantially non-blocking connectivity. An example MMR as in FIG. 26 includes 55,440 duplex ports (greater than 18,480 CCs), uses 1,000 square feet, 35 kW Mx (10 tons a/c), provisions 220 CCs per hour, insertion loss 0.75 dB Typ.

The features of an NTM pod make it ideal for Automated, Virtual-MMR upgrades in brownfield DCs or in new greenfield DCs These features include the following:

(1) Pre-cabling to the cages of colocation center customers can be directly spliced-in to trunk fibers connected to pod at a high-density splice cabinet, thereby bypassing intermediate connection points.

(2) Eliminates all intermediate patch-panels.

(3) Total insertion loss is minimized, because there are potentially less than or equal to 3 intermediate connector interfaces on any interconnect within the self-contained pod.

(4) Entire MMR fiber plant is factory pre-tested and certified as part of pod solution.

(5) Entire fiber plant is managed, monitored and mapped by a software orchestrator/management system.

Example 12: NTM High Density Configuration

Figure 27:
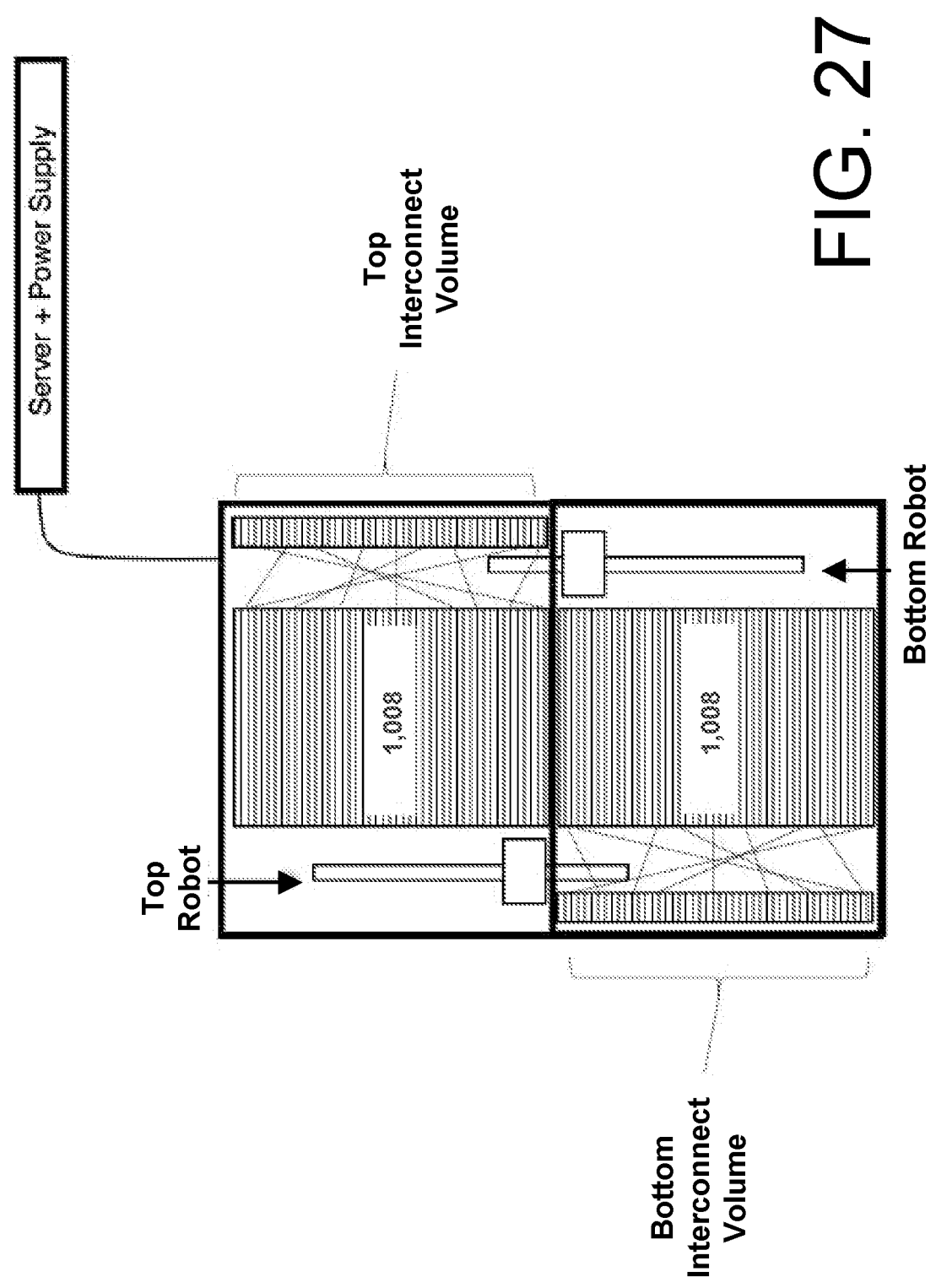
FIG. 27 is a schematic side view illustrating the placement of front and back NTMs within a common enclosure according to exemplary embodiments hereof.

As shown in FIG. 27, two independent 1,008 port NTMs may be co-packaged within a common enclosure, each independent NTM having its own robot. This packing approach makes optimal use of the volume within the enclosure and thereby maximizes the automated cross-con-nect density. With this approach, 2,016 ports can fit within the floorspace of a typical 19" server cabinet. The system includes a top robot that accesses and configures a lower interconnect volume, and a bottom robot that accesses and reconfigures an upper interconnect volume. The robots may move in parallel to establish multiple connections in paral-lel. Each robot separately actuates its corresponding set of 1,008 interconnects.

Example 13: NTM Configuration for Fast Execution of Reconfiguration Batches

In a further example, one or more NTM units can be used in a compute or data transfer system to perform scheduled reconfiguration of batches of physical interconnects for software application performance optimization (FIGS. 28A-28C and 29).

Figure 28A:
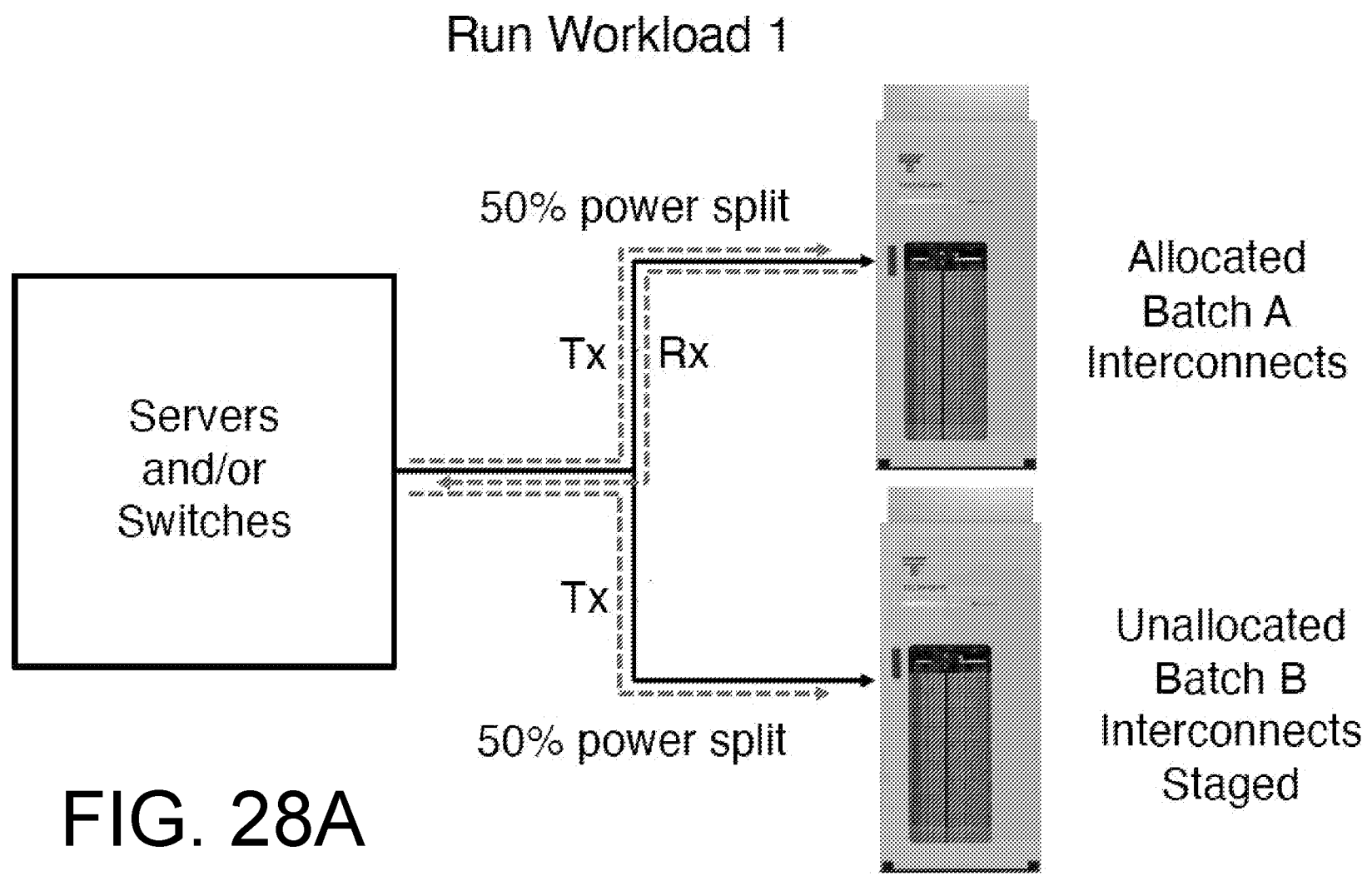
Figure 28B:
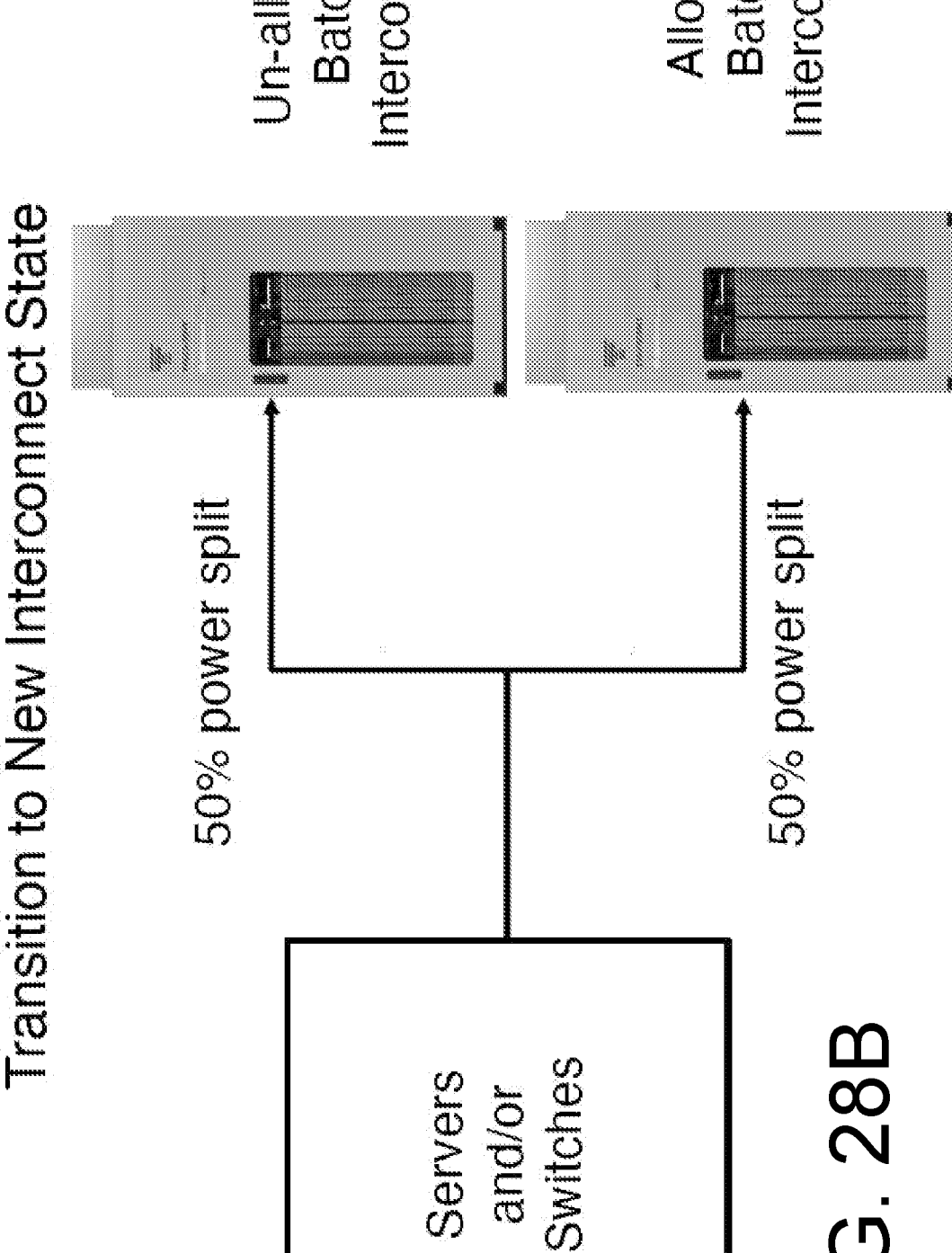
FIG. 28B illustrates the multi-NTM configuration of FIG. 28A, such that when channels A are active, the connectivity is provided by the batch A of allocated interconnects.
Figure 28C:
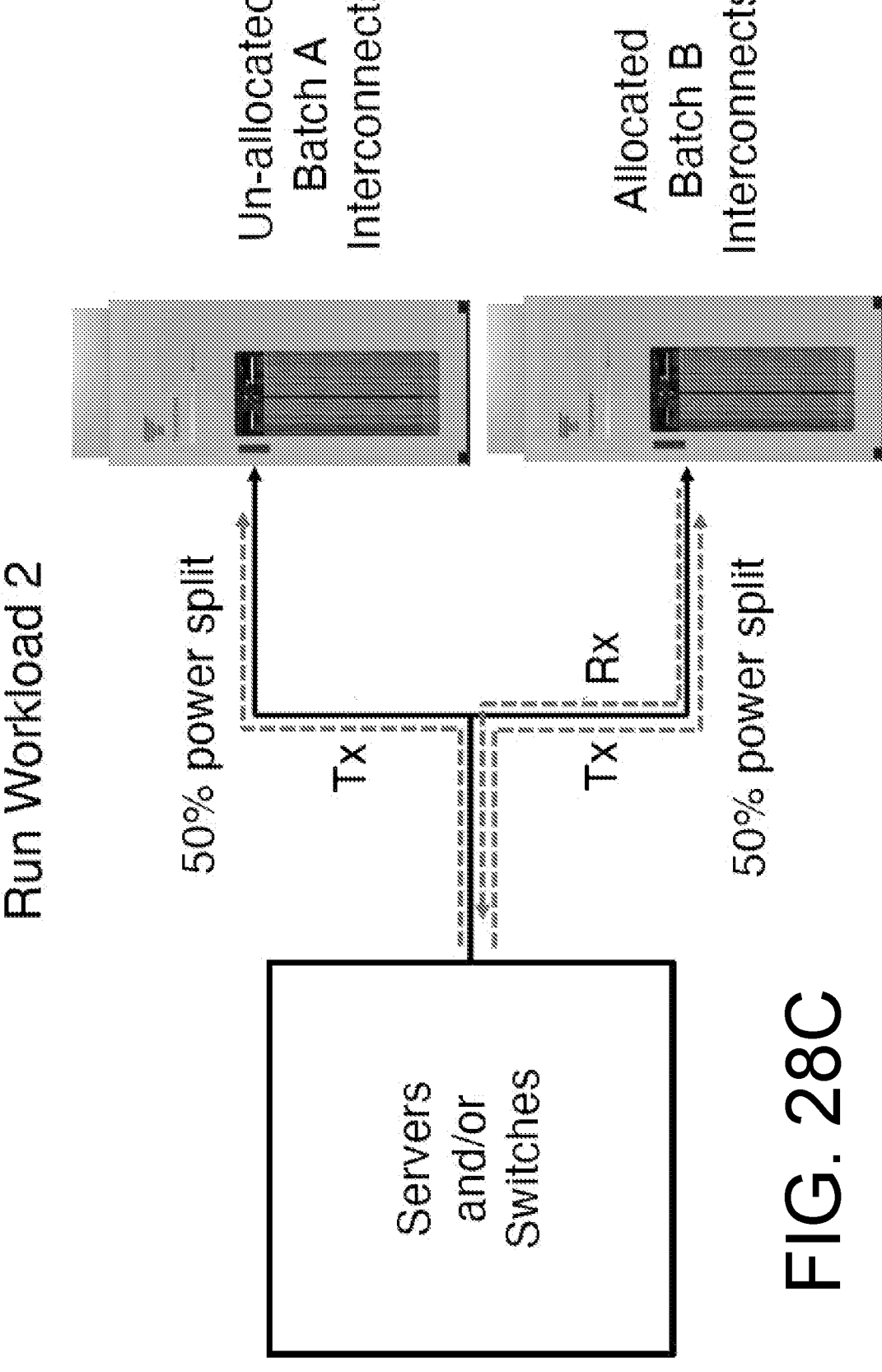
FIG. 28C illustrates the multi-NTM configuration of FIG. 28A, such that when channels B are active the connectivity is provided by the batch B of allocated interconnects.

FIG. 28A illustrates a multi-NTM configuration according to exemplary embodiments hereof in which each signal channel is split into two parallel channels A and B. FIG. 28B illustrates the exemplary multi-NTM configuration such that when channels A are active, the connectivity is provided by the batch A of allocated interconnects. FIG. 28C illustrates the exemplary multi-NTM configuration such that when channels B are active the connectivity is provided by the batch B of allocated interconnects.

FIG. 29 is a flow chart of a batch-processing process 2900 to rapidly switch between unallocated and allocated inter-connect states according to exemplary embodiments hereof.

The workflow (and network communication) starts once the batch of physical interconnects has been executed. The communication links between each pair of network devices are split at each end by 50/50 power splitters or 1×2 optical switches and follow two parallel paths therebetween, to and from NTM(s), as shown in FIG. 28A. Only one path or the other is transmitting (allocated), while the other parallel path is disconnected (unallocated). For a multi-fiber application, the two sets of parallel paths comprise a batch 1 of inter-connects and a separate batch 2 of interconnects. FIG. 28B illustrates the multi-NTM configuration such that when channels A are active and connected, the connectivity is provided by the batch A of allocated interconnects and batch B interconnects are staged by unallocated/disconnected. FIG. 28C illustrates the multi-NTM configuration such that when channels B are active the connectivity is provided by the batch B of allocated interconnects, with batch A inter-connects unallocated/disconnected.

A fiber reconfiguration that involves moving an intercon-nect from one port to another typically takes 1-2 minutes on average and is a serial process performed by the robot. To speed this process, the fibers may be robotically reconfig-ured to be staged in unallocated/disconnected state during the setup time before the workflow is scheduled. That is, these fibers are inserted into the ports in the unallocated (disconnected) state, so as to not impact the parallel, allo-cated fibers in the other batch. It is then fast, about 10 seconds, to allocate each currently unallocated fiber when switching between current batch and new batch.

The system can be directed to perform rapid allocate/ unallocate toggling between batches of pre-staged, pre-reconfigured physical interconnects. For example, the tog-gling of 1,000 physical interconnects can be performed within 10 seconds each, totaling about 2.8 hours to execute. This process, if done manually, would typically take over a week. In a specific example (with reference to the example flow chart in FIG. 29), this batch processing 2900 method includes:

(1) Each optical transceiver is connected to dual NTMs through a 50/50 passive splitter or 1×2 optical switch (at 2902).
(2) The interconnects on first NTM or NTM partition are reconfigured to allocated state (at 2904).
(3) The compute system runs workload 1 (at 2906) by transmitting high bandwidth data over the optical trans-ceiver, with interconnects on first NTM or NTM par-tition in the allocated state. The allocated state enables transfer of data, in contrast to the unallocated state, which disconnects the link so that data is not transfer-able.
(4) While workload 1 is running, (at 2908) new intercon-nects on a second NTM or NTM partition are recon-figured and staged in unallocated state, so that these interconnects can be toggled to the allocated state once needed, in a process that takes only about 10 seconds.
(5) One workload 1 is complete, the batch 1 interconnects on first NTM or first NTM partition are toggled to unallocated/disconnected state (at 2910).
(6) Staged interconnects on second NTM or second NTM partition in batch 2 are then toggled to allocated state (at 2910).
(7) Workload 2 is then run on the second NTM or second NTM partition through batch 2 interconnects (at 2912).
(8) The process may be repeated (at 2914) for other workloads.

CONCLUSION

As used in this description, the term "portion" means some or all. So, for example, "A portion of P" may include some of "P" or all of "P." In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs" and includes the case of only one ABC.

As used herein, including in the claims, term "at least one" should be understood as meaning "one or more," and therefore includes both embodiments that include one or multiple components. Furthermore, dependent claims that refer to independent claims that describe features with "at least one" have the same meaning, both when the feature is referred to as "the" and "the at least one."

As used herein, including in the claims, the phrase "using" means "using at least," and is not exclusive. Thus, e.g., the phrase "using Z" means "using at least Z." Unless specifically stated by use of the word "only," the phrase "using Z" does not mean "using only Z."

In general, as used herein, including in the claims, unless the word "only" is specifically used in a phrase, it should not be read into that phrase.

As used herein, including in the claims, the phrase "dis-tinct" means "at least partially distinct." Unless specifically stated, distinct does not mean fully distinct. Thus, e.g., the phrase, "X is distinct from Y" means "X is at least partially distinct from Y," and does not mean "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)," "(b)," and the like) are used to help distinguish and/or identify, and not to show any serial or numerical limitation or ordering.

As used herein, when a range is specified as "between about X to Y" for some values of X and Y, this means "between about X to about Y," and includes X and Y.

The mere fact that certain measures are recited in mutually different dependent claims does not indicate that a combination of these measures cannot be used to fulfill aspects of the present invention.

The present technology is also understood to encompass the exact terms, features, numerical values or ranges etc., if in here a relative term, such as "about," "substantially," "ca.," "generally," "at least," "at the most" or "approximately" is used in this specification, such a term should also be construed to also include the exact term. That is, e.g., "substantially straight" should be construed to also include "(exactly) straight." In other words, "about 3" shall also cover exactly 3, or "substantially perpendicular" shall also comprise "perpendicular."

Use of exemplary language, such as "for instance," "such as," "for example," "e.g.," and the like, is merely intended to better illustrate the invention and does not indicate a limitation on the scope of the invention unless so claimed. The abbreviation "i.e." (id est) means "that is."

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise," "including," "having," and "contain" and their variations should be understood as meaning "including but not limited to" and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. In a system of operating a data center physical fiber-optic interconnect fabric, the system providing automated network services, including some or all of: provisioning, verification, audit, troubleshooting, and/or authentication using distributed robotic fiber cross-connects, the system comprising:

a multiplicity of optical fiber signal carrying cables; and a software control system that generates a sequence of movement and sensing based instructions communicated to multiple distributed robotic fiber cross-connects to perform robot services; and the multiple distributed robotic fiber cross-connects having internal robots configured to plug and unplug signal carrying cables in accordance with a non-entangling algorithm to enable said robot services, the software control system further configured to confirm, authenticate, and track robot services and input them into a data file for storage, a method of measuring one or more optical characteristics of a fiber-optic link with multiple serially arranged fiber-optic cable segments and connected end-to-end, within a dynamic fiber-optic interconnect fabric managed by an interconnect control system, with one of more of the fiber-optic cable segments connected to a multiplicity of user ports of an NTM (Network Topology Manager), the NTM containing a multiplicity of reconfigurable internal fiber-optic strands, each with a fixed connector at one end and a moveable connector at the other end, the moveable connector being movable between one or more test ports and the multiplicity of user ports, each port associated with an external receptacle and internal receptacle joined midway along a central axis, and further with an OTDR (Optical Time-Domain Reflectometer) connected to one or more external test ports on the NTM through fiber-optic test cables, with any internal fiber-optic connector able to be moved and inserted in an internal side of any port, the method comprising:

instructing the interconnect control system to measure one or more optical characteristics of a particular fiber-optic link;

determining a particular user port on the NTM to which the particular fiber-optic link is attached;

creating an internal fiber-optic strand connection between the particular user port and an available test port; and launching OTDR pulses down the particular fiber-optic link in a first direction and measuring a backreflected light signal to generate a first set of data.

2. The method of claim 1, further comprising: processing the first set of data to determine insertion loss, back reflection and location of loss events along the particular fiber-optic link.

3. The method of claim 1, wherein the particular fiber-optic link is a duplex fiber pair with transmit and receive fibers that terminates within a first customer cage at its first end.

4. The method of claim 3, further comprising: connecting a tail cable through the NTM to receive the OTDR pulses returning from the first customer cage.

5. The method of claim 3, wherein the particular fiber-optic link terminates within a second customer cage at its second end, with the NTM located along the particular fiber-optic link between the first end and the second end.

6. The method of claim 5, further comprising:

connecting transmit and receive lines at the first end of the fiber-optic link within the first customer cage;

connecting transmit and receive lines of a second end of the fiber-optic link within the second customer cage;

launching OTDR pulses down the fiber-optic link in the opposite direction and measuring the backreflected light signal to generate a second set of data; and processing the first set of data and the second set of data to determine insertion loss, back reflection, and location of loss events along the fiber-optic link.

7. The method of claim 6, further comprising: connecting a tail cable through the NTM to receive the OTDR pulses returning from the second customer cage.

8. The method of claim 1, wherein the robot services include one or more of: a fiber connection; a fiber disconnection; an optical power measurement; and/or an optical time-domain reflectometer (OTDR) trace.

9. In a system of operating a data center physical fiber-optic interconnect fabric, the system providing automated network services including some or all of: provisioning, verification, audit, troubleshooting, and/or authentication using distributed robotic fiber cross-connects, the system comprising:

a multiplicity of optical fiber signal carrying cables; and a software control system that generates a sequence of movement and sensing based instructions communicated to multiple distributed robotic fiber cross-connects to perform robot services; and the multiple distributed robotic fiber cross-connects having internal robots configured to plug and unplug signal carrying cables in accordance with a non-entangling algorithm to enable said robot services, the software control system further configured to confirm, authenticate, and track robot services and input them into a data file for storage, a method of visually identifying an end of a particular fiber-optic link with multiple fiber-optic cable segments connected end-to-end, within a dynamic fiber-optic interconnect fabric managed by an interconnect control system, with one of more of the fiber-optic cable segments connected to user ports of an NTM (Network Topology Manager), the NTM containing a multiplicity of reconfigurable internal fiber-optic strands with a fixed connectors at one end and a moveable connector at an other end, a movable connector being movable between one or more test ports and the user ports, each port associated with an external receptacle and internal receptacle joined midway along a central axis, and further with an OTDR (Optical Time-Domain Reflectometer) connected to one or more external test ports on the NTM through fiber-optic test cables, with any internal fiber-optic connectors able to be moved and inserted in an internal side of any port, the method comprising:

instructing the interconnect control system to identify a particular fiber-optic link endpoint; and connecting the particular fiber-optic link to a visual laser at an intermediate point connected to the NTM, such that a dust cap at the end of the particular fiber-optic link is illuminated.

10. The method of claim 9, wherein the robot services include one or more of: a fiber connection; a fiber disconnection; an optical power measurement; and/or an optical time-domain reflectometer (OTDR) trace.

11. A system of operating a data center physical fiber-optic interconnect fabric, the system providing automated network services, including some or all of: provisioning, verification, audit, troubleshooting, and/or authentication using distributed robotic fiber cross-connects, the system comprising:

a multiplicity of optical fiber signal carrying cables; and a software control system that generates a sequence of movement and sensing based instructions communicated to multiple distributed robotic fiber cross-connects to perform robot services; and the multiple distributed robotic fiber cross-connects having internal robots configured to plug and unplug signal carrying cables in accordance with a non-entangling algorithm to enable said robot services, the software control system further configured to confirm, authenticate and track robot services and input them into a data file for storage, wherein an internal connection within the robotic fiber cross-connect has an allocated state, in which the connection exhibits an insertion loss of less than 1 dB, and an internal connection also has an unallocated state, in which the connection exhibits an attenuation of greater than 30 dB, and the robotic fiber cross-connect is configured to autonomously transition internal connections between allocated and unallocated states, allowing interconnects to be disconnected, stored, and reconfigured without entanglement or performance degradation, and the system records connectivity history and a current physical interconnect state of individual cables and connectors to track provisioning, disconnection, and reconfiguration events.

12. The system of claim 11, wherein the robot services include one or more of: a fiber connection; a fiber disconnection; an optical power measurement; and/or an optical time-domain reflectometer (OTDR) trace.

* * * * *